(12) United States Patent
Zhang et al.

(10) Patent No.: US 12,521,150 B2
(45) Date of Patent: Jan. 13, 2026

(54) HINGE-LINK SPINAL CORRECTION DEVICE AND METHOD

(71) Applicant: Texas Scottish Rite Hospital for Children, Dallas, TX (US)

(72) Inventors: Hong Zhang, Irving, TX (US); John David Ross, Jr., Ovilla, TX (US); Daniel J. Sucato, Dallas, TX (US)

(73) Assignee: Texas Scottish Rite Hospital for Children, Dallas, TX (US)

( * ) Notice: Subject to any disclaimer, the term of this patent is extended or adjusted under 35 U.S.C. 154(b) by 172 days.

(21) Appl. No.: 18/524,713

(22) Filed: Nov. 30, 2023

(65) Prior Publication Data

US 2024/0156495 A1    May 16, 2024

Related U.S. Application Data

(63) Continuation-in-part of application No. 18/354,164, filed on Jul. 18, 2023, which is a continuation-in-part
(Continued)

(51) Int. Cl.
*A61B 17/88* (2006.01)
*A61B 17/28* (2006.01)
(Continued)

(52) U.S. Cl.
CPC .......... *A61B 17/7035* (2013.01); *A61B 17/28* (2013.01); *A61B 17/60* (2013.01);
(Continued)

(58) Field of Classification Search
CPC ..... A61B 17/7035; A61B 17/28; A61B 17/60; A61B 17/6408; A61B 2017/2808; A61B 2017/606
(Continued)

(56) References Cited

U.S. PATENT DOCUMENTS

| 4,361,141 | A | | 11/1982 | Tanner |
| 5,672,175 | A | * | 9/1997 | Martin ............... A61B 17/7044 606/279 |

(Continued)

FOREIGN PATENT DOCUMENTS

| CN | 102499741 B | 12/2013 | |
| DE | 3936702 A1 * | 5/1991 | ............. A61B 17/60 |

(Continued)

OTHER PUBLICATIONS

Translation of DE-3936702-A1 (Year: 1991).*
(Continued)

*Primary Examiner* — Eduardo C Robert
*Assistant Examiner* — David C Comstock
(74) *Attorney, Agent, or Firm* — Edwin S. Flores; Daniel J. Chalker; Chalker Flores, LLP

(57) ABSTRACT

A reduction device correction system for spinal surgery comprising two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; and an adjustable force compression device comprising a constant force cable, the constant force cable configured to be attached to each of the two uniplanar clamps.

21 Claims, 75 Drawing Sheets

Related U.S. Application Data of application No. 18/152,018, filed on Jan. 9, 2023, which is a continuation-in-part of application No. 16/820,097, filed on Mar. 16, 2020, now Pat. No. 11,596,446.

(60) Provisional application No. 62/822,345, filed on Mar. 22, 2019.

(51) Int. Cl.
  *A61B 17/60* (2006.01)
  *A61B 17/64* (2006.01)
  *A61B 17/70* (2006.01)

(52) U.S. Cl.
  CPC .. *A61B 17/6408* (2013.01); *A61B 2017/2808* (2013.01); *A61B 2017/606* (2013.01)

(58) Field of Classification Search
  USPC ... 606/57, 58, 246, 251, 253, 256, 258, 259, 606/260, 263, 264, 265, 270, 272, 278, 606/279, 90, 105, 86 A
  See application file for complete search history.

(56) References Cited

U.S. PATENT DOCUMENTS

| | | | |
|---|---|---|---|
| 5,797,910 A * | 8/1998 | Martin | A61B 17/025 606/57 |
| 6,755,828 B2 | 6/2004 | Shevtsov et al. | |
| 7,455,685 B2 | 11/2008 | Justis | |
| 8,016,861 B2 | 9/2011 | Mitchell et al. | |
| 8,147,519 B2 | 4/2012 | Wilcox | |
| 9,402,660 B2 | 8/2016 | Brinkman et al. | |
| 9,433,433 B2 | 9/2016 | Montello et al. | |
| 9,579,126 B2 | 2/2017 | Zhang et al. | |
| 10,004,538 B2 | 6/2018 | McNab et al. | |
| 10,105,166 B2 | 10/2018 | Zhang et al. | |
| 2005/0240181 A1 | 10/2005 | Boomer et al. | |
| 2006/0229611 A1 | 10/2006 | Avery et al. | |
| 2008/0033434 A1 | 2/2008 | Boomer et al. | |
| 2008/0234743 A1 | 9/2008 | Marik | |
| 2009/0093847 A1 | 4/2009 | Wilcox | |
| 2009/0198279 A1 | 8/2009 | Zhang et al. | |
| 2010/0030273 A1 | 2/2010 | Mitchell et al. | |
| 2010/0312281 A1 | 12/2010 | Barry | |
| 2014/0100612 A1 * | 4/2014 | Suddaby | A61B 17/7037 606/279 |
| 2014/0249591 A1 * | 9/2014 | Peultier | A61B 17/7077 606/86 A |
| 2017/0056074 A1 | 3/2017 | Zhang et al. | |
| 2018/0110506 A1 * | 4/2018 | Thommen | A61B 1/012 |
| 2018/0280062 A1 | 10/2018 | Lee | |
| 2021/0186567 A1 | 6/2021 | Bobbitt et al. | |
| 2023/0157729 A1 | 5/2023 | Zhang et al. | |
| 2023/0363801 A1 | 11/2023 | Zhang et al. | |

FOREIGN PATENT DOCUMENTS

| | | |
|---|---|---|
| WO | 2012074803 A1 | 6/2012 |
| WO | 2015092270 A1 | 6/2015 |
| WO | 2020197830 A1 | 10/2020 |

OTHER PUBLICATIONS

International Search Report and Written Opinion for PCT/US2023/086049 by KIPO dated Apr. 30, 2024, 14 pp.
International Search Report and Written Opinion for PCT/US2024/037876 by KIPO dated Nov. 6, 2024, 8 pp.
International Search Report and Written Opinion for PCT/US2024/057046 by KIPO dated Mar. 14, 2025, 10 pp.
International Search Report and Written Opinion for PCT/US2020/022975 by the USPTO dated May 22, 2020, 12 pp.
Boachie-Adjei O, et al., "Late treatment of tuberculosis-associated kyphosis: literature review and experience from a SRS-GOP site," Eur Spine J., May 2012, 22 Suppl 4, pp. S641-S646.
Boachie-Adjei O, et al., "Incidence and risk factors for major surgical complications in patients with complex spinal deformity: a report from an Srs Gop site," Spine Deformity, Jun. 2014, 3: 57-64.
Boachie-Adjei O, et al., "The Use of Halo-Gravity Traction and Vertebral Column Resection to Treatc Hildren with Severe Kyphosis. Results and Complications," Ann Pediatr Child Health May 2017, 5(3): 1129, 4 pp.
Boachie-Adjei O, et al., "New neurologic deficit and recovery rates in the treatment of complex pediatric spine deformities exceeding 100 degrees or treated by vertebral col. resection (VCR)," Oct. 2020, Spine Deformity. 9: 427-433.
Boachie-Adjei O, et al., "Surgical outcomes of severe spinal deformities esceeding 100° or treated by vertebral column resection (VCR). Does implant density matter: an observational study of deformity groupings," Spine Deformity, Mar. 2022, 10: 595-606.
Lenke LG, et al., "Posterior vertebral column resection for severe pediatric deformity: minimum two-year follow-up of thirty-five consecutive patients," Spine, Mar. 2009, vol. 34:20, pp. 2213-2221.
Lenke LG, et al., "Vertebral column resection for the treatment of severe spinal deformity," Clin Orthop Relat Res. Sep. 2009, 468: pp. 687-699.
Lenke LG, et al., "Complications after 147 consecutive vertebral col. resection for severe pediatric spinal deformity: a multicenter analysis," Spine 2013, vol. 38:2. pp. 119-132.
Miladi L (2013) Round and angular kyphosis in pediatric patients. Orthopaedic & Traumatology: Surgery & Research. Nov. 24, 2012, 99S: S140-S149.
Sacramento-Dominguez C, et al., "Apex of deformity for three-column osteotomy. Does it matter in the occurrence of complications?" The Spine Journal, Jul. 1, 2015, vol. 15, pp. 2351-2359.
Saifi C, et al, "Vertebral column resection for rigid spinal deformity," Global Spine Journal, 2017, vol. 7(3), pp. 280-290.
Sucato DJ, "Management of Severe Spinal Deformity," Spine, 2010, vol. 35:25, pp. 2186-2192.
Suk S, et al., "Posterior vertebral column resection for severe spinal scoliosis," Spine, 2005 30:14, pp. 1682-1687.
Suk S, et al., "Posterior vertebral column resection in fixed lumbosacral deformity," Spine, 2005 vol. 30:23, pp. E703- E710.
Suk S, Kim, J-H, et al. "Posterior vertebral column resection for severe spinal deformities," Spine, Jun. 2002, vol. 27:21, pp. 2374-2382.
Syvanen J., et al., "Health-related quality of life after posterior vertebral col. resection in children: comparison with healthy controls," European Journal of Orthopaedic Surgery & Traumatology, Jun. 2021, vol. 32, pp. 899-907.
Zhang H and Sucato DJ (2015) Rod link reducer posterior system for vertebral column resection: a porcine model. In: Wang Y, Boachie O, and Lenke L (eds) Spinal Osteotomy. Springer, pp. 163-178.
Zhang H, Sucato DJ, and Ross D, "A novel hinge-link correction system for vertebral column resection: a pilot study in a porcine model," Spine Deformity, Nov. 2022, vol. 11: 269-279.

* cited by examiner

| HINGE POSITION / RESECTION GAP | POSTERIOR VERTEBRAL ELEMENTS | CENTER OF SPINAL CANAL | POSTERIOR VERTEBRAL BODY WALL | POSTERIOR 1/3 VERTEBRAL BODY | MIDDLE 1/3 VERTEBRAL BODY | ANTERIOR 1/3 VERTEBRAL BODY |
|---|---|---|---|---|---|---|
| PVEG POSTERIOR VERTEBRAL ELEMENT GAP | 31.1% | -12.9% | -47.1% | -69% | -84.4% | -95.9% |
| PVBWG POSTERIOR VERTEBRAL BODY WALL GAP | 104.7% | 41.6% | -3% | -26.7% | -50.8% | -74% |
| AVBWG ANTERIOR VERTEBRAL BODY WALL GAP | 467.6% | 366.2% | 248.6% | 179.6% | 119.7% | 80% |

TABLE 1: LENGTHENING (POSITIVE) OR SHORTENING (NEGATIVE) PERCENTAGE CHANGES (%) IN RESECTION GAP AT DIFFERENT HINGE POSITION AFTER REDUCTION USING 30 mm HINGE

FIG. 29

| HINGE POSITION / RESECTION GAP | POSTERIOR VERTEBRAL ELEMENTS | CENTER OF SPINAL CANAL | POSTERIOR VERTEBRAL BODY WALL | POSTERIOR 1/3 VERTEBRAL BODY | MIDDLE 1/3 VERTEBRAL BODY | ANTERIOR 1/3 VERTEBRAL BODY |
|---|---|---|---|---|---|---|
| PVEG POSTERIOR VERTEBRAL ELEMENTS GAP | 10.1% | -33.9% | -64.6% | -82.2% | -97% | -100% |
| PVBWG POSTERIOR VERTEBRAL BODY WALL GAP | 76.2% | 36.2% | -16.8% | -44.4% | -65.1% | -82% |
| AVBWG ANTERIOR VERTEBRAL BODY WALL GAP | 421.5% | 320.1% | 204.6% | 145.8% | 85.2% | 84.5% |

TABLE 2: LENGTHENING (POSITIVE) OR SHORTENING (NEGATIVE) PERCENTAGE CHANGES (%) IN RESECTION GAP AT DIFFERENT HINGE POSITION AFTER REDUCTION USING 15 mm HINGE

FIG. 30

TABLE 3: LENGTHENING (POSITIVE) OR SHORTENING (NEGATIVE) PERCENTAGE CHANGES (%) IN RESECTION GAP AT DIFFERENT HINGE POSITION AFTER REDUCTION USING 45 mm HINGE

| HINGE POSITION / RESECTION GAP | POSTERIOR VERTEBRAL ELEMENTS | CENTER OF SPINAL CANAL | POSTERIOR VERTEBRAL BODY WALL | POSTERIOR 1/3 VERTEBRAL BODY | MIDDLE 1/3 VERTEBRAL BODY | ANTERIOR 1/3 VERTEBRAL BODY |
|---|---|---|---|---|---|---|
| PVEG POSTERIOR VERTEBRAL ELEMENT GAP | 16.1% | -11.5% | -40.4% | -53.8% | -64.6% | -93.4% |
| PVBWG POSTERIOR VERTEBRAL BODY WALL GAP | 79.2% | 36.3% | -13.7% | -10.8% | -27.8% | -72.5% |
| AVBWG ANTERIOR VERTEBRAL BODY WALL GAP | 376.7% | 321.9% | 223.9% | 185.3% | 156.7% | 70.1% |

FIG. 31

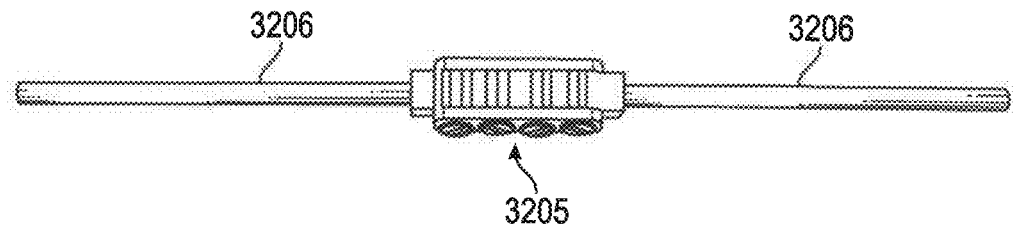
FIG. 34A
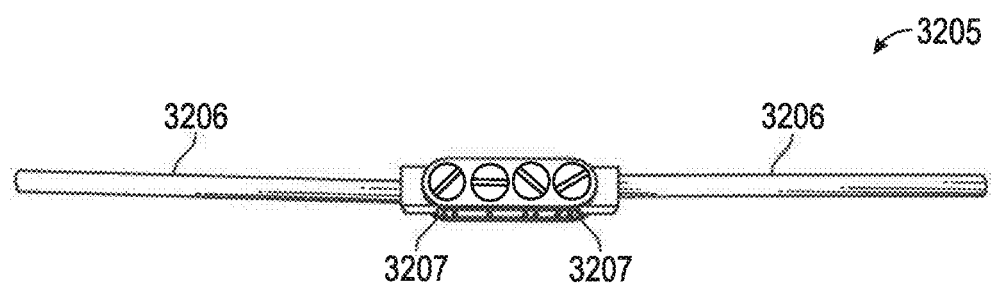
FIG. 34B
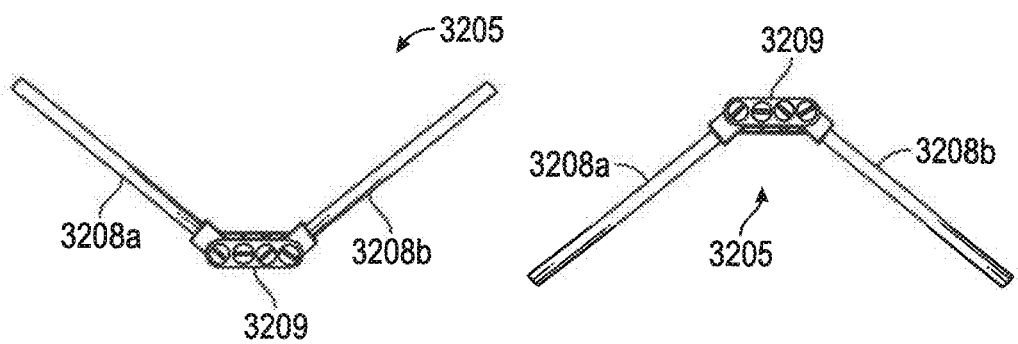
FIG. 34C
FIG. 34D

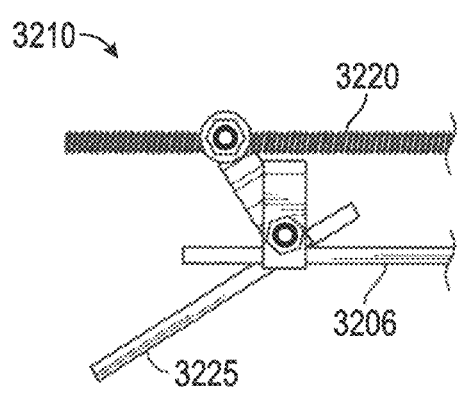
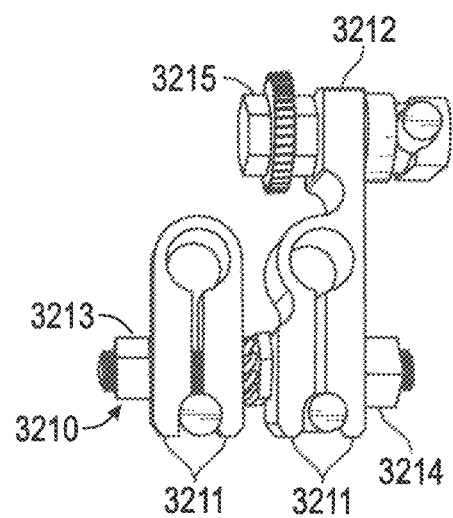
FIG. 35A                    FIG. 35B

| TABLE: LENGTHENING (POSITIVE) OR SHORTENING (NEGATIVE) PERCENTAGE CHANGES (%) IN RESECTION GAP AT DIFFERENT CAGE HEIGHT AFTER REDUCTION ||||
|---|---|---|---|
| CAGE HEIGHT<br><br>RESECTION GAP | 28 mm | 19 mm | 9 mm |
| POSTERIOR VERTEBRAL ELEMENTS GAP (PVEG) | -53.3% | -69.6% | -100% |
| POSTERIOR VERTEBRAL BODY WALL GAP (PVBWG) | -17.3% | -39.7% | -81.7% |
| ANTERIOR VERTEBRAL BODY WALL GAP (AVBWG) | 76.9% | 47.9% | 0.5% |

HINGE-LINK SPINAL CORRECTION DEVICE AND METHOD

CROSS-REFERENCE TO RELATED APPLICATIONS

This application is a continuation-in-part patent application of U.S. Ser. No. 18/354,164 filed on Jul. 18, 2023, which is a continuation-in-part patent application of U.S. Ser. No. 18/152,018 filed on Jan. 9, 2023, which is a continuation-in-part patent application of U.S. Ser. No. 16/820,097 filed on Mar. 16, 2020, now issued as U.S. Pat. No. 11,596,446, issued on Mar. 7, 2023, which is a non-provisional patent application of and claims priority to U.S. provisional patent application Ser. No. 62/822,345 filed on Mar. 22, 2019, the contents of which are hereby incorporated by reference in their entirety.

STATEMENT OF FEDERALLY FUNDED RESEARCH

Not applicable.

TECHNICAL FIELD OF THE INVENTION

The present invention relates in general to the treatment of spinal deformations. In particular, the present invention relates to the correction of spinal deformation in which a vertebral column resection is performed.

BACKGROUND OF THE INVENTION

Without limiting the scope of the invention, its background is described in connection with the use of a device to stabilize and manipulate a deformed spine on which a vertebral column resection (VCR) or spinal correction is being or has been performed into a desired position and then fixing the spine in that configuration. In some cases of severe spinal deformity, it is advisable to remove one or more vertebrae to allow manipulation of the spine into a more normal curve, sometimes in stages over a period of time. The spine must be stabilized for performance of the VCR; manipulated into the more normal configuration; held in place over a period of time until the spine adapts to that configuration, and sometimes stabilized and manipulated repeatedly during subsequent spinal corrections and then held in place until the spine adapts to each new configuration. Prior art method and systems are difficult and risky because they do not provide for fine control of the initial stabilization during the VCR, stabilization, manipulation, or the long-term fixing in place of the spine without risk of compression, distraction, or translation of the spinal cord.

U.S. Pat. No. 9,433,433, to Montello, et al., is said to disclose a posterior vertebral plating system comprising a plate and a plurality of attachment members. The plate is said to have a plurality of holes extending through the plate from an upper surface to a lower surface, and the plate is configured to extend along the posterior side of at least two vertebrae adjacent at least one boney structure of each of the vertebrae. The holes are said to be spaced in such a way that a first plurality of holes is positionable over a boney structure of a first vertebra to define a plurality of fixation points to the first vertebra and a second plurality of holes is positionable over boney structure of a second vertebra to define a plurality of fixation points to the second vertebra. The attachment members are said to be insertable through the holes of the plate and into the boney structure of a corresponding vertebra to fix the plate to the vertebra.

U.S. Pat. No. 10,004,538, to McNab et al., is said to disclose a surgical instrument that includes a first arm engageable with a first spinal construct disposed with a first vertebral surface. A second arm is said to be connected with the first arm via a pivot and to be engageable with a second spinal construct disposed with a second vertebral surface. The first arm is said to be movable to rotate the first spinal construct relative to the pivot and/or the second arm is said to be movable to rotate the second spinal construct relative to the pivot such that the first vertebral surface is moved relative to the second vertebral surface.

U.S. Pat. No. 9,579,126, to Zhang, et al., and U.S. Pat. No. 10,105,166, to Zhang, et al., are said to disclose a rod link reducer of a spinal fixation system that includes a first and a second spinal rod manipulator; a first spinal rod manipulator joint connected to the first spinal rod manipulator and a second spinal rod manipulator joint connected to the second spinal rod manipulator; a first and a second translatable transverse shaft connected to the first and second joints, respectively; and a universal reducer connected to both the first and second translatable transverse shafts, wherein the universal reducer, the shafts and the linkers provide movement and temporary fixation of a spine that has been manipulated into a final position during spinal surgery.

Methods and systems for stabilization, manipulation, and fixation of a deformed spine subject to a VCR are ineffective and risky. Effective methods and systems that reduce risk for stabilization, manipulation, and fixation of a deformed spine subject to a VCR to prevent compression, distraction, or translation of the spinal cord are desirable.

SUMMARY OF THE INVENTION

In some embodiments of the disclosure, a device for spinal correction is disclosed as including a stabilizer assembly including: a hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; a second stabilizing rod coupled to the second rod-bearing leaf; and a plurality of monoaxial or polyaxial links, wherein each monoaxial or polyaxial link is movably coupled to the first stabilizing rod or to the second stabilizing rod and is movably couplable to a first spinal rod fixed to a spine or to a second spinal rod fixed to the spine; wherein the stabilizer assembly is couplable to the first spinal rod or to the second spinal rod to stabilize the spine to prevent compression, distraction, or translation of the spinal cord during a spinal correction. In one aspect, the locking mechanism to lock the first rod-bearing leaf and the second rod-bearing leaf at the desired angle includes one or more screws. In another aspect, the first stabilizing rod is coupled to the first rod-bearing leaf with a first threaded portion of the first stabilizing rod. In another aspect, the second stabilizing rod is coupled to the second rod-bearing leaf with a second threaded portion of the second stabilizing rod. In another aspect, each monoaxial or polyaxial link is movably coupled to the first stabilizing rod or to the second stabilizing rod with one or more adjustment nuts or one or more locking pins. In another aspect, each polyaxial link is lockable at a position on the first stabilizing rod or the second stabilizing rod and is lockable at an angle to the first stabilizing rod or the second stabilizing rod with two or more adjustment nuts. In another aspect, each monoaxial or polyaxial link is movably couplable to the first spinal rod or to the second spinal rod at one or more components, each comprising a recess shaped to receive the first spinal rod or to the second spinal rod, and lockable in position with one or more screws. In another aspect, the first stabilizing rod is rotatably coupled to the first rod-bearing leaf to provide coronal or sagittal freedom of movement, or both, of the first stabilizing rod or the second stabilizing rod is rotatably coupled to the second rod-bearing leaf to provide coronal or sagittal freedom of movement, or both, of the second stabilizing rod; and the first stabilizing rod has a locking mechanism to lock it at a desired position or the second stabilizing rod has a locking mechanism to lock it at a desired position. In another aspect, the first stabilizing rod or the second stabilizing rod is threaded and adjustment nuts are mounted on the first stabilizing rod or the second stabilizing rod to provide longitudinal freedom of movement or locking of one or more of the plurality of monoaxial or polyaxial links on the first stabilizing rod or the second stabilizing rod.

In some embodiments of the disclosure, a kit is disclosed as including a stabilizer assembly including: a hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; a second stabilizing rod coupled to the second rod-bearing leaf; and a plurality of monoaxial or polyaxial links, wherein each monoaxial or polyaxial link is movably coupled to the first stabilizing rod or to the second stabilizing rod and is movably couplable to a first spinal rod fixed to a spine or to a second spinal rod fixed to the spine; wherein the stabilizer assembly is couplable to the first spinal rod or to the second spinal rod to stabilize the spine to prevent compression, distraction, or translation of the spinal cord during a spinal correction. In one aspect, the first stabilizing rod is rotatably coupled to the first rod-bearing leaf to provide coronal or sagittal freedom of movement, or both, of the first stabilizing rod or the second stabilizing rod is rotatably coupled to the second rod-bearing leaf to provide coronal or sagittal freedom of movement, or both, of the second stabilizing rod; and the first stabilizing rod has a locking mechanism to lock it at a desired position or the second stabilizing rod has a locking mechanism to lock it at a desired position. In another aspect, the first stabilizing rod or the second stabilizing rod is threaded and adjustment nuts are mounted on the first stabilizing rod or the second stabilizing rod to provide longitudinal freedom of movement or locking of one or more of the plurality of monoaxial or polyaxial links on the first stabilizing rod or the second stabilizing rod.

In some embodiments of the disclosure, a method of stabilizing a spine is disclosed as including providing a patient in need of stabilization of a spine, wherein a plurality of spinal rods have been fixed to the spine; coupling a stabilizer assembly of a device for spinal correction to at least one of the plurality of spinal rods, wherein the stabilizer assembly includes: a hinge including: a first rod-bearing leaf; a second rod-bearing leaf rotatably coupled to the first rod-bearing leaf to provide coronal or sagittal freedom of movement, or both, of the stabilizer assembly; and a locking mechanism to lock the first rod-bearing leaf and the second rod-bearing leaf at a desired angle; a first stabilizing rod coupled to the first rod-bearing leaf; a second stabilizing rod coupled to the second rod-bearing leaf; and a plurality of monoaxial or polyaxial links, wherein each monoaxial or polyaxial link is movably coupled to the first stabilizing rod or to the second stabilizing rod and is movably coupled to a first spinal rod fixed to a spine or to a second spinal rod fixed to the spine; and stabilizing the spine at a desired spinal configuration; wherein the stabilizer assembly is couplable to the first spinal rod or to the second spinal rod to stabilize the spine to prevent compression, distraction, or translation of the spinal cord during a spinal correction. In one aspect, the locking mechanism to lock the first rod-bearing leaf and the second rod-bearing leaf at the desired angle includes one or more screws. In another aspect, the first stabilizing rod is coupled to the first rod-bearing leaf with a first threaded portion of the first stabilizing rod. In another aspect, the second stabilizing rod is coupled to the second rod-bearing leaf with a second threaded portion of the second stabilizing rod. In another aspect, each monoaxial or polyaxial link is movably coupled to the first stabilizing rod or to the second stabilizing rod with one or more adjustment nuts or one or more locking pins. In another aspect, each polyaxial link is lockable at a position on the first stabilizing rod or the second stabilizing rod and is lockable at an angle to the first stabilizing rod or the second stabilizing rod with two or more adjustment nuts. In another aspect, each monoaxial or polyaxial link is movably couplable to the first spinal rod or to the second spinal rod at one or more components, each comprising a recess shaped to receive the first spinal rod or to the second spinal rod, and lockable in position with one or more screws. In another aspect, the first stabilizing rod is rotatably coupled to the first rod-bearing leaf to provide coronal or sagittal freedom of movement, or both, of the first stabilizing rod or the second stabilizing rod is rotatably coupled to the second rod-bearing leaf to provide coronal or sagittal freedom of movement, or both, of the second stabilizing rod; and the first stabilizing rod has a locking mechanism to lock it at a desired position or the second stabilizing rod has a locking mechanism to lock it at a desired position. In another aspect, the first stabilizing rod or the second stabilizing rod is threaded and adjustment nuts are mounted on the first stabilizing rod or the second stabilizing rod to provide longitudinal freedom of movement or locking of one or more of the plurality of monoaxial or polyaxial links on the first stabilizing rod or the second stabilizing rod. In another aspect, the first stabilizing rod or the second stabilizing rod is threaded and adjustment nuts are mounted on the first stabilizing rod or the second stabilizing rod to provide longitudinal freedom of movement or locking of one or more of the plurality of monoaxial or polyaxial links on the first stabilizing rod or the second stabilizing rod. In another aspect, the method further includes coupling the stabilizer assembly to at least one of the plurality of spinal rods oriented to allow the hinge to have coronal freedom of movement, sagittal freedom of movement, or a combination of coronal and sagittal freedom of movement.

In some embodiments of the disclosure, a manipulator rod for use with a device for spinal correction is disclosed as including a grip at a proximate end of the manipulator rod; a body affixed to the grip; and a coupling mechanism affixed to the body at a distal end of the manipulator rod; wherein the manipulator rod is configured to be coupled to a hinge of the device for spinal correction, wherein the device for spinal correction includes: a stabilizer assembly including: the hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; and a second stabilizing rod coupled to the second rod-bearing leaf; and wherein the stabilizer assembly is couplable to a first spinal rod fixed to a spine or to a second spinal rod fixed to the spine to stabilize the spine to prevent compression, distraction, or translation of the spinal cord during a spinal correction. In one aspect, the body is straight. In another aspect, the body is curved. In another aspect, the body has a circular, elliptical, triangular, square, pentagonal, hexagonal, or other polygonal cross section. In another aspect, the coupling mechanism includes a threaded recess configured to receive a threaded bolt.

In some embodiments of the disclosure, a kit is disclosed as including a manipulator rod for use with a device for spinal correction including a grip at a proximate end of the manipulator rod; a body affixed to the grip; and a coupling mechanism affixed to the body at a distal end of the manipulator rod; wherein the manipulator rod is configured to be coupled to a hinge of the device for spinal correction, and the device for spinal correction including: a stabilizer assembly including: the hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; and a second stabilizing rod coupled to the second rod-bearing leaf; and wherein the stabilizer assembly is couplable to a first spinal rod fixed to a spine or to a second spinal rod fixed to the spine to stabilize the spine to prevent compression, distraction, or translation of the spinal cord during a spinal correction. In one aspect, the body of the manipulator rod is straight. In another aspect, the body of the manipulator rod is curved. In another aspect, the body of the manipulator rod has a circular, elliptical, triangular, square, pentagonal, hexagonal, or other polygonal cross section.

In other embodiments of the disclosure, a manipulator clamp for use with a device for spinal correction is disclosed as including two clamp arms rotatably coupled together, wherein the two clamp arms engage each other in a disengageable ratchet mechanism at a proximate end of the manipulator clamp, and wherein each clamp arm includes a gripping surface at a distal end of the manipulator clamp; wherein the manipulator clamp is configured to engage a stabilizing rod of a device for spinal correction and a spinal rod, wherein the device for spinal correction includes: a stabilizer assembly including: a hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; and a second stabilizing rod coupled to the second rod-bearing leaf; and wherein the stabilizer assembly is couplable to a first spinal rod fixed to a spine or to a second spinal rod fixed to the spine to stabilize the spine to prevent compression, distraction, or translation of the spinal cord during a spinal correction. In one aspect, the gripping surface of each clamp arm includes a first recess to engage the first or second stabilizing rod and a second recess to engage the first or second spinal rod.

In other embodiments of the disclosure, a manipulator clamp for use with a device for spinal correction is disclosed as including two clamp arms rotatably coupled together, wherein the two clamp arms engage each other in a disengageable ratchet mechanism at a proximate end of the manipulator clamp, and wherein each clamp arm includes a gripping surface at a distal end of the manipulator clamp; wherein the manipulator clamp is configured to engage a stabilizing rod of a device for spinal correction and a spinal rod; and the device for spinal correction, including: a stabilizer assembly including: a hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; and a second stabilizing rod coupled to the second rod-bearing leaf; and wherein the stabilizer assembly is couplable to a first spinal rod fixed to a spine or to a second spinal rod fixed to the spine to stabilize the spine to prevent compression, distraction, or translation of the spinal cord during a spinal correction. In one aspect, the gripping surface of each clamp arm of the manipulator clamp includes a first recess to engage the first or second stabilizing rod and a second recess to engage the first or second spinal rod.

In other embodiments of the disclosure, device for spinal correction is disclosed as including a stabilizer assembly including: a hinge including: a first rod-bearing leaf; a second rod-bearing leaf rotatably coupled to the first rod-bearing leaf to provide coronal or sagittal freedom of movement, or both, of the stabilizer assembly; a locking mechanism to lock the first rod-bearing leaf and the second rod-bearing leaf at a desired angle; a first stabilizing rod coupled to the first rod-bearing leaf; a second stabilizing rod coupled to the second rod-bearing leaf; wherein the first rod-bearing leaf includes a first bolt hole configured to receive a second nut-bearing bolt to couple the first stabilizing rod to the first rod-bearing leaf, and wherein the second rod-bearing leaf includes a second bolt hole configured to receive a second nut-bearing bolt to couple the second stabilizing rod to the second rod-bearing leaf; and wherein the stabilizer assembly is couplable to a first spinal rod fixed to the spine or to a second spinal rod fixed to the spine to stabilize the spine to prevent compression, distraction, or translation of the spinal cord during a spinal correction.

In some embodiments of the disclosure, a uniplanar clamp hinge for spinal surgery is disclosed as including a dual-axis hinge including a first hinge-rod-bearing leaf, a second hinge-rod-bearing leaf rotationally coupled to the first hinge-rod-bearing leaf, a first hinge-rod coupled to the first hinge-rod-bearing leaf, a second hinge-rod coupled to the second-hinge-rod-bearing leaf, and first and second locking screws to lock the first and second hinge-rods at a desired angle; a first uniplanar clamp movably coupled to the first hinge-rod and a second uniplanar clamp movably coupled to the second hinge-rod; a stabilizing rod movably coupled to the first uniplanar clamp and the second uniplanar clamp; a first provisional spine rod movably coupled to the first unipolar clamp and a second provisional spine rod movably coupled to the second uniplanar clamp. In one aspect, each of the first unipolar clamp and the second unipolar clamp includes a spring-loaded snap-on hinge clamp and a hinge rod locking nut. In another aspect, each of the first unipolar clamp and the second unipolar clamp includes a spring-loaded snap-on provisional spine rod clamp and a provisional spine rod locking nut. In another aspect, each of the first unipolar clamp and the second unipolar clamp includes an integrated locking tab and a stabilizing rod locking bolt. In another aspect, the first hinge-rod is configured to be movably coupled to a first spring-loaded snap-on hinge clamp of the first uniplanar hinge clamp and the second hinge-rod is configured to be movably coupled to a second spring-loaded snap-on hinge clamp of the second uniplanar hinge clamp. In another aspect, the first provisional spine rod is configured to be movably coupled to a first spring-loaded snap-on provisional spine rod clamp of the first uniplanar hinge clamp and the second provisional spine rod is configured to be movably coupled to a second spring-loaded snap-on provisional spine rod clamp of the second uniplanar hinge clamp. In another aspect, the stabilizing rod is configured to be movably coupled to a first integrated locking tab of the first uniplanar hinge clamp and to a second integrated locking tab of the second uniplanar hinge clamp.

In other embodiments of the disclosure, a uniplanar clamp hinge kit is disclosed as including a uniplanar hinge clamp including a dual-axis hinge including a first hinge-rod-bearing leaf, a second hinge-rod-bearing leaf rotationally coupled to the first hinge-rod-bearing leaf, a first hinge-rod coupled to the first hinge-rod-bearing leaf, a second hinge-rod coupled to the second-hinge-rod-bearing leaf, and first and second locking screws to lock the first and second hinge-rods at a desired angle; a first uniplanar clamp movably coupled to the first hinge-rod and a second uniplanar clamp movably coupled to the second hinge-rod; a stabilizing rod movably coupled to the first uniplanar clamp and the second uniplanar clamp; and a first provisional spine rod movably coupled to the first unipolar clamp and a second provisional spine rod movably coupled to the second uniplanar clamp; and one or more tools to manipulate the uniplanar clamp hinge. In one aspect, each of the first unipolar clamp and the second unipolar clamp includes a spring-loaded snap-on hinge clamp and a hinge rod locking nut. In another aspect, each of the first unipolar clamp and the second unipolar clamp includes a spring-loaded snap-on provisional spine rod clamp and a provisional spine rod locking nut. In another aspect, each of the first unipolar clamp and the second unipolar clamp includes an integrated locking tab and a stabilizing rod locking bolt. In another aspect, the first hinge-rod is configured to be movably coupled to a first spring-loaded snap-on hinge clamp of the first uniplanar hinge clamp and the second hinge-rod is configured to be movably coupled to a second spring-loaded snap-on hinge clamp of the second uniplanar hinge clamp. In another aspect, the first provisional spine rod is configured to be movably coupled to a first spring-loaded snap-on provisional spine rod clamp of the first uniplanar hinge clamp and the second provisional spine rod is configured to be movably coupled to a second spring-loaded snap-on provisional spine rod clamp of the second uniplanar hinge clamp. In another aspect, the stabilizing rod is configured to be movably coupled to a first integrated locking tab of the first uniplanar hinge clamp and to a second integrated locking tab of the second uniplanar hinge clamp.

In other embodiments of the disclosure, a method of using a uniplanar hinge clamp is disclosed as including providing a uniplanar hinge clamp including a dual-axis hinge including a first hinge-rod-bearing leaf, a second hinge-rod-bearing leaf rotationally coupled to the first hinge-rod-bearing leaf, a first hinge-rod coupled to the first hinge-rod-bearing leaf, a second hinge-rod coupled to the second-hinge-rod-bearing leaf, and first and second locking screws to lock the first and second hinge-rods at a desired angle; a first uniplanar clamp movably coupled to the first hinge-rod and a second uniplanar clamp movably coupled to the second hinge-rod; a stabilizing rod movably coupled to the first uniplanar clamp and the second uniplanar clamp; and a first provisional spine rod movably coupled to the first unipolar clamp and a second provisional spine rod movably coupled to the second uniplanar clamp; and performing spinal surgery using the uniplanar hinge clamp. In one aspect, each of the first unipolar clamp and the second unipolar clamp includes a spring-loaded snap-on hinge clamp and a hinge rod locking nut. In another aspect, each of the first unipolar clamp and the second unipolar clamp includes a spring-loaded snap-on provisional spine rod clamp and a provisional spine rod locking nut. In another aspect, each of the first unipolar clamp and the second unipolar clamp includes an integrated locking tab and a stabilizing rod locking bolt. In another aspect, the first hinge-rod is configured to be movably coupled to a first spring-loaded snap-on hinge clamp of the first uniplanar hinge clamp and the second hinge-rod is configured to be movably coupled to a second spring-loaded snap-on hinge clamp of the second uniplanar hinge clamp. In another aspect, the first provisional spine rod is configured to be movably coupled to a first spring-loaded snap-on provisional spine rod clamp of the first uniplanar hinge clamp and the second provisional spine rod is configured to be movably coupled to a second spring-loaded snap-on provisional spine rod clamp of the second uniplanar hinge clamp. In another aspect, the stabilizing rod is configured to be movably coupled to a first integrated locking tab of the first uniplanar hinge clamp and to a second integrated locking tab of the second uniplanar hinge clamp.

In other embodiments of the disclosure, a uniplanar clamp hinge for spinal surgery is disclosed including a geared dual-axis hinge comprising four gears, a first hinge-rod coupled to one or more of the four gears, a second hinge-rod coupled to one or more of the four gears, and a plurality of locking screws to lock the four gears at a desired angle; a first uniplanar clamp movably coupled to the first hinge-rod and a second uniplanar clamp movably coupled to the second hinge-rod; a stabilizing rod movably coupled to the first uniplanar clamp and the second uniplanar clamp; and a first provisional spine rod movably coupled to the first unipolar clamp and a second provisional spine rod movably coupled to the second uniplanar clamp. In one aspect, each of the first unipolar clamp and the second unipolar clamp includes a spring-loaded snap-on hinge clamp and a hinge rod locking nut. In another aspect, each of the first unipolar clamp and the second unipolar clamp includes a spring-loaded snap-on provisional spine rod clamp and a provisional spine rod locking nut. In another aspect, each of the first unipolar clamp and the second unipolar clamp includes an integrated locking tab and a stabilizing rod locking bolt. In another aspect, the first hinge-rod is configured to be movably coupled to a first spring-loaded snap-on hinge clamp of the first uniplanar hinge clamp and the second hinge-rod is configured to be movably coupled to a second spring-loaded snap-on hinge clamp of the second uniplanar hinge clamp. In another aspect, the first provisional spine rod is configured to be movably coupled to a first spring-loaded snap-on provisional spine rod clamp of the first uniplanar hinge clamp and the second provisional spine rod is configured to be movably coupled to a second spring-loaded snap-on provisional spine rod clamp of the second uniplanar hinge clamp. In another aspect, the stabilizing rod is configured to be movably coupled to a first integrated locking tab of the first uniplanar hinge clamp and to a second integrated locking tab of the second uniplanar hinge clamp.

In other embodiments of the disclosure, a uniplanar clamp hinge kit is disclosed including a uniplanar clamp hinge comprising a geared dual-axis hinge comprising four gears, a first hinge-rod coupled to one or more of the four gears, a second hinge-rod coupled to one or more of the four gears, and a plurality of locking screws to lock the four gears at a desired angle; a first uniplanar clamp movably coupled to the first hinge-rod and a second uniplanar clamp movably coupled to the second hinge-rod; a stabilizing rod movably coupled to the first uniplanar clamp and the second uniplanar clamp; and a first provisional spine rod movably coupled to the first unipolar clamp and a second provisional spine rod movably coupled to the second uniplanar clamp; and one or more tools to manipulate the uniplanar clamp hinge. In one aspect, each of the first unipolar clamp and the second unipolar clamp includes a spring-loaded snap-on hinge clamp and a hinge rod locking nut. In another aspect, each of the first unipolar clamp and the second unipolar clamp includes a spring-loaded snap-on provisional spine rod clamp and a provisional spine rod locking nut. In another aspect, each of the first unipolar clamp and the second unipolar clamp includes an integrated locking tab and a stabilizing rod locking bolt. In another aspect, the first hinge-rod is configured to be movably coupled to a first spring-loaded snap-on hinge clamp of the first uniplanar hinge clamp and the second hinge-rod is configured to be movably coupled to a second spring-loaded snap-on hinge clamp of the second uniplanar hinge clamp. In another aspect, the first provisional spine rod is configured to be movably coupled to a first spring-loaded snap-on provisional spine rod clamp of the first uniplanar hinge clamp and the second provisional spine rod is configured to be movably coupled to a second spring-loaded snap-on provisional spine rod clamp of the second uniplanar hinge clamp. In another aspect, the stabilizing rod is configured to be movably coupled to a first integrated locking tab of the first uniplanar hinge clamp and to a second integrated locking tab of the second uniplanar hinge clamp.

In other embodiments of the disclosure, a method of using a uniplanar hinge clamp is disclosed including providing a uniplanar hinge clamp comprising a geared dual-axis hinge comprising four gears, a first hinge-rod coupled to one or more of the four gears, a second hinge-rod coupled to one or more of the four gears, and a plurality of locking screws to lock the four gears at a desired angle; a first uniplanar clamp movably coupled to the first hinge-rod and a second uniplanar clamp movably coupled to the second hinge-rod; a stabilizing rod movably coupled to the first uniplanar clamp and the second uniplanar clamp; and a first provisional spine rod movably coupled to the first unipolar clamp and a second provisional spine rod movably coupled to the second uniplanar clamp; and performing spinal surgery using the uniplanar hinge clamp. In one aspect, each of the first unipolar clamp and the second unipolar clamp includes a spring-loaded snap-on hinge clamp and a hinge rod locking nut. In another aspect, each of the first unipolar clamp and the second unipolar clamp includes a spring-loaded snap-on provisional spine rod clamp and a provisional spine rod locking nut. In another aspect, each of the first unipolar clamp and the second unipolar clamp includes an integrated locking tab and a stabilizing rod locking bolt. In another aspect, the first hinge-rod is configured to be movably coupled to a first spring-loaded snap-on hinge clamp of the first uniplanar hinge clamp and the second hinge-rod is configured to be movably coupled to a second spring-loaded snap-on hinge clamp of the second uniplanar hinge clamp. In another aspect, the first provisional spine rod is configured to be movably coupled to a first spring-loaded snap-on provisional spine rod clamp of the first uniplanar hinge clamp and the second provisional spine rod is configured to be movably coupled to a second spring-loaded snap-on provisional spine rod clamp of the second uniplanar hinge clamp. In another aspect, the stabilizing rod is configured to be movably coupled to a first integrated locking tab of the first uniplanar hinge clamp and to a second integrated locking tab of the second uniplanar hinge clamp.

In an embodiment of the disclosure, a reduction device correction system for spinal surgery includes two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; and an adjustable force compression device including a constant force cable, the constant force cable configured to be attached to each of the two uniplanar clamps. In one aspect, each of the two uniplanar clamps includes a stabilizing rod locking bolt and stabilizing rod locking nut to attach the stabilizing rod to the uniplanar clamp. In another aspect, each of the two uniplanar clamps includes an open-ended clamp, a spring-loaded snap, and a provisional spine locking nut to attach one of the provisional spine rods to the uniplanar clamp. In another aspect, the adjustable force compression device further includes an adjustable-length mechanical base connected to the constant force cable. In another aspect, the adjustable force compression device further includes a self-locking pump handle connected to the constant force cable. In another aspect, the adjustable force compression device further includes dual constant force springs connected to the constant force cable.

In another embodiment of the disclosure, a kit for a reduction device correction system for spinal surgery includes two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; an adjustable force compression device including a constant force cable, the constant force cable configured to be attached to each of the two uniplanar clamps; and one or more tools to assemble or manipulate the reduction device correction system. In one aspect, each of the two uniplanar clamps includes a lockable differentially threaded reduction bolt to attach the reduction rod to the uniplanar clamp. In another aspect, each of the two uniplanar clamps includes a stabilizing rod locking bolt and stabilizing rod locking nut to attach the stabilizing rod to the uniplanar clamp. In another aspect, each of the two uniplanar clamps includes an open-ended clamp, a spring-loaded snap, and a provisional spine locking nut to attach one of the provisional spine rods to the uniplanar clamp. In another aspect, the adjustable force compression device further includes an adjustable-length mechanical base connected to the constant force cable. In another aspect, the adjustable force compression device further includes a self-locking pump handle connected to the constant force cable. In another aspect, the adjustable force compression device further includes dual constant force springs connected to the constant force cable.

In another embodiment of the disclosure, a method for using a reduction device correction system for spinal surgery includes providing a patient in need of spinal surgery; providing the reduction device correction system, including two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; and an adjustable force compression device including a constant force cable, the constant force cable configured to be attached to each of the two uniplanar clamps; and using the reduction device correction system to perform spinal surgery. In one aspect, each of the two uniplanar clamps includes a lockable differentially threaded reduction bolt to attach the reduction rod to the uniplanar clamp. In another aspect, each of the two uniplanar clamps includes a stabilizing rod locking bolt and stabilizing rod locking nut to attach the stabilizing rod to the uniplanar clamp. In another aspect, each of the two uniplanar clamps includes an open-ended clamp, a spring-loaded snap, and a provisional spine locking nut to attach one of the provisional spine rods to the uniplanar clamp. In another aspect, the adjustable force compression device further includes an adjustable-length mechanical base connected to the constant force cable. In another aspect, the adjustable force compression device further includes a self-locking pump handle connected to the constant force cable. In another aspect, the adjustable force compression device further includes dual constant force springs connected to the constant force cable.

BRIEF DESCRIPTION OF THE DRAWINGS

For a more complete understanding of the features and advantages of the present invention, reference is now made to the detailed description of the invention along with the accompanying figures, in which:

FIG. 9E shows the rod-bearing leaves of the stabilizer assembly.

FIG. 29 shows a table setting forth lengthening (positive) or shortening (negative) percentage change at resection gap at different hinge positions after reduction using a 30 mm hinge.

FIG. 30 shows a table setting forth lengthening (positive) or shortening (negative) percentage change at resection gap at different hinge positions after reduction using a 15 mm hinge.

FIG. 31 shows a table setting forth lengthening (positive) or shortening (negative) percentage change at resection gap at different hinge positions after reduction using a 30 mm hinge.

FIGS. 34A, 34B, 34C, and 34D show various views of a geared dual-axis hinge.

FIGS. 35A and 35B show views of a uniplanar clamp.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
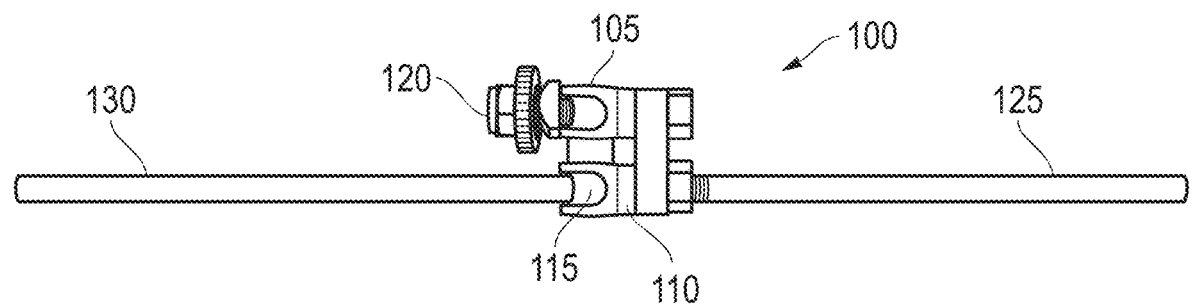
FIGS. 1A, 1B, and 1C show a stabilizer assembly.
Figure 1B:
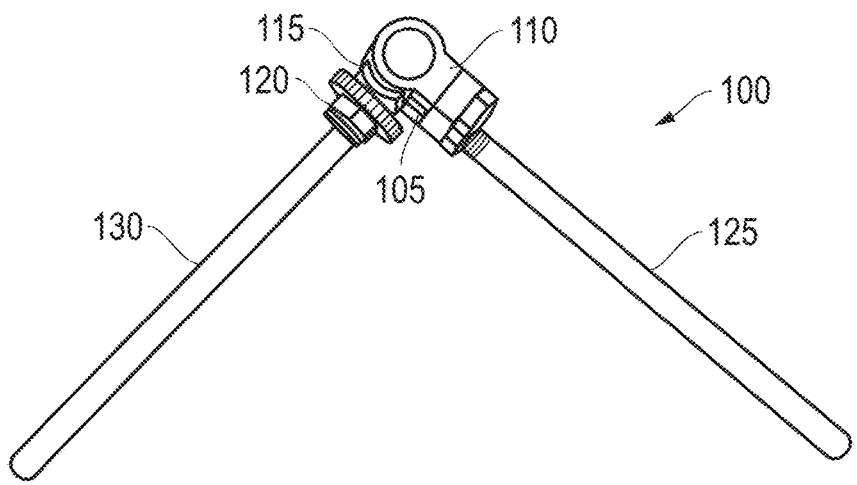

FIGS. 1A and 1B show an embodiment of the present invention which prevents compression, distraction, or translation of the spinal cord during a vertebral resection surgery, the stabilizer assembly 100. FIG. 1A shows a side view and FIG. 1B shows a top view. The stabilizer assembly 100 includes the hinge 105, which includes rod-bearing leaves 110 and 115 and hinge locking mechanism 120. The rod-bearing leaf 115 is rotatably coupled to the rod-bearing leaf 110 to allow coronal or sagittal freedom of movement, or both, depending on the orientation of the stabilizer assembly relative to the spine. Hinge locking mechanism 120 is used to lock the rod-bearing leaves 110 and 115 at a desired angle. Stabilizing rods 125 and 130 are coupled to the rod-bearing leaves 110 and 115, via, e.g., threaded portions of the stabilizing rods 125 and 130 nearest the hinge 105. The stabilizing rod 125, the stabilizing rod 130, or both are threaded and adjustment nuts are mounted on the stabilizing rod 125, the stabilizing rod 130, or both to provide longitudinal freedom of movement.

Figure 1C:
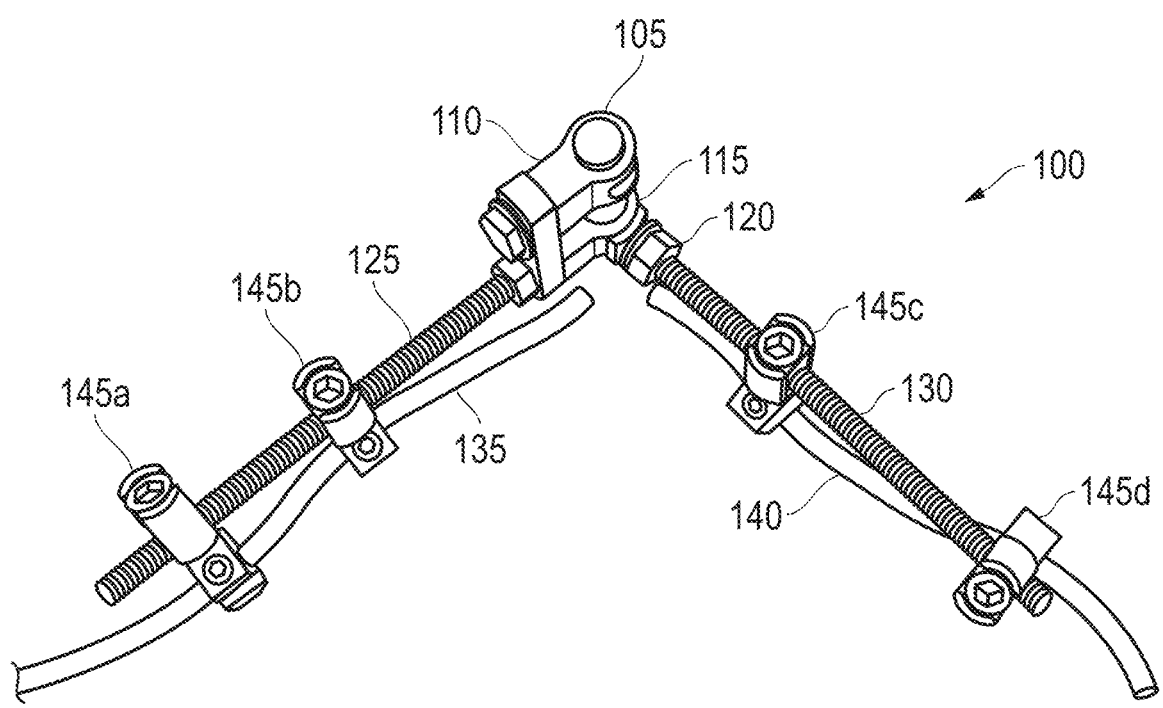

FIG. 1C shows the stabilizer assembly 100 of the present invention coupled to the spinal rods 135 and 140, which may be straight or curved. FIG. 1C shows the hinge 105 with the rod-bearing leaves 110 and 115, the locking mechanism 120, the stabilizing rods 125 and 130, and four links 145a, 145b, 145c, and 145d. The links 145a, 145b, 145c, and 145d are coupled to the spinal rods 135 and 140. The links 145a, 145b, 145c, and 145d represent a number of embodiments of links of the present invention, including monoaxial and polyaxial links described herein.

Figure 2A:
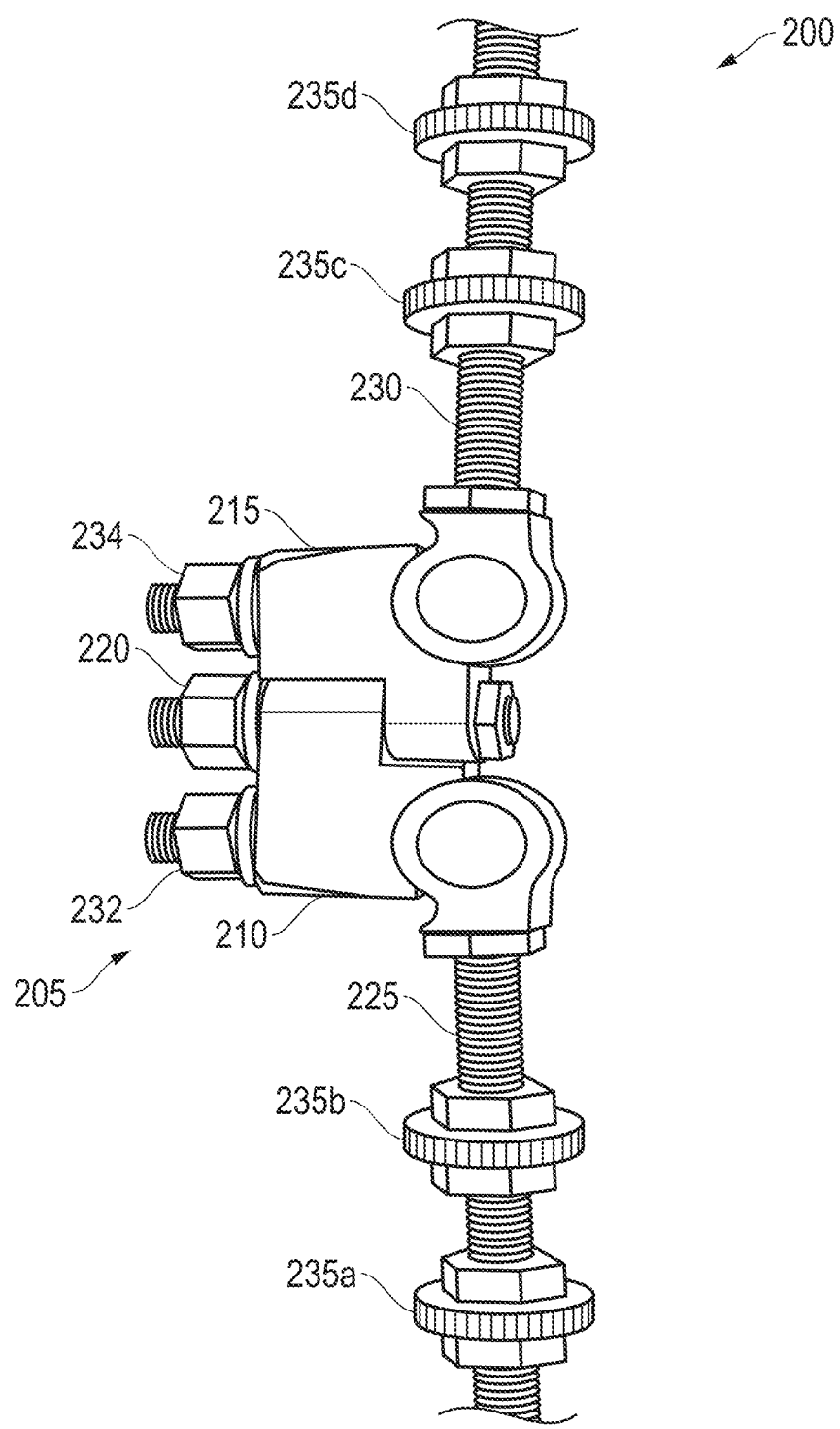
FIG. 2A shows another stabilizer assembly.

FIG. 2A depicts another embodiment of the present invention which prevents compression, distraction, or translation of the spinal cord during a vertebral resection surgery, the stabilizer assembly 200. The stabilizer assembly includes the hinge 205, which is configured to allow coronal or sagittal freedom of movement, or both, of the stabilizer assembly, depending on the orientation of the stabilizer assembly relative to the spine. Rod-bearing leaves 210 and 215 are rotatably coupled to allow coronal or sagittal freedom of movement, or both, depending on the orientation of the stabilizer assembly relative to the spine. Hinge locking mechanism 220 is used to lock the rod-bearing leaves 210 and 215 at a desired angle. Stabilizing rods 225 and 230, which are threaded on at least a portion of their respective lengths, are coupled to the rod-bearing leaves 210 and 215, via, e.g., threaded portions at the ends of the stabilizing rods 225 and 230 nearest the hinge 205. The stabilizing rods 225 and 230 are rotatably coupled to the rod-bearing leaves 210 and 215 such that they have freedom of movement with axes of rotation that are at right angles to a plane formed when the rod-bearing leaves 210 and 215 form a 180-degree angle. Locking mechanisms 232 and 234 are used to lock the stabilizing rods 225 and 230, respectively, at desired positions. The stabilizing rods 225 and 230 are threaded and carry exemplary adjustment nuts 235a, 235b, 235c, and 235d to move links (not shown) longitudinally on the stabilizing rods 225 and 230, allowing longitudinal freedom of movement along the stabilizing rods 225 and 230. The adjustment nuts 235a, 235b, 235c, and 235d can be used to lock links in place on the stabilizing rods 225 and 230.

Figure 2B:
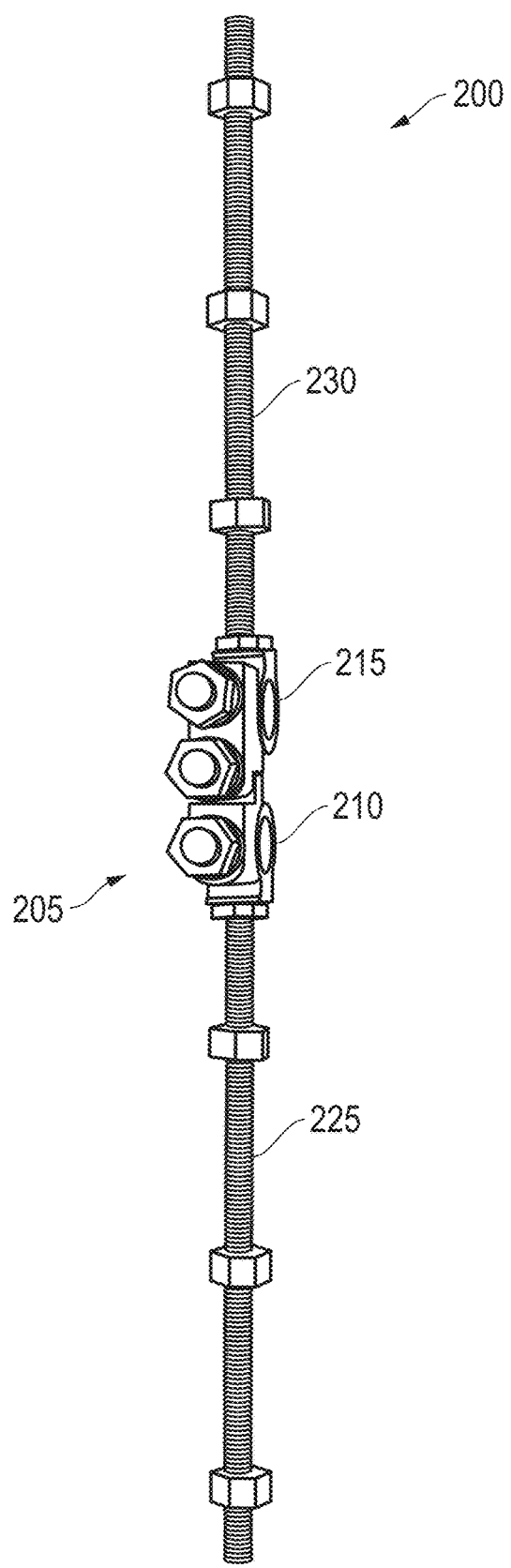
FIGS. 2B, 2C, and 2D illustrate top views of the stabilizer assembly of FIG. 2A.
Figure 2C:
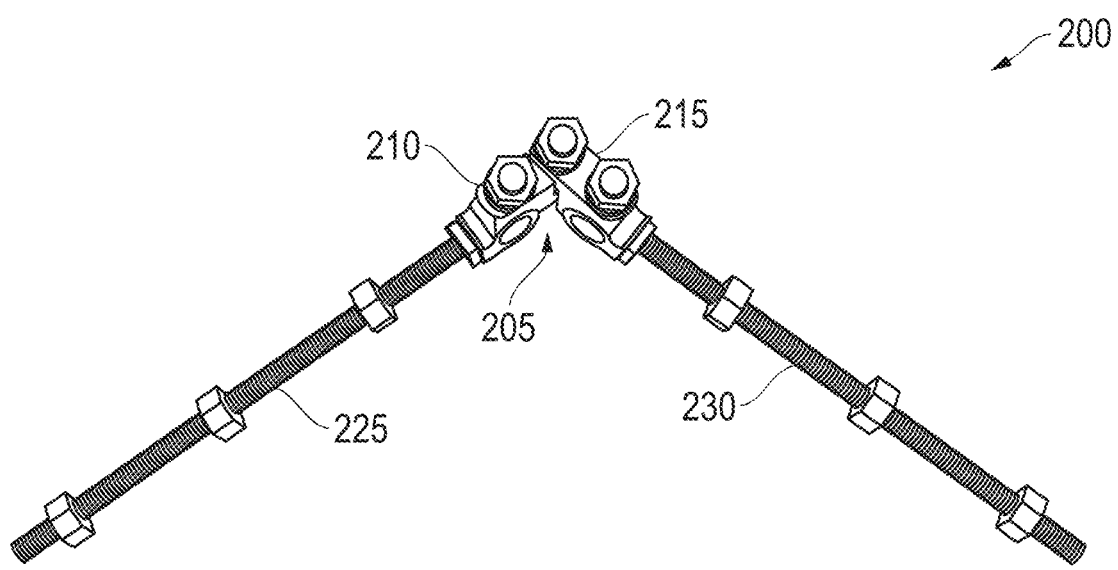
Figure 2D:
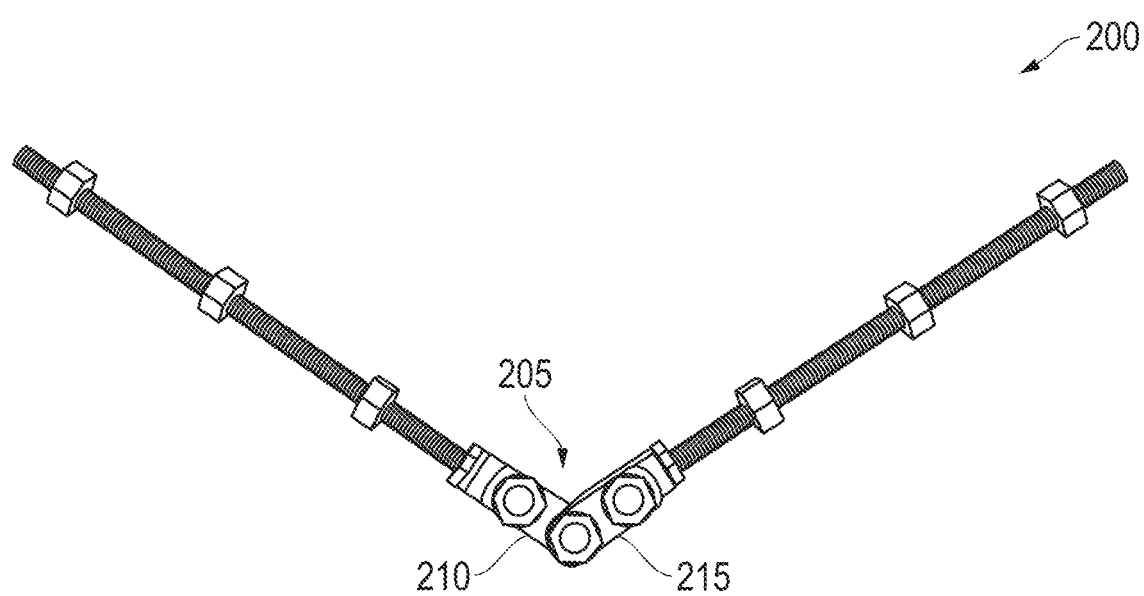

FIG. 2B shows a top view of the stabilizer assembly 200 with the rod-bearing leaves 210 and 215 of the hinge 205 set at a 180-degree angle. FIGS. 2C and 2D depict top views of the stabilizer assembly 200 with the rod-bearing leaves 210 and 215 of the hinge 205 set at different angles to provide examples of the coronal freedom of motion allowed by the hinge 205.

Figure 2E:
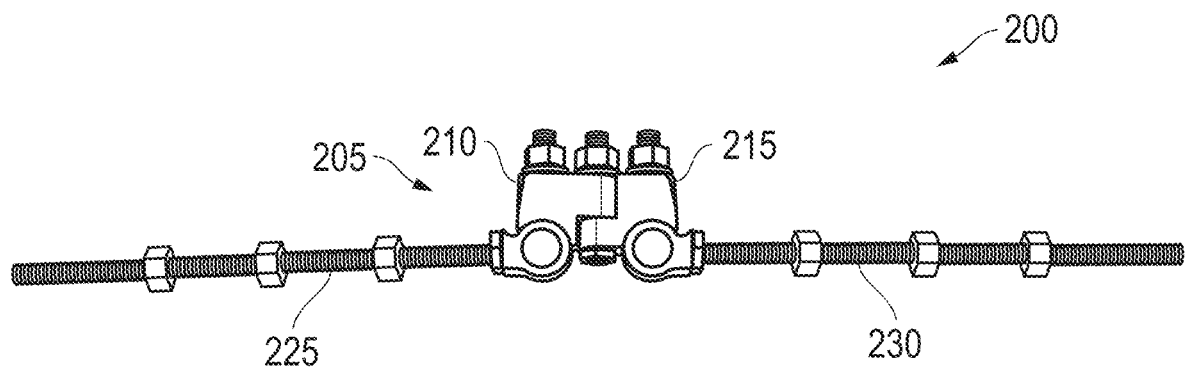
FIGS. 2E, 2F, and 2G illustrate perspective views of the stabilizer assembly of FIG. 2A.
Figure 2F:
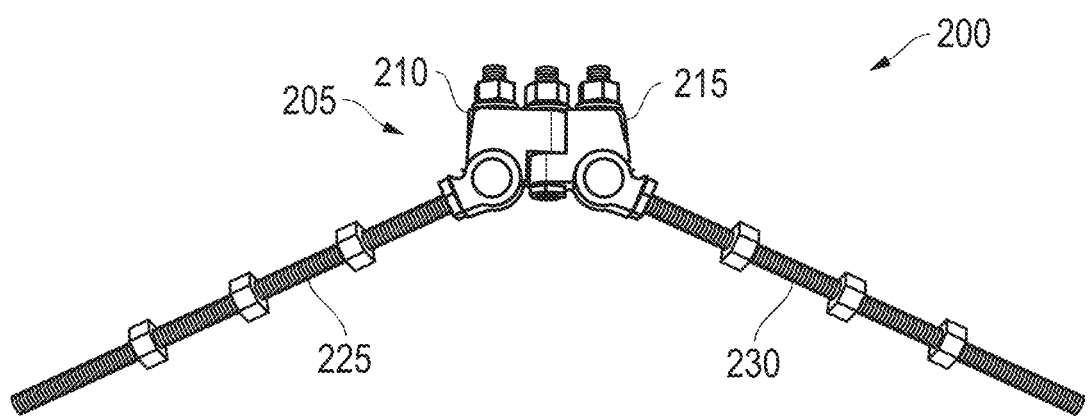
Figure 2G:
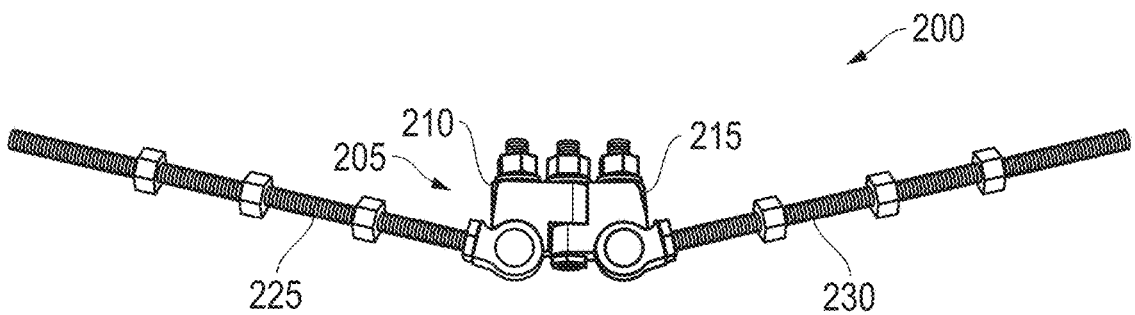

FIG. 2E shows a lateral view of the stabilizer assembly 200 with the rod-bearing leaves 210 and 215 of the hinge 205 set at a 180-degree angle and the stabilizing rods 225 and 230 aligned with each other. FIGS. 2F and 2G depict lateral views of the stabilizer assembly 200 with the rod-bearing leaves 210 and 215 of the hinge 205 set a 180-degree angle and the stabilizing rods 225 and 230 set at different angles to provide examples of the sagittal freedom of motion of the stabilizing rods 225 and 230.

Figure 2H:
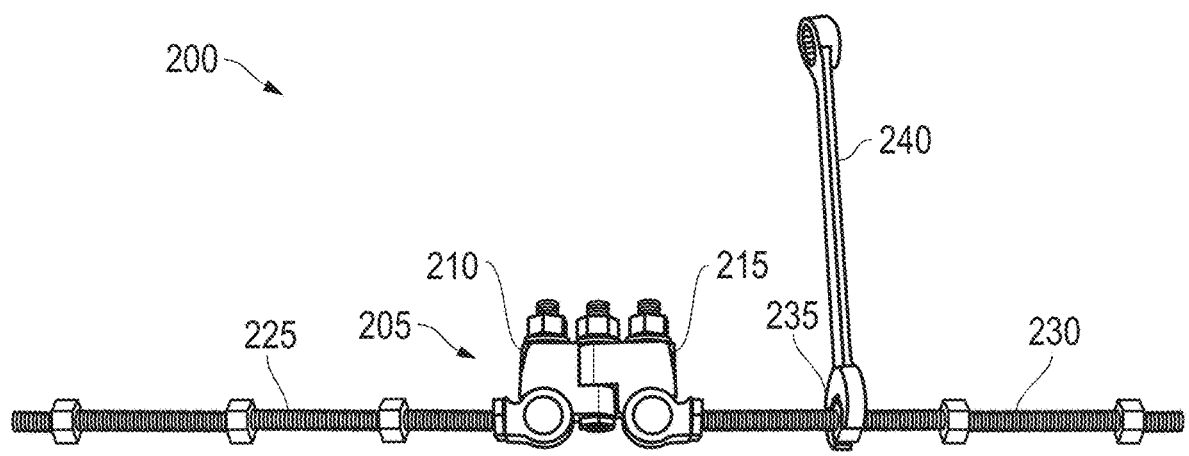
FIG. 2H depicts a view of the stabilizer assembly of FIG. 2A with a wrench to adjust adjustment nuts.

FIG. 2H shows a lateral view of the stabilizer assembly 200 with the rod-bearing leaves 210 and 215 of the hinge 205 set at a 180-degree angle and the stabilizing rods 225 and 230 aligned with each other, with a wrench 240 positioned to adjust an adjustment nut 235 to move it longitudinally on the stabilizing rod 230 to position a link (not shown) on the stabilizing rod 230.

Figure 2I:
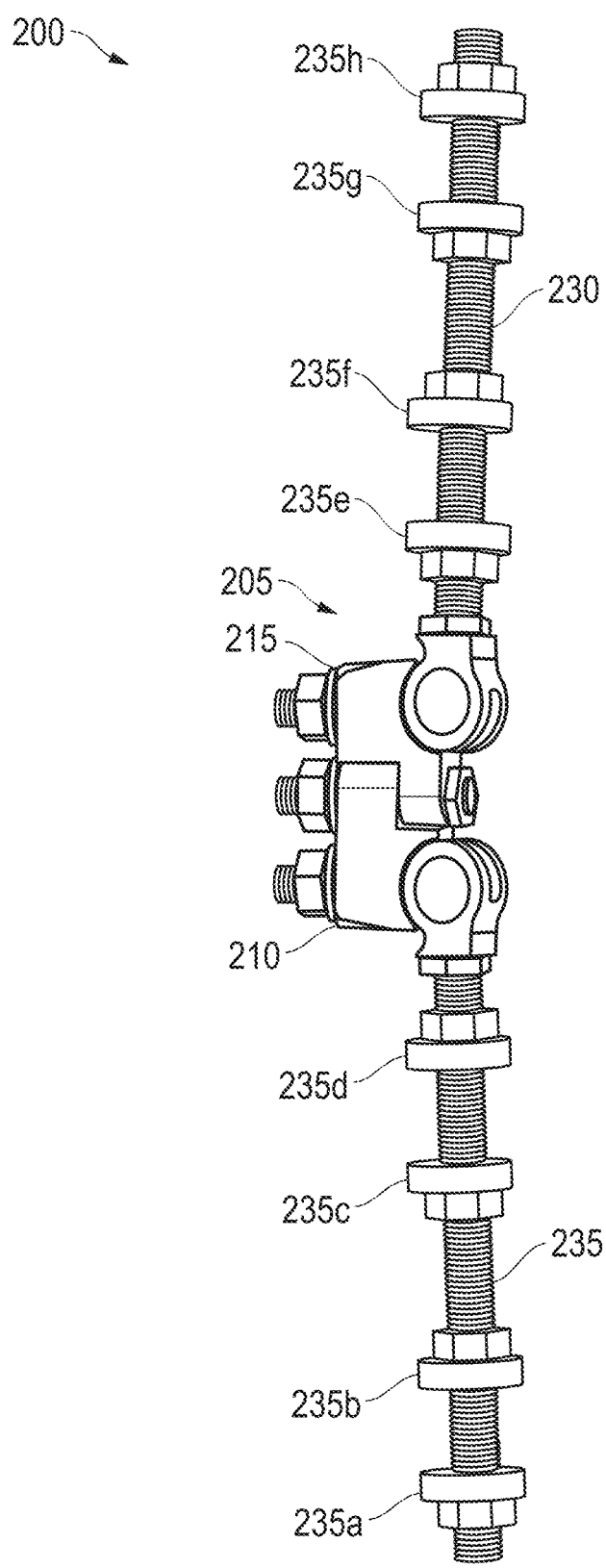
FIG. 2I shows a lateral view of the stabilizer assembly of FIG. 2A.

FIG. 2I shows a lateral view of the stabilizer assembly 200 with the rod-bearing leaves 210 and 215 of the hinge 205 set at a 180-degree angle and the stabilizing rods 225 and 230 aligned with each other, with eight exemplary adjustment nuts 235a, 235b, 235c, 235d, 235e, 235f, 235g, and 235h, four on each of the stabilizing rods 225 and 230. The adjustment nuts can be made from any material such as metal, polymers, composites, etc.

Figure 3A:
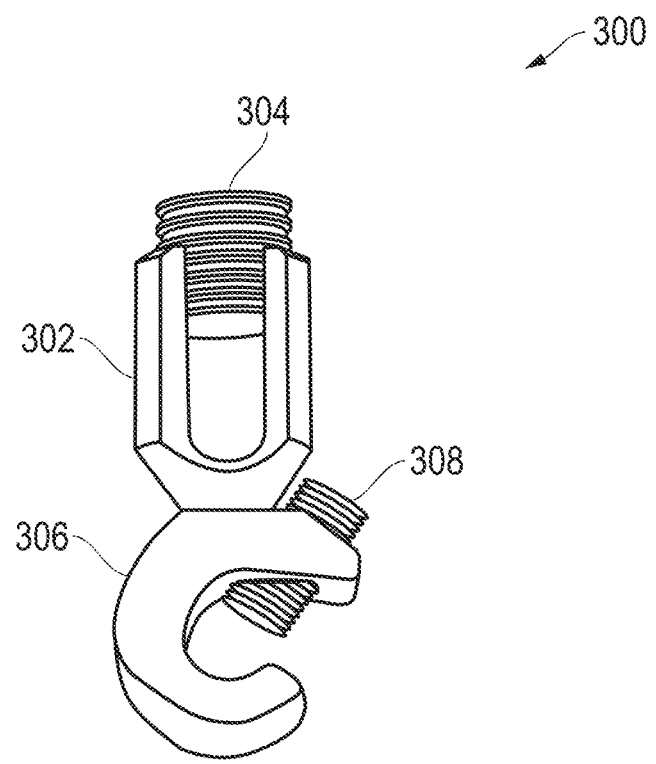
FIG. 3A shows a monoaxial link.

FIG. 3A shows a monoaxial link 300 of the present invention. FIG. 3A illustrates a monoaxial link 300 of the present invention. A plurality of links 300 may be movably coupled to one or both of the stabilizing rods 125 and 130 (not shown), at the upper end 302 of each link 300. Each link 300 can be positioned as desired on a stabilizing rod 125 or 130 using, e.g, a set-screw 304, to lock it into position. Each link 300 is movably couplable to a spinal rod (not shown) that is fixed to a spine using, e.g., bone screws, at the lower end 306 of each link 300. Each link 300 can be positioned as desired on spinal rod using, e.g, a set-screw 308, to lock it into position.

Figure 3B:
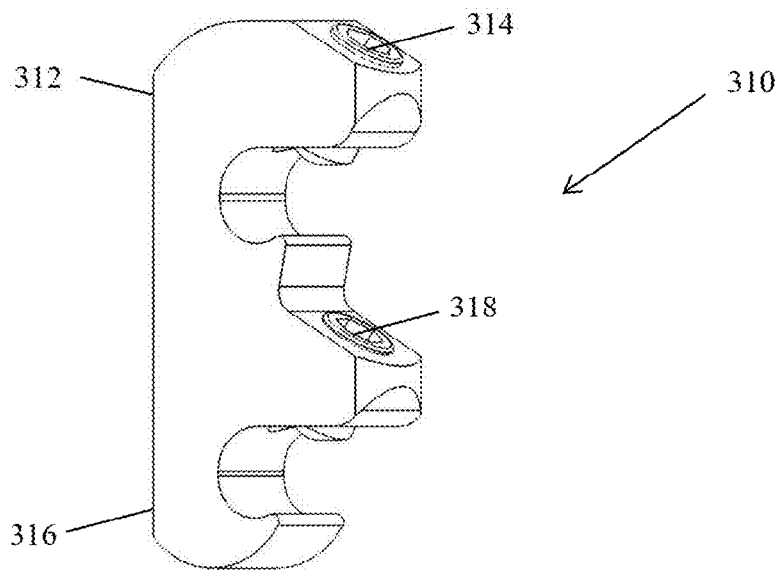
FIG. 3B shows another monoaxial link.

FIG. 3B illustrates another monoaxial link 310 of the present invention. A plurality of links 310 may be movably coupled to one or both of the stabilizing rods 125 and 130 (not shown), at the upper end 312 of each link 310. Each link 310 can be positioned as desired on a stabilizing rod 125 or 130 using, e.g, a set-screw 314, to lock it into position. Each link 310 is movably couplable to a spinal rod (not shown) that is fixed to a spine using, e.g., bone screws, at the lower end 316 of each link 310. Each link 310 can be positioned as desired on spinal rod using, e.g, a set-screw 318, to lock it into position.

Figure 3C:
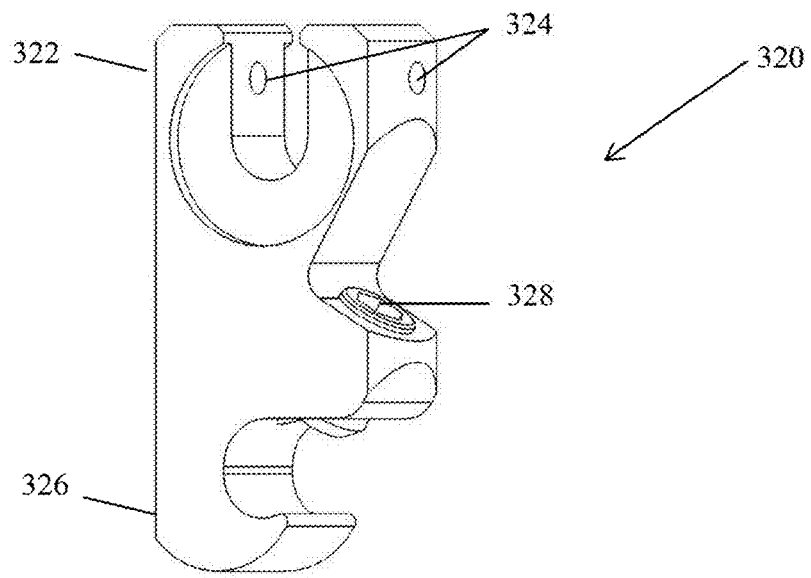
FIG. 3C shows still another monoaxial link.

FIG. 3C illustrates still another monoaxial link 320 of the present invention. A plurality of links 320 may be movably coupled to one or both of the stabilizing rods 125 and 130 (not shown), at the upper end 322 of each link 320. Each link 320 can be positioned as desired on a stabilizing rod 125 or 130 using, e.g, a locking pin (not shown) set in place through holes 324, to retain the link 320 on the stabilizing rod 125 or 130 (not shown). Each link 320 is movably couplable to a spinal rod (not shown) that is fixed to a spine using, e.g., bone screws, at the lower end 326 of each link 320. Each link 320 can be positioned as desired on spinal rod using, e.g, a set-screw 328, to lock it into position.

Figure 3D:
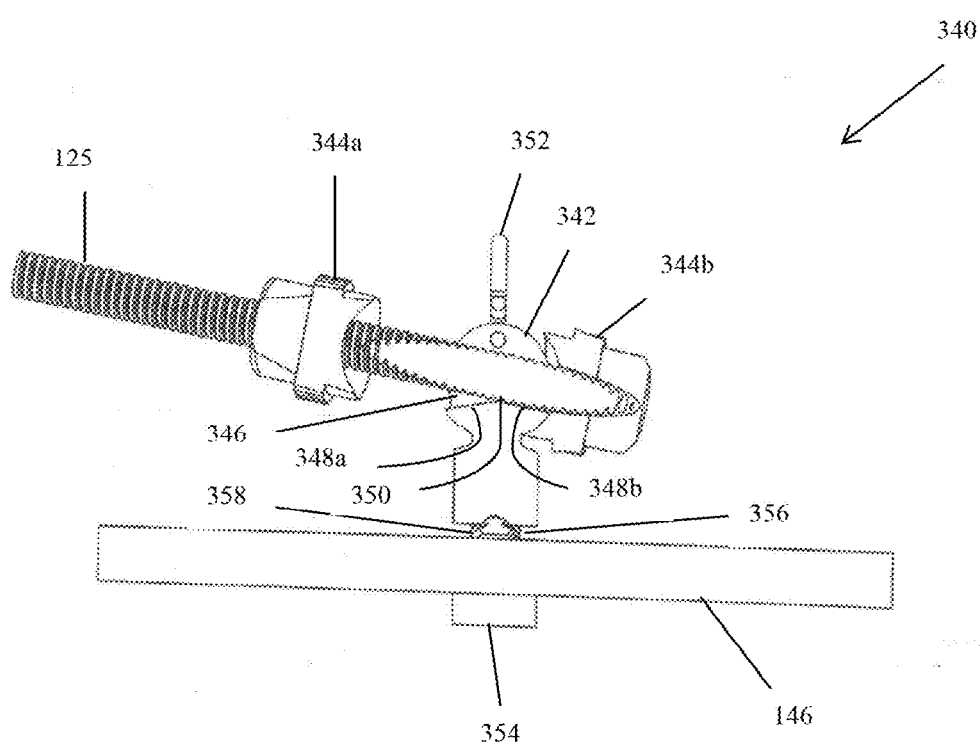
FIG. 3D shows a cross-section of a polyaxial link.

FIG. 3D shows a cross-section, and FIGS. 3E, 3F, 3G, and 3H show perspective views of a polyaxial link 340 of the present invention, with each figure showing one or more features of the polyaxial link 340 in various configurations. Each of a plurality of polyaxial links 340 is movably coupled to one of the stabilizing rods 125 and 130 (of which stabilizing rod 125 is shown and stabilizing rod 130 is not shown), at the upper portion 342 of each polyaxial link 340. Each polyaxial link 340 can be positioned as desired on a stabilizing rod 125 or 130 (130 not shown) using e.g., a pair of adjustment nuts 344a and 344b, shaped to match the shape of the upper portion 342, to lock it into position. These adjustment nuts 344a and 344b, and similar ones elsewhere on the threaded stabilizing rod 125 or 130 (130 not shown), can be locked and unlocked multiple times without damaging the adjustment nut threads or the stabilizing rod threads. The upper portion 342 of polyaxial link 340 is spherically shaped with a recess 346 shaped to receive a stabilizing rod 125 or 130 (130 not shown). The recess 346 is wider than the stabilizing rod 125 or 130 (130 not shown), and the bottom of the recess 346 includes two ramped portions 348a and 348b meeting at an apex 350. When the polyaxial link 340 is positioned on a stabilizing rod 125 or 130 (130 not shown), the stabilizing rod 125 or 130 (130 not shown) contacts at least the apex 350, which keeps the stabilizing rod 125 or 130 (130 not shown) centered in the recess 346, while the width of the recess 346 and the ramps 348a and 348b permit the polyaxial link 340 to be set at an angle to an axis of the stabilizing rod 125 or 130 (130 not shown) up a limit of, e.g., 10, 15, 20, 25, 30, 35, 40, 45, or more degrees, in any direction. When the stabilizing rod 125 or 130 (130 not shown) is at the desired angle in the recess 346 and the polyaxial link 340 is at the desired position on the stabilizing rod 125 or 130 (130 not shown), the adjustment nuts 344a and 344b can be used to lock the polyaxial link 340 in place. A locking pin 352 may also be used to further secure the stabilizing rod 125 or 130 (130 not shown) in place. The lower portion 354 of the polyaxial link 340 has a recess 356 shaped to receive a spinal rod 146, which is attached to the patient's spine (not shown). Each polyaxial link 340 can be positioned at a desired location on the spinal rod 146 and locked into place using, e.g., a set screw 358.

Figure 3E:
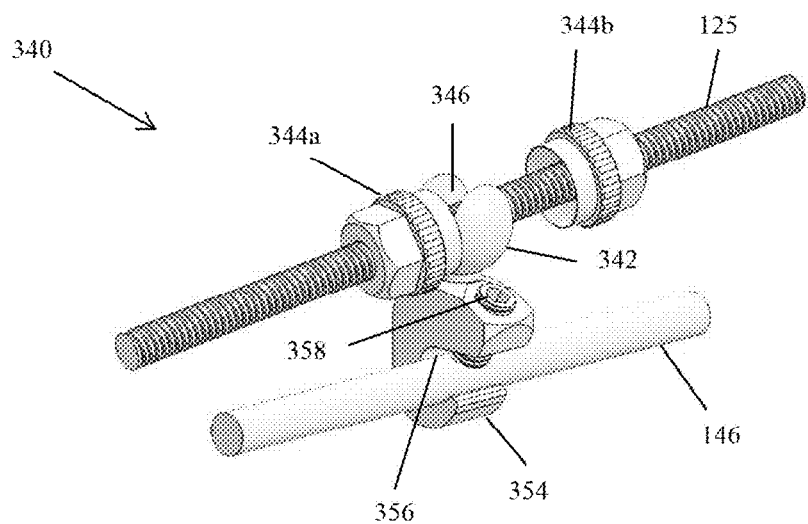
FIGS. 3E, 3F, 3G, and 3H show perspective views of the polyaxial link of FIG. 3D.
Figure 3F:
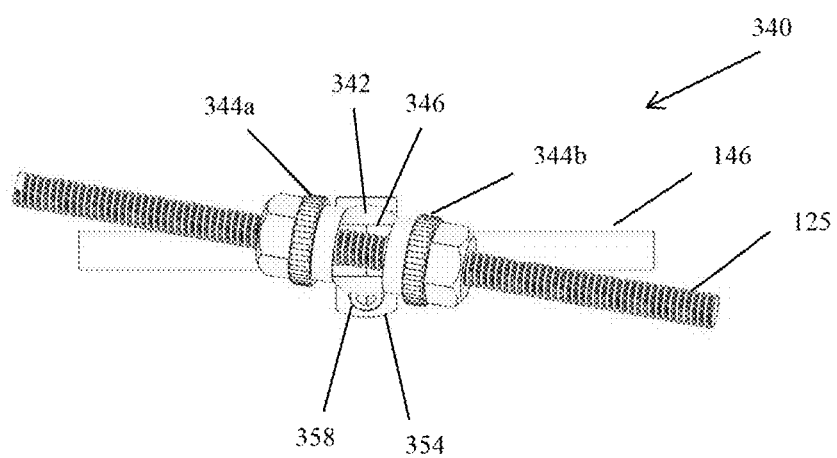
Figure 3G:
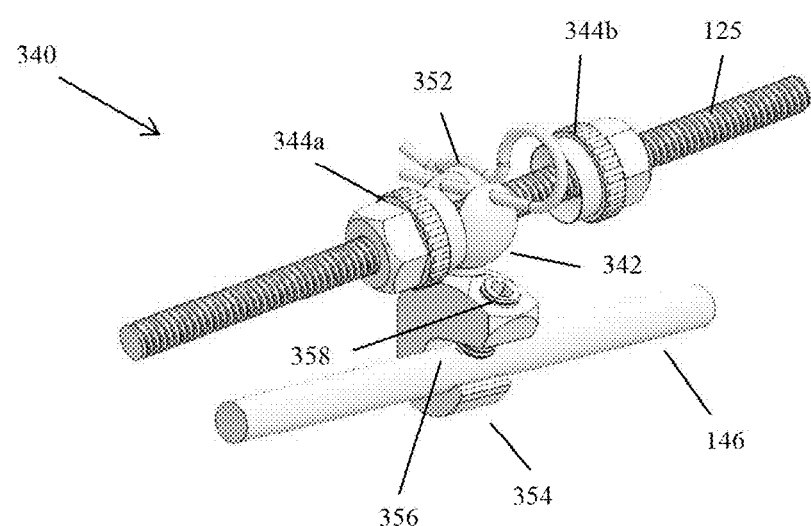
Figure 3H:
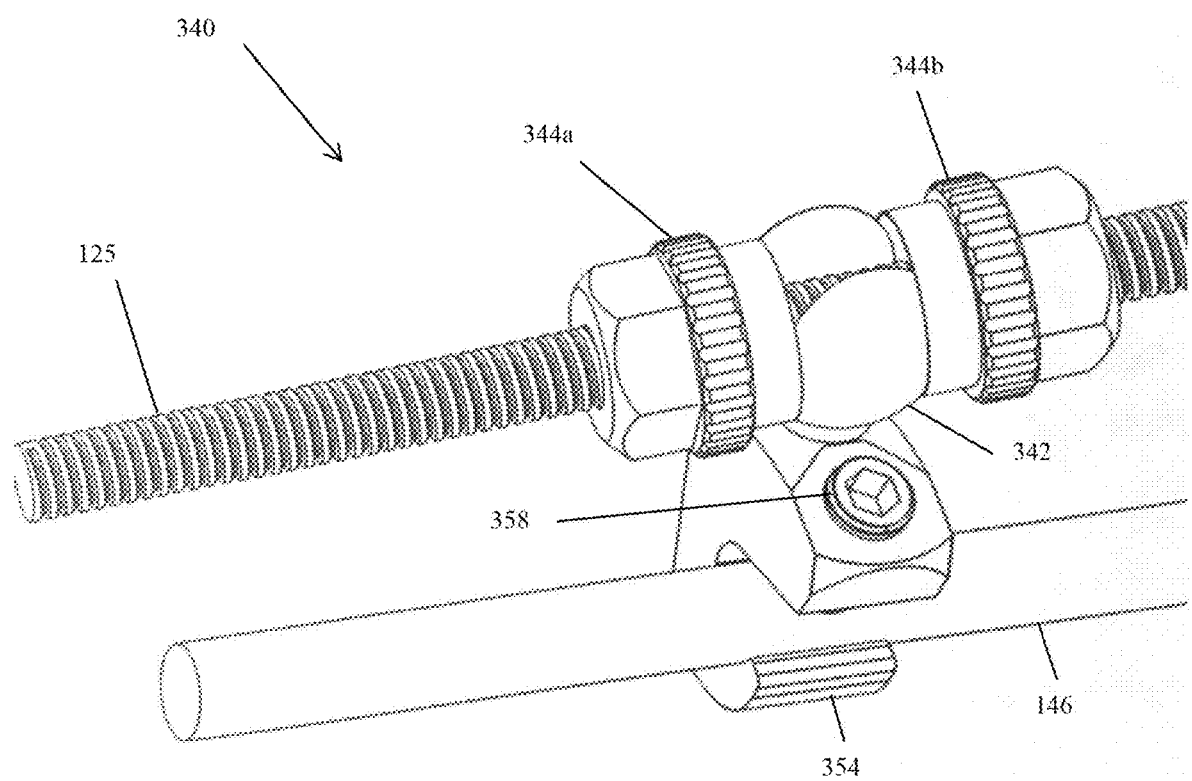

FIG. 3E illustrates the polyaxial link 340 with the adjustment nuts 344a, 344b disengaged. FIG. 3F shows the polyaxial link 340 from the top, with adjustment nuts 344a and 344b engaged, and locked into a position at an angle to the stabilizing rod 125. FIG. 3G illustrates the polyaxial link 340 with the adjustment nut 344a engaged and adjustment nut 344b disengaged and a locking pin 352 in place. FIG. 3H illustrates the polyaxial link 340 with the adjustment nuts 344a, 344b engaged.

Figure 3I:
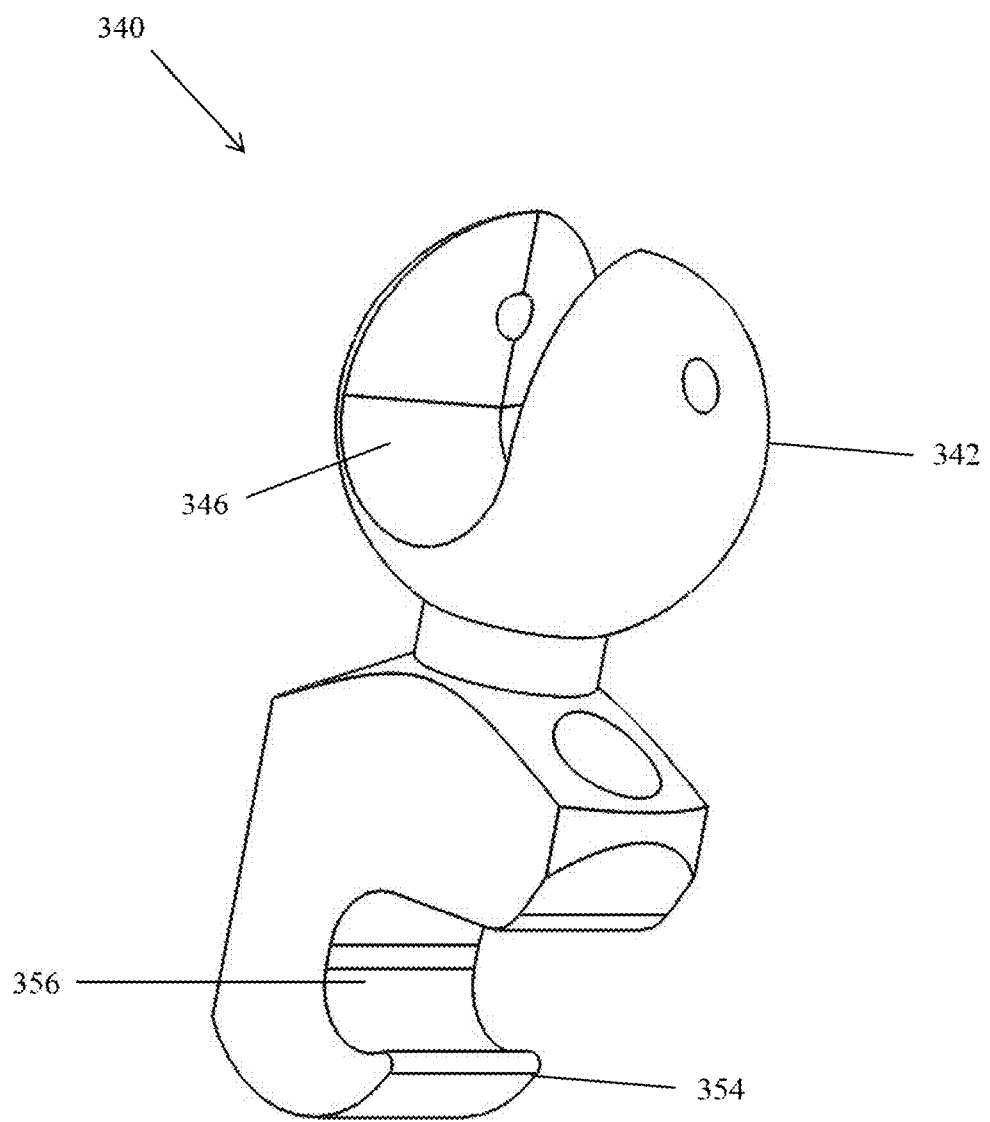
FIG. 3I shows a perspective view of another polyaxial link.

FIG. 3I shows a perspective view of the polyaxial link 340, showing the upper section 342, the recess 346, the lower portion 354, and the recess 356.

Figure 3J:
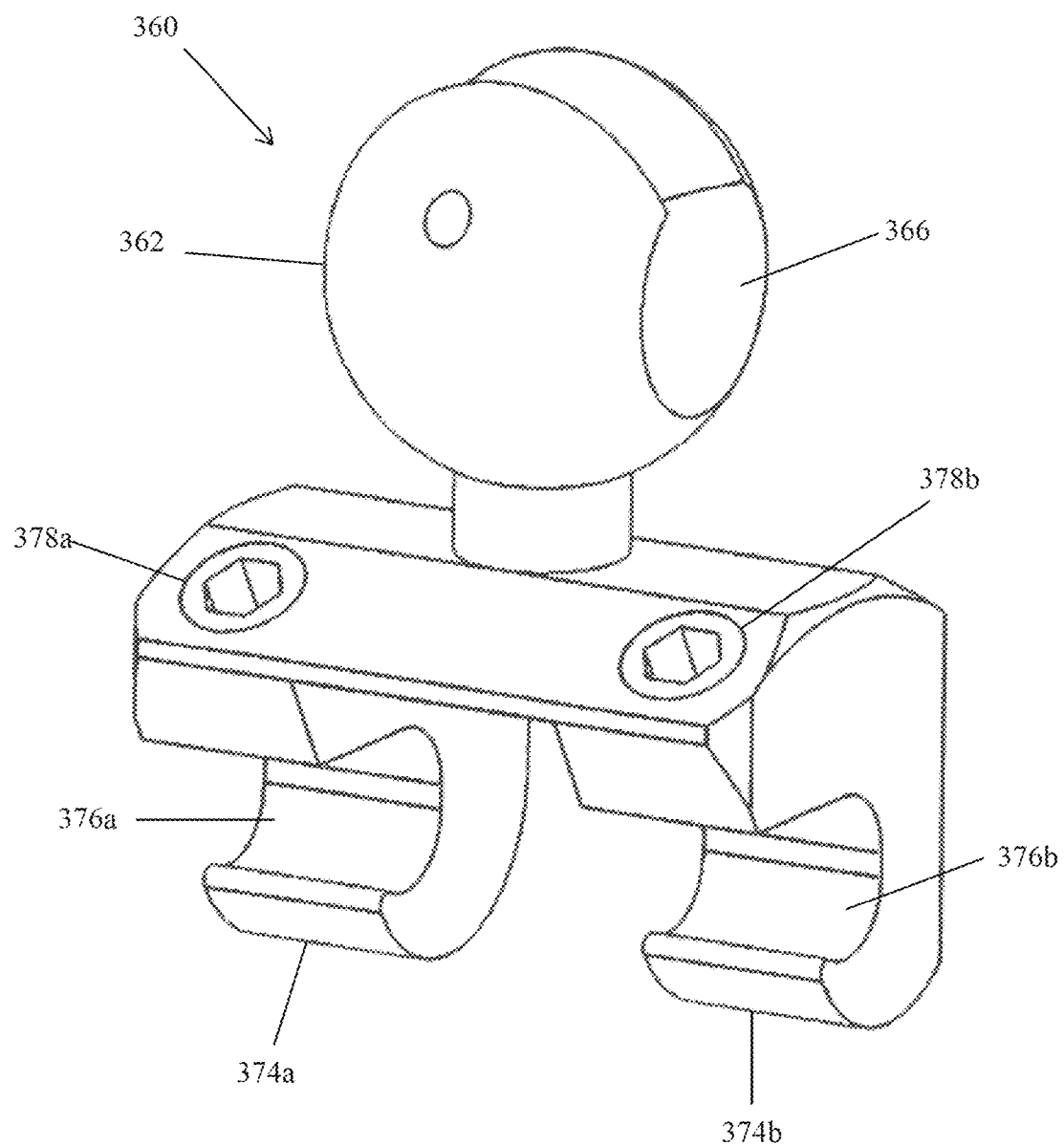
FIG. 3J shows a perspective view of still another polyaxial link

FIG. 3J shows a perspective view of the polyaxial link 360. The polyaxial link 360 is similar to the polyaxial link 340 except that the bottom end 374 of the polyaxial link 360 has two components or prongs, 374a and 374b. The prongs 374a and 374b have recesses 376a and 376b, respectively, shaped to receive spinal rod 146 (not shown), permitting engagement with a spinal rod 146 at two places. The polyaxial link 360 can be locked into place on spinal rod 146 using screws 378a and 378b. Engagement of the polyaxial link 360 with spinal rod 146 at two places provides increased stability of the polyaxial link 360 when engaged, compared to single-component or -prong polyaxial links such as the polyaxial link 340. Among other features of the polyaxial link 360, FIG. 3J shows the upper portion 362 of the polyaxial link 360, with a recess 366 shaped to receive stabilizing rod 125 or 130 (neither are shown). The components or prong similar to prongs 374a and 374b may also be used on the monoaxial links disclosed herein.

Figure 4A:
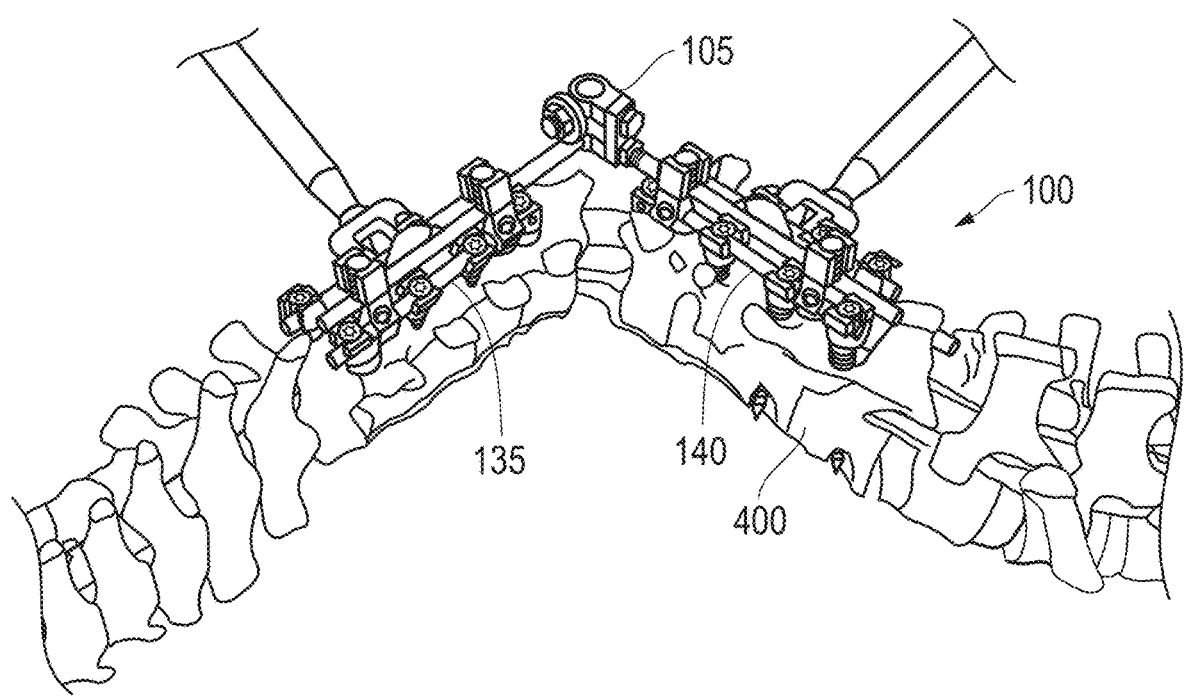
FIGS. 4A, 4B, and 4C illustrate the stabilizer assembly of FIGS. 1A, 1B, and 1C coupled to spinal rods, with the spinal rods attached to a simulated spine.
Figure 4B:
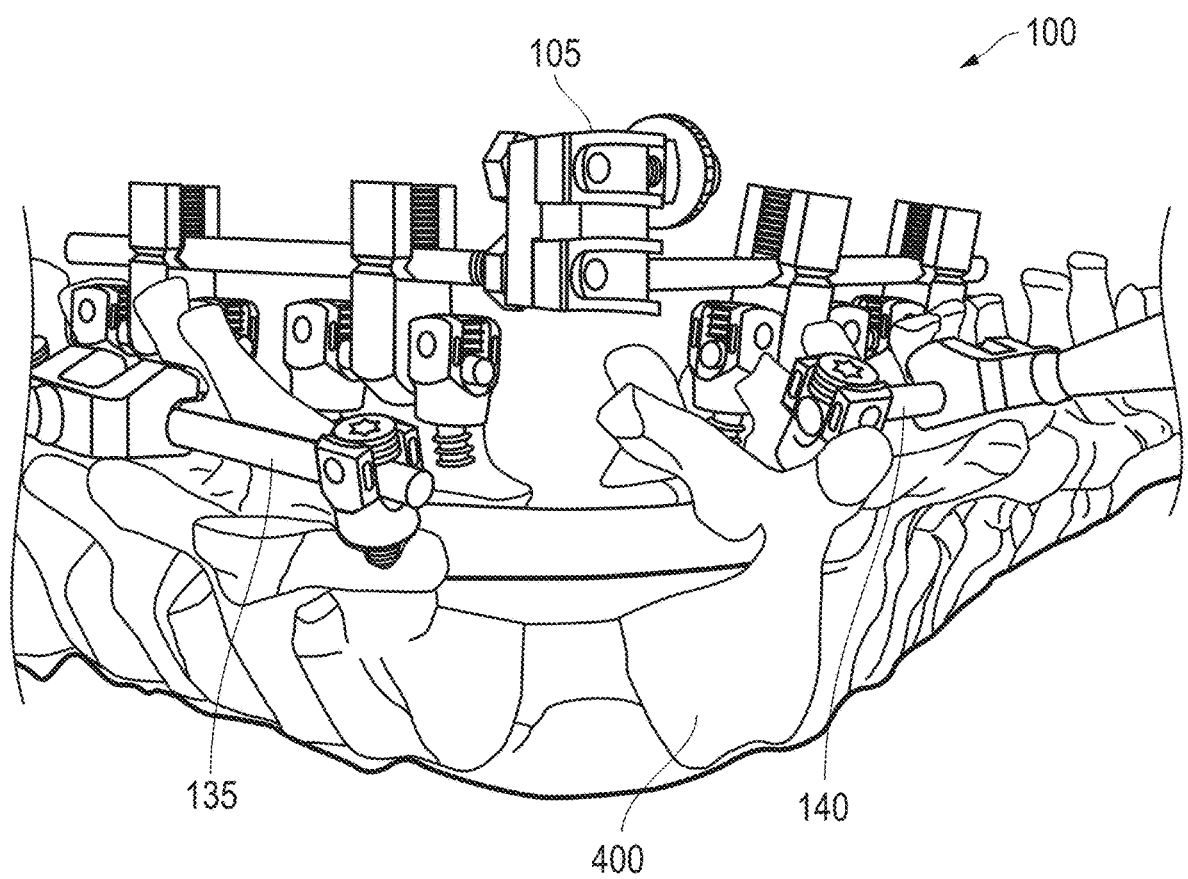
Figure 4C:
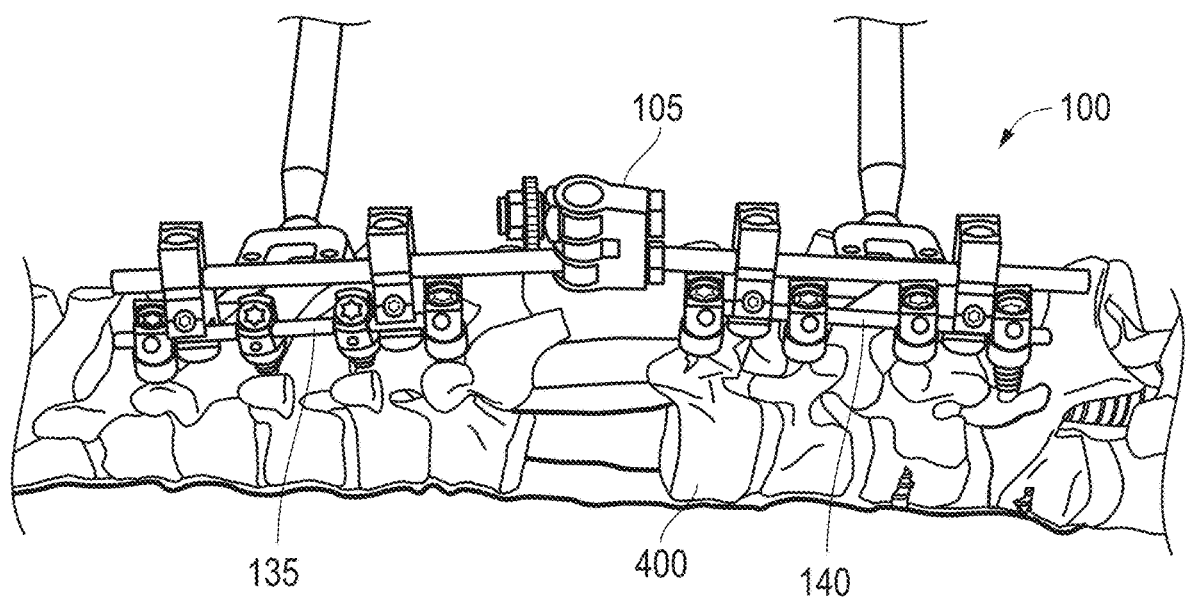

FIGS. 4A, 4B, and 4C illustrate the stabilizer assembly 100 of the present invention coupled to the spinal rods 135 and 140, with the spinal rods 135 and 140 attached to a simulated spine 400. FIGS. 4A and 4B illustrate the hinge 105 positioned at the apex of the spinal deformity, at which a VCR has been performed. FIG. 4C illustrate the hinge 105 positioned at the apex of the spinal deformity, at which the deformity has been corrected.

Figure 5A:
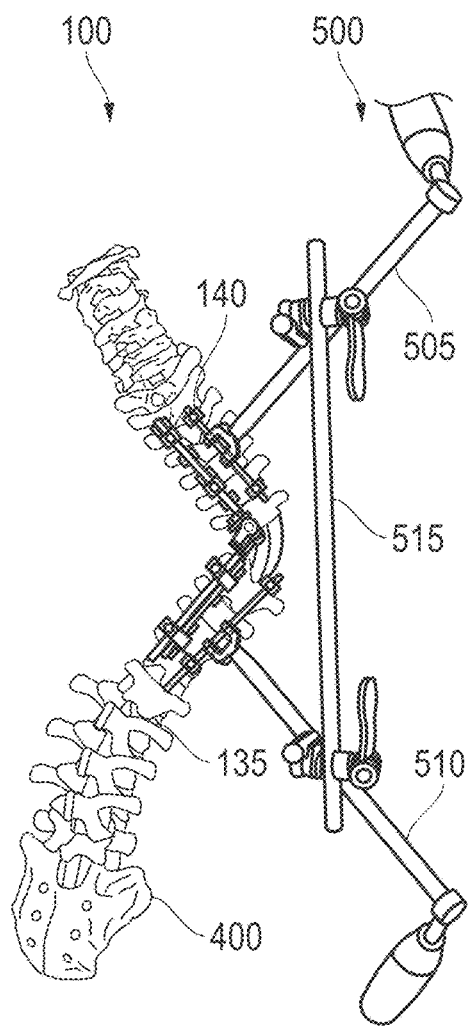
FIGS. 5A and 5B depicts the stabilizer assembly of FIGS. 1A, 1B, and 1C being used with a manipulator assembly.
Figure 5B:
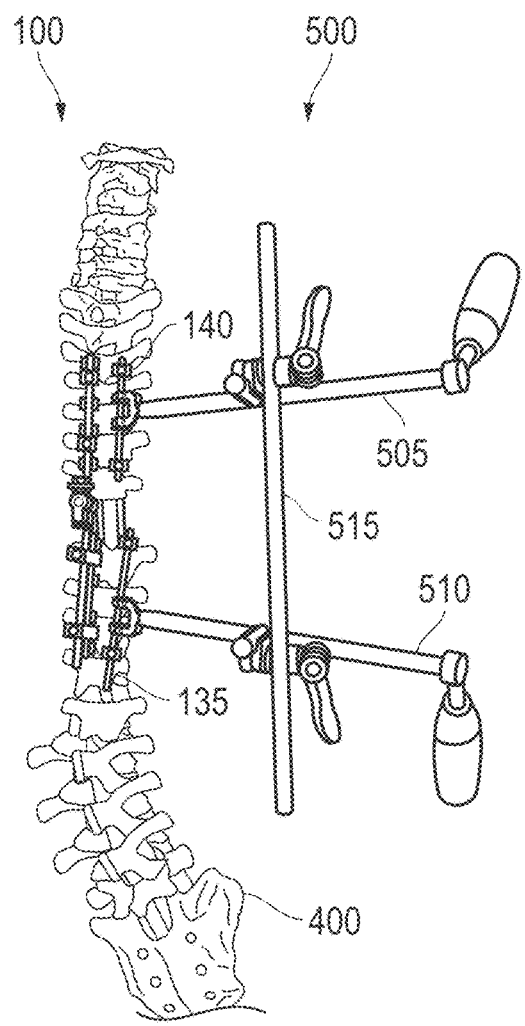

FIGS. 5A and 5B depict the stabilizer assembly 100 being used in conjunction with a manipulator assembly 500. FIGS. 5A and 5B illustrate how the stabilizer assembly 100 and the manipulator assembly 500 are used together to perform a spinal correction. Manipulator assembly 500 includes the handles 505 and 510 and the connecting rod 515. The connecting rod 515 is movably coupled by, e.g., one or more clamps or one or more screws, to the handles 505 and 510 to stabilize or fix the handles 505 and 510 relative to one another as desired. The handles 505 and 510 are couplable to spinal rods 135 and 140 to permit manipulation of the spine into a fixed configuration for the stabilizer assembly to maintain. FIGS. 5A and 5B show the manipulator assembly 500 coupled to two spinal rods 135 and 140, with the handles 505 and 510 in different relative positions and with the simulated spine 400 manipulated to two different desired configurations. The stabilizer assembly 100 is also shown.

Figure 6A:
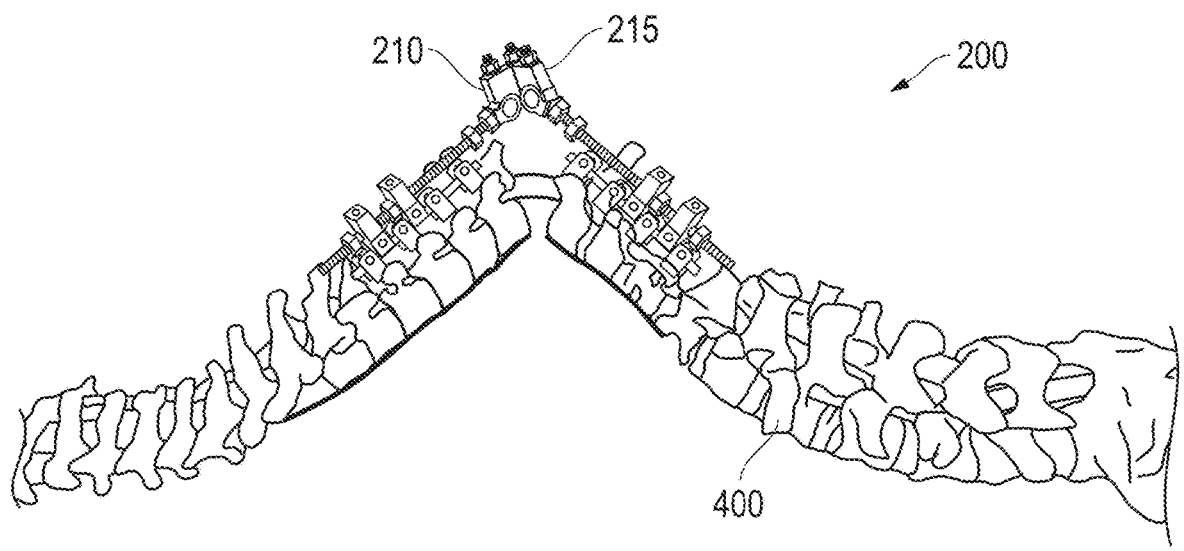
FIGS. 6A, 6B, and 6C show a coronal plane control correction, a sagittal plane control correction, and a longitudinal correction using the stabilizer assembly of FIG. 2A, respectively.
Figure 6B:
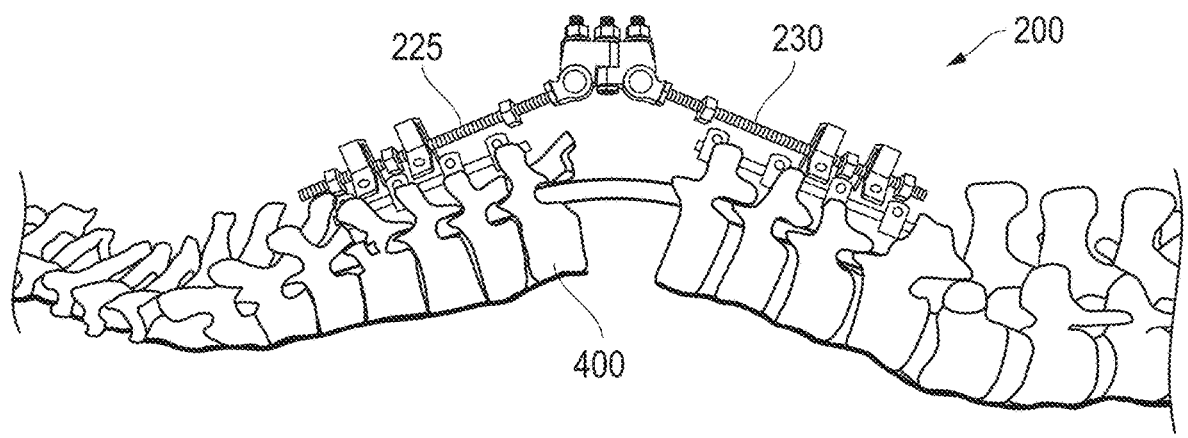
Figure 6C:
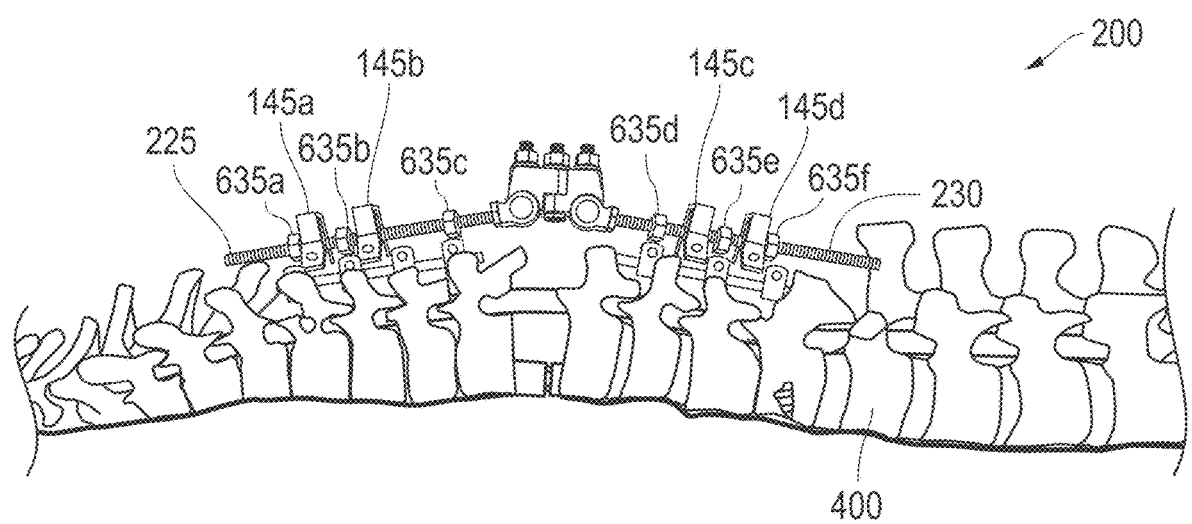

FIG. 6A depicts a coronal plane control correction using the stabilizer assembly 200. The rod-bearing leaves 210 and 215 are set at a desired angle to position the simulated spine 400 as desired. FIG. 6B depicts a sagittal plane control correction using the stabilizer assembly 200. The stabilizing rods 225 and 230 are set at desired positions to position the simulated spine 400 as desired. FIG. 6C depicts a longitudinal correction using the stabilizer assembly 200. The links 145a, 145b, 145c, and 145d are set at desired positions by the adjustment nuts 635a, 635b, 635c, 635d, 635e, and 635f.

Figure 6D:
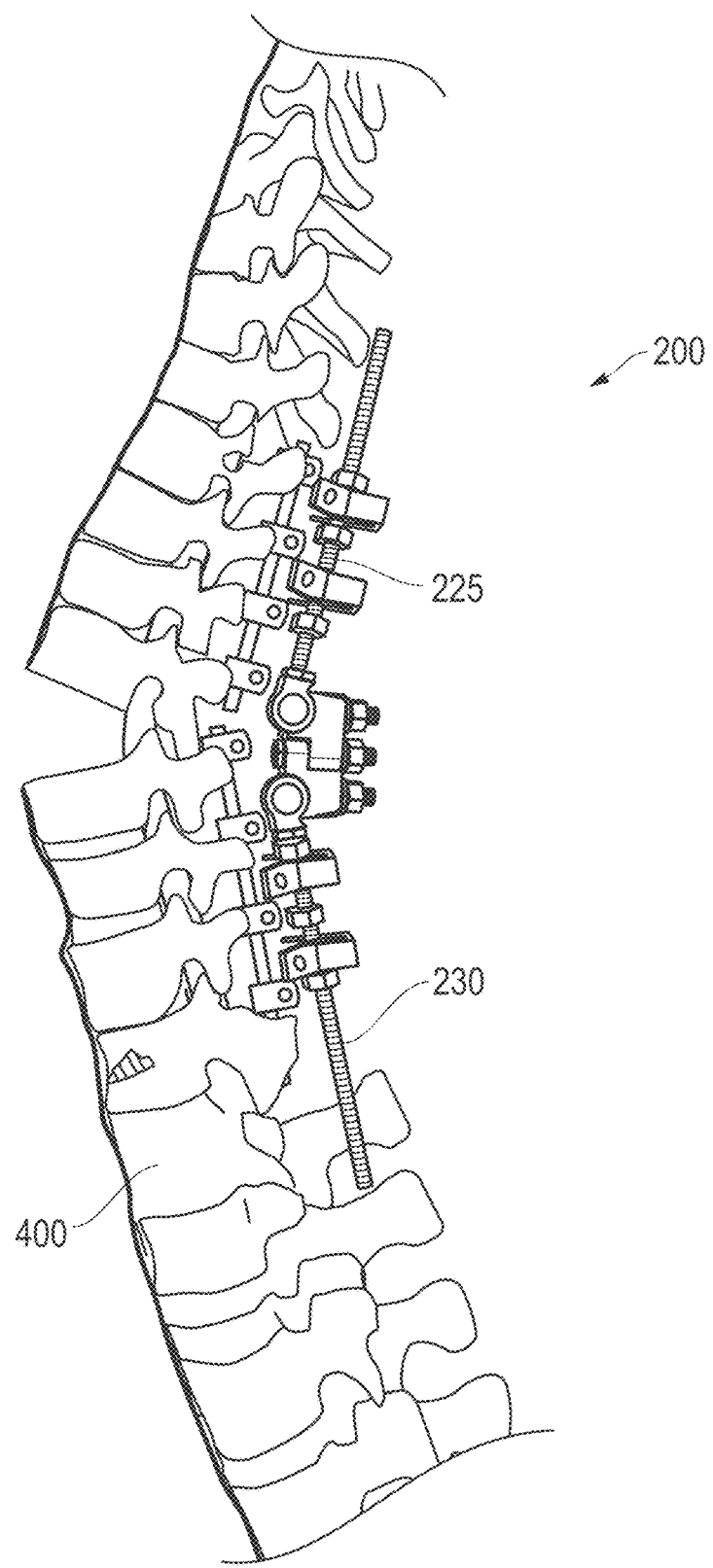
FIGS. 6D and 6E show two different sagittal plane control corrections using the stabilizer assembly of FIG. 2A.
Figure 6E:
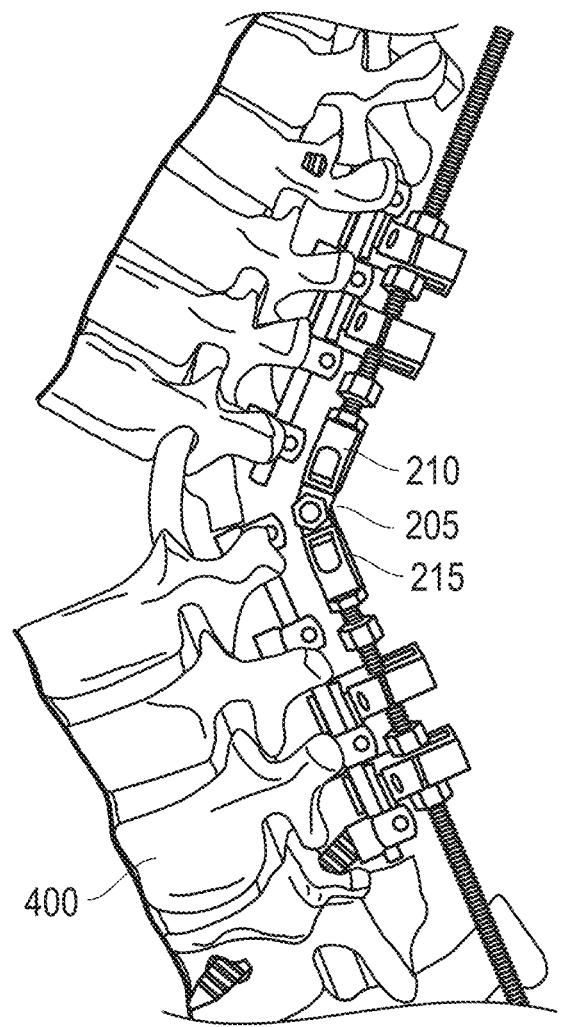
Figure 6F:
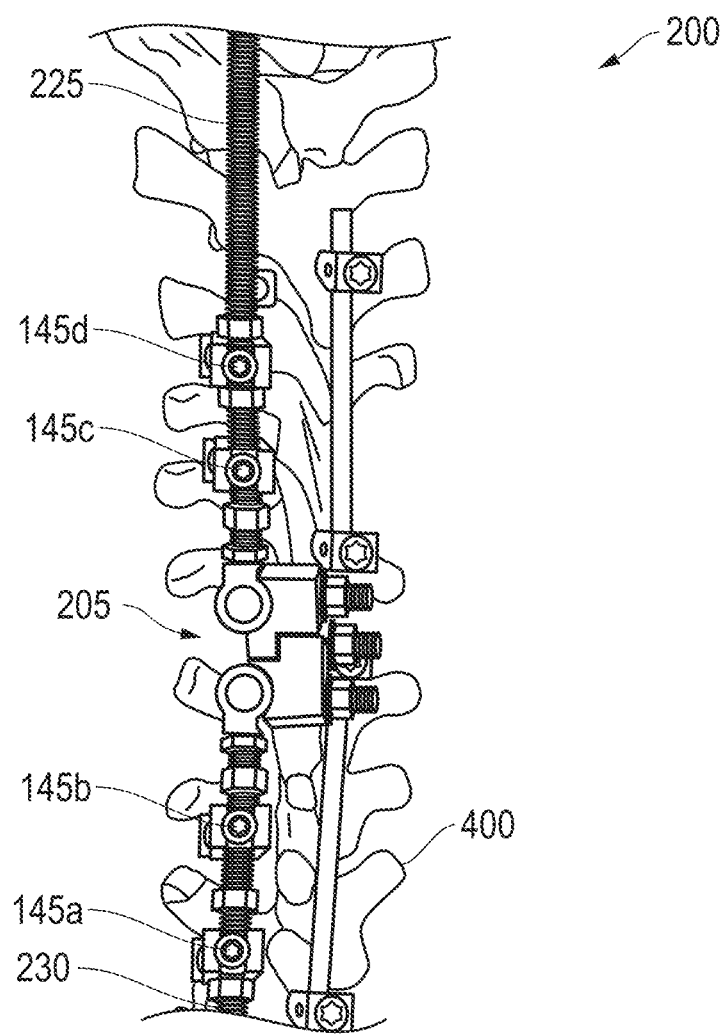
FIG. 6F illustrates a top view of the sagittal plane control correction of FIG. 6E.

FIG. 6D depicts a sagittal plane control correction using the stabilizer assembly 200. The stabilizing rods 225 and 230 are set at desired positions to position the simulated spine 400 as desired. FIG. 6E depicts a sagittal plane control correction using the stabilizer assembly 200. The stabilizer assembly 200 is rotated 90 degrees from the position shown in FIG. 6D to allow the hinge 205 to have sagittal freedom of motion. The rod-bearing leaves 210 and 215 of the hinge 205 are set at a desired angle to position the simulated spine 400 as desired. FIG. 6F depicts a top view of the sagittal plane control correction of FIG. 6E.

Figure 6G:
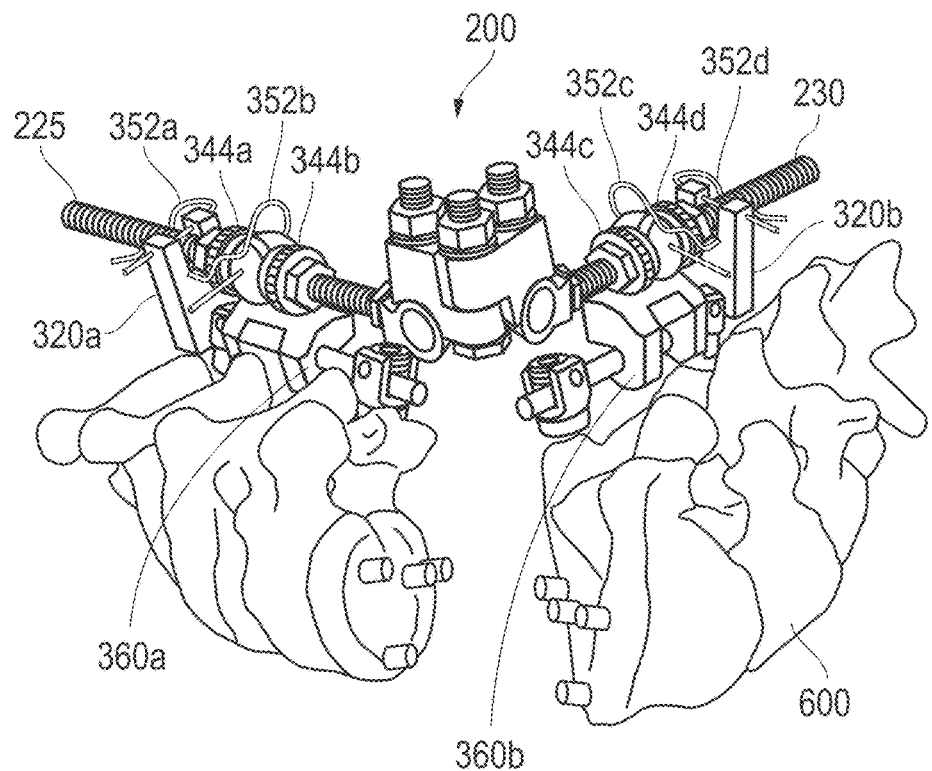
FIGS. 6G, 6H, 6I, and 6J show various views of stabilizer assembly of FIG. 2I.
Figure 6H:
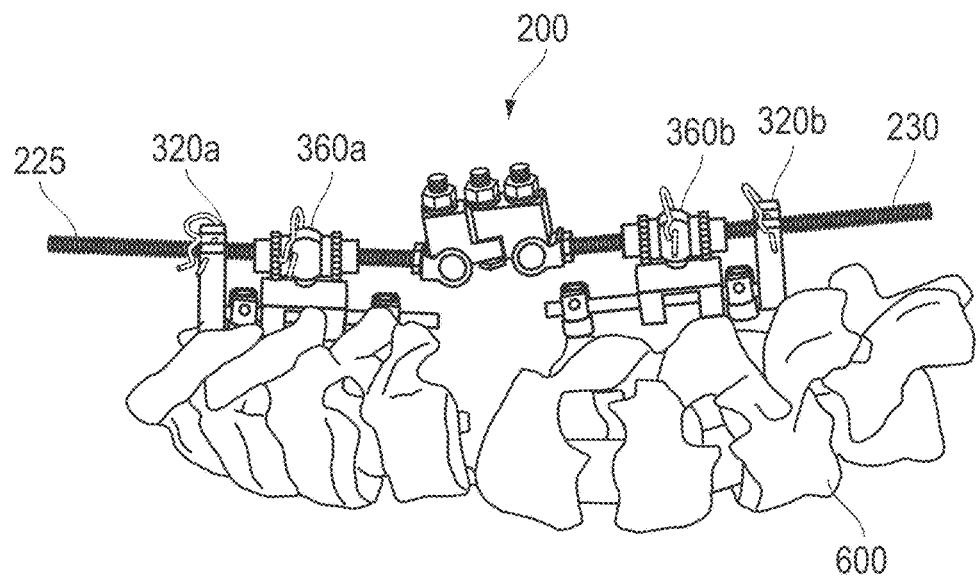
Figure 6I:
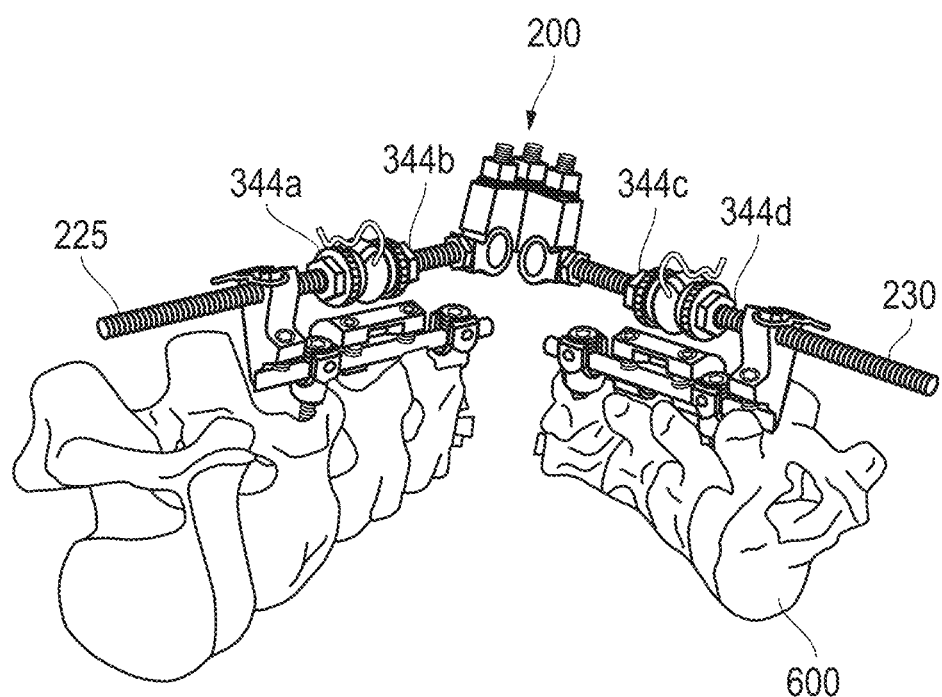
Figure 6J:
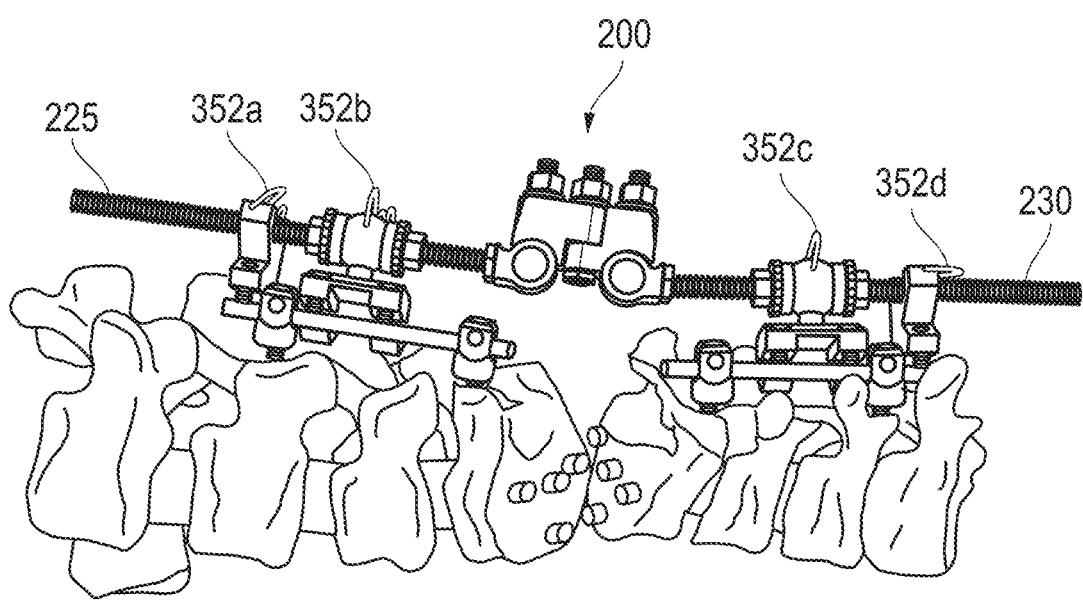

FIGS. 6G, 6H, 6I, and 6J show various views of stabilizer assembly 200 with adjustment nuts 344a, 344b, 344c, and 344d (where adjustment nuts 344c and 344d are similar to adjustment nuts 344a and 344b); retaining pins 352a, 352b, 352c, and 352d; polyaxial links 360a and 360b; and monoaxial links 320a and 320b mounted on stabilizing arms 225 and 230, with simulated spine 600. FIG. 6G indicates all of these items and illustrates the hinge 200 positioned at the apex of the spinal deformity, at which a VCR has been performed. FIG. 6H illustrates the hinge 200 positioned at the apex of the spinal deformity, at which the deformity has been corrected. FIG. 6I indicates another view (concave side view) of FIG. 6G. FIG. 6J indicates another view (concave side view) of FIG. 6H.

In FIGS. 6G, 6H, 6I, and 6J, adjustment nuts 344a, 344b, 344c, and 344d; polyaxial links 360a and 360b; and monoaxial links 320a and 320b include metal coated with Teflon®. All monoaxial links, polyaxial links, and adjustment nuts discussed herein may include metal, Teflon®, some combination, e.g., Teflon®-coated metal, polymers, composites, etc.

Figure 7A:
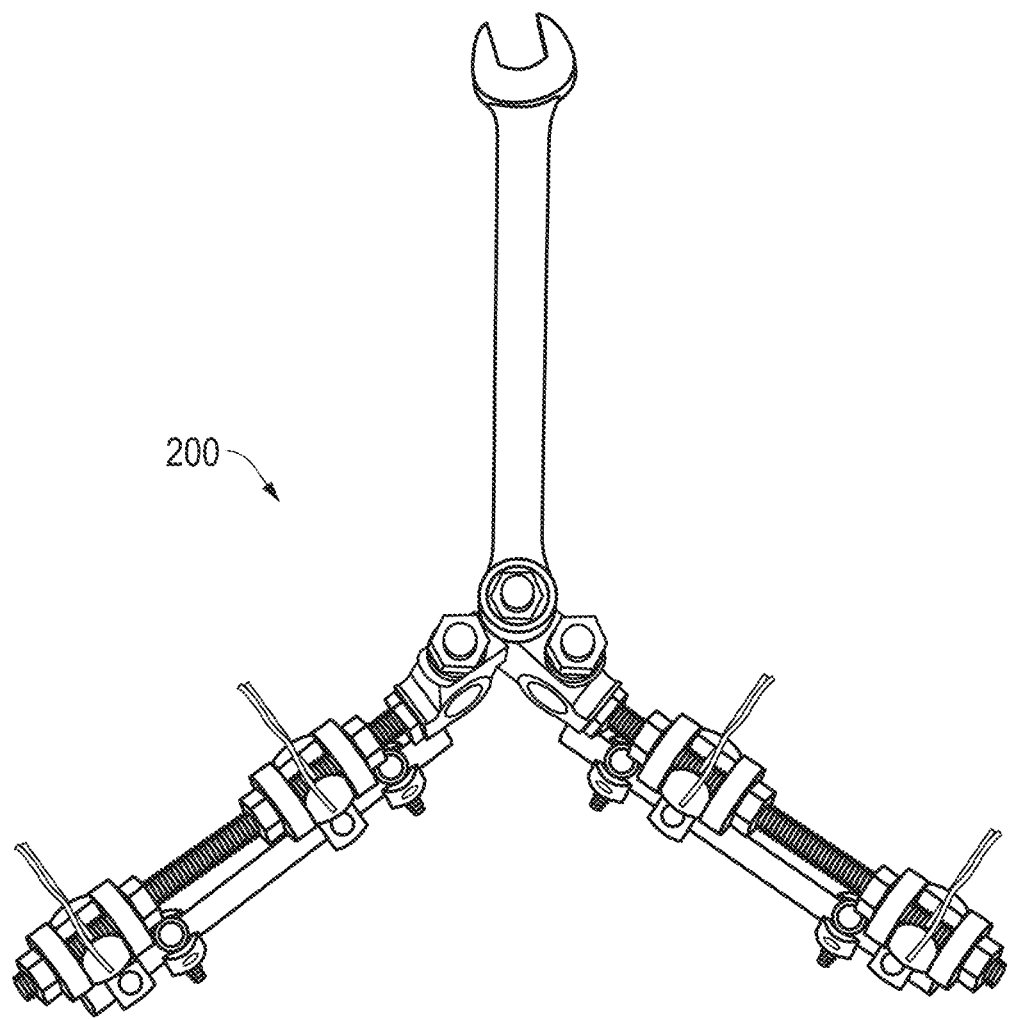
FIG. 7A shows a coronal plane control correction using the stabilizer assembly of FIG. 2I.
Figure 7B:
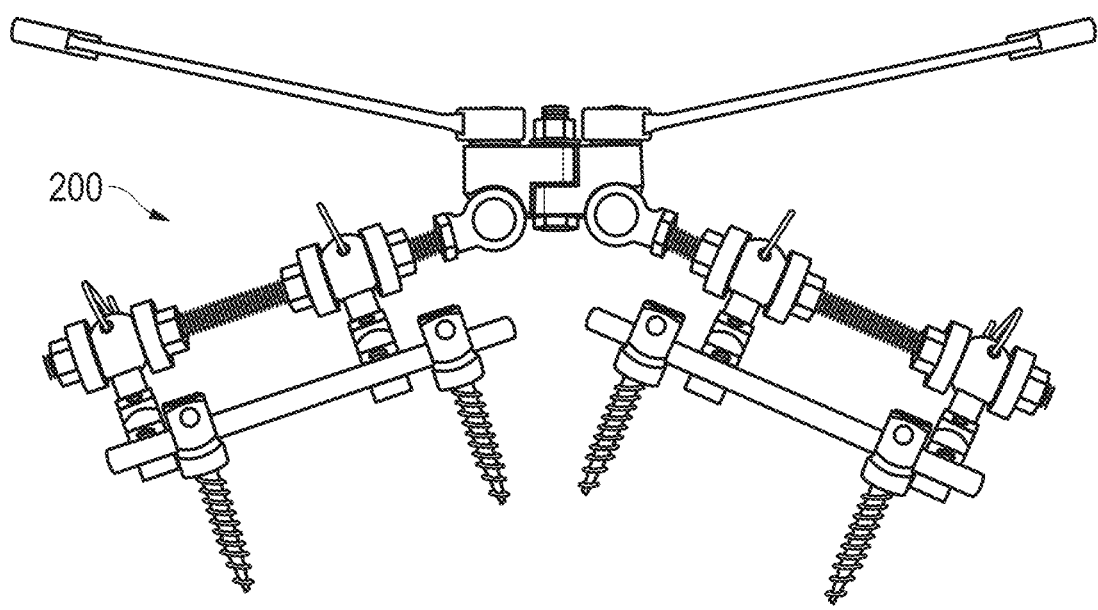
FIG. 7B shows a sagittal plane control correction using the stabilizer assembly of FIG. 2I.
Figure 7C:
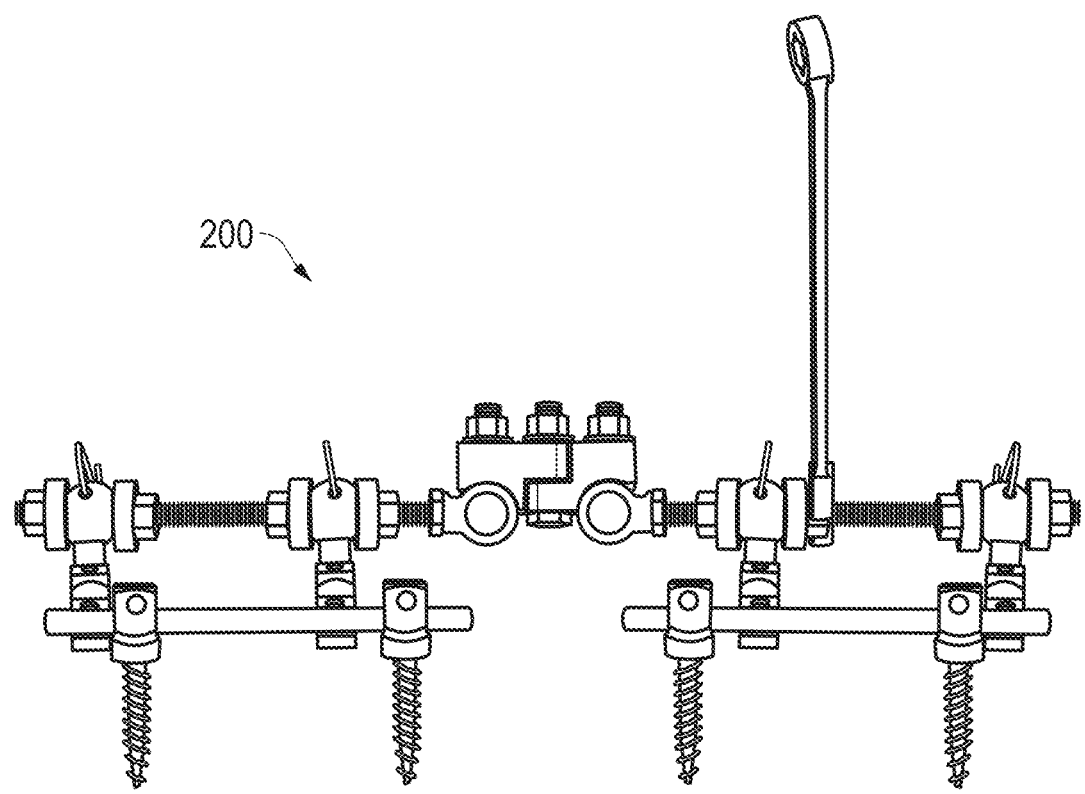
FIG. 7C shows a longitudinal correction using the stabilizer assembly of FIG. 2I.
Figure 7D:
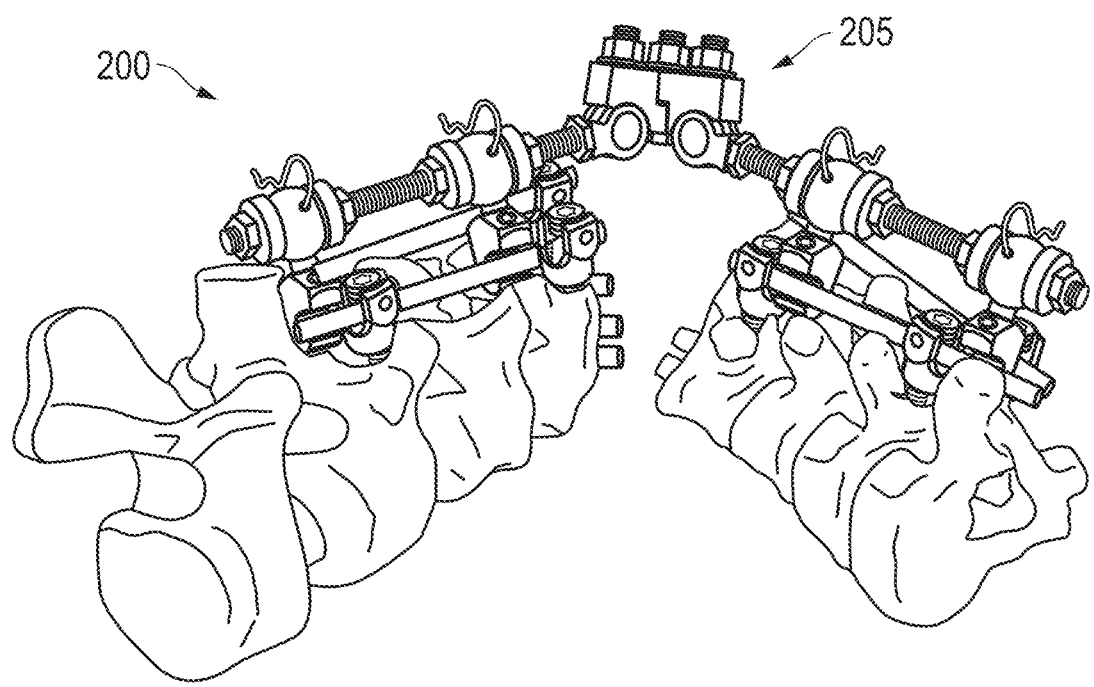
FIG. 7D shows the stabilizer assembly of FIG. 2I with the hinge positioned at the apex of a spinal deformity, at which a VCR has been performed.
Figure 7E:
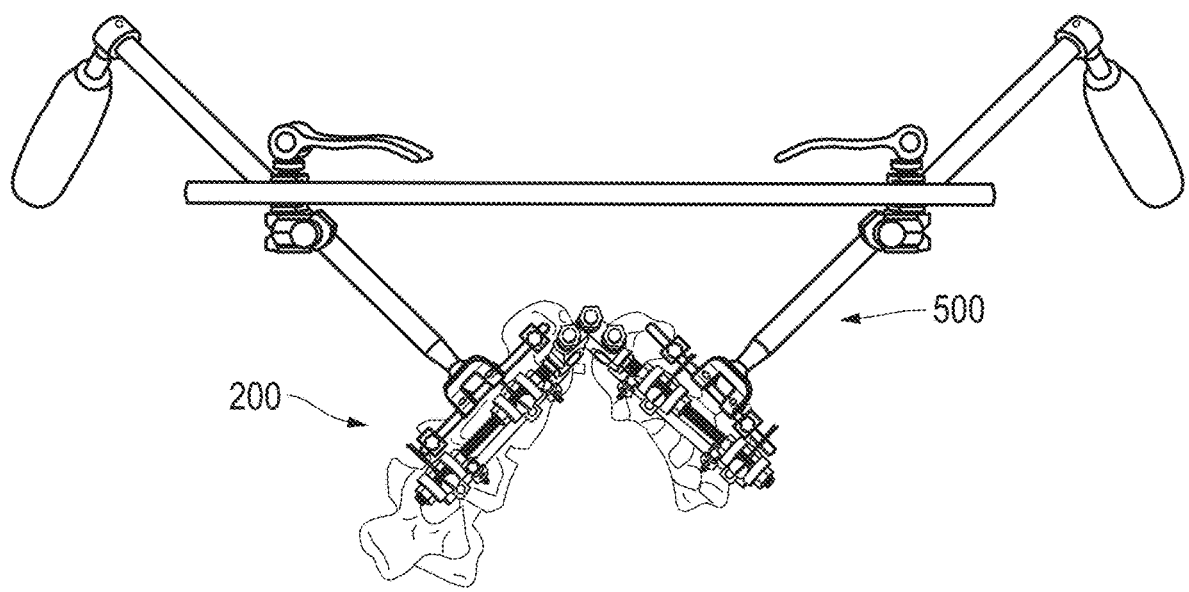
FIGS. 7E and 7F show how the hinge of the stabilizer assembly of FIG. 2I and the manipulator assembly of FIGS. 5A and 5B are used together to perform a spinal correction.
Figure 7F:
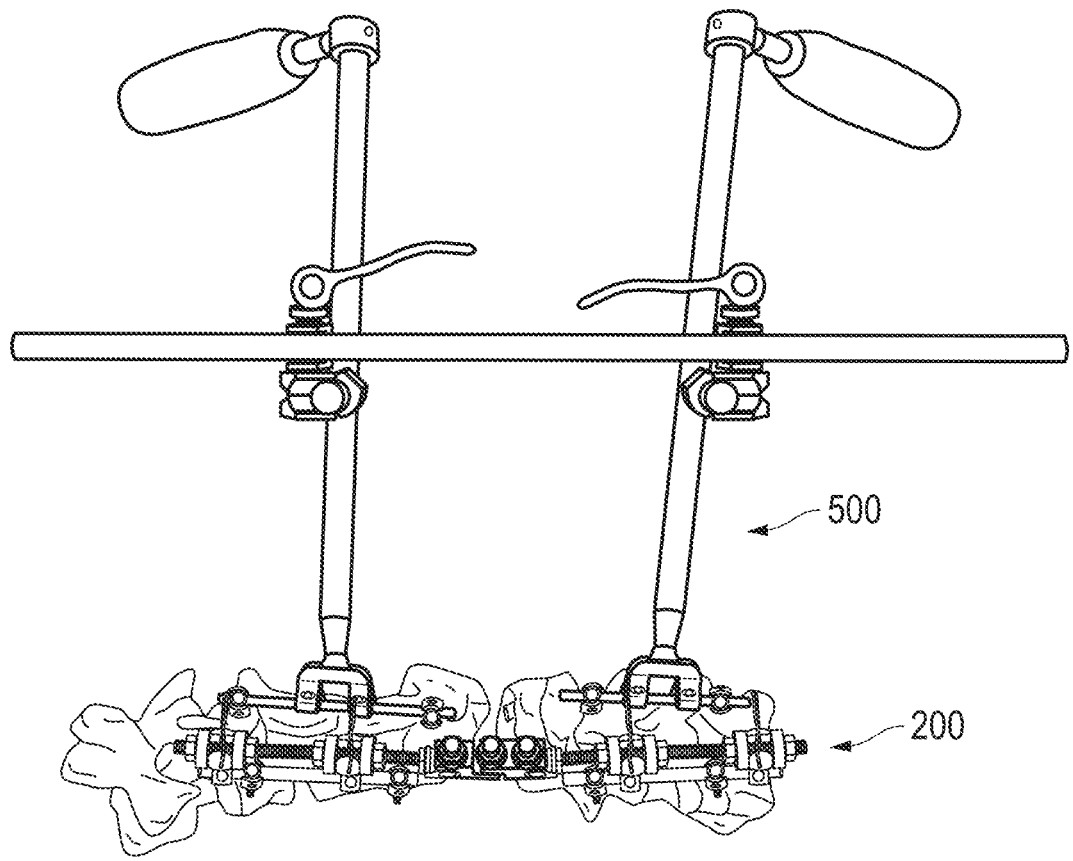
Figure 7G:
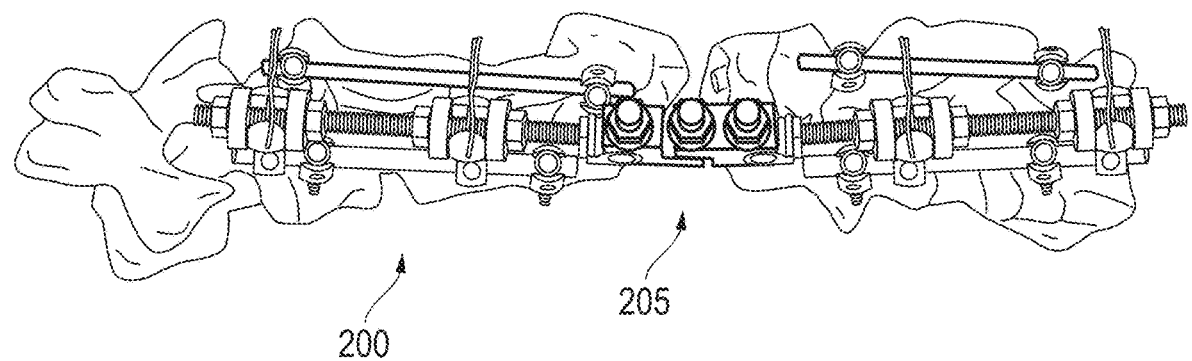
FIG. 7G shows how the hinge of the stabilizer assembly of FIG. 2I is used to stabilize the spinal correction of FIGS. 7E and 7F.

FIGS. 7A-7G illustrate various uses of the stabilizer assembly 200 of FIG. 2I. FIG. 7A shows a coronal plane control correction using the stabilizer assembly 200. FIG. 7B shows a sagittal plane control correction using the stabilizer assembly 200. FIG. 7C depicts a longitudinal correction using the stabilizer assembly 200. FIG. 7D shows the stabilizer assembly 200 with the hinge 205 positioned at the apex of a spinal deformity, at which a VCR has been performed. FIGS. 7E and 7F illustrate how the hinge of the stabilizer assembly 200 and the manipulator assembly 500 of FIGS. 5A and 5B are used together to perform a spinal correction. FIG. 7G depicts how the hinge 205 of the stabilizer assembly 200 is used to stabilize the spinal correction of FIGS. 7E and 7F.

Embodiments of the present invention can be used in conjunction with existing instruments, tools, and other devices generally used in treating spinal conditions.

Components of the present invention, including the stabilizer assembly and the polyaxial links, may be made of a non-organic material that is durable and that can be implanted in a human body, such as titanium, stainless steel, spring steel, aluminum, niobium, carbon fiber, ceramics, polymers, composites or any relatively hard material (e.g. Titanium-Aluminium-Niobium-alloy). Generally, the material selected will be biocompatible, that is, compatible with the surrounding bone and tissue.

Figure 8:
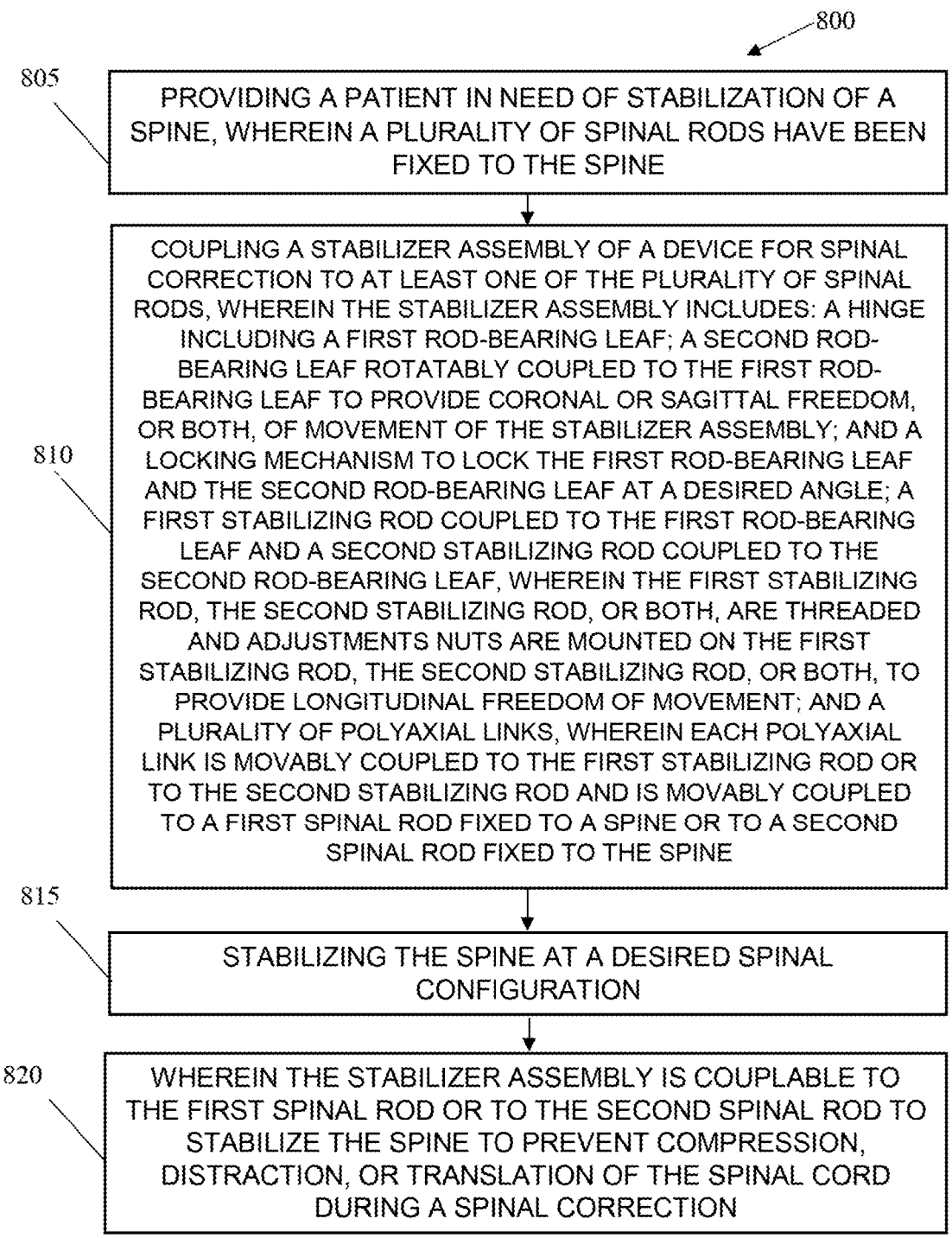
FIG. 8 depicts a flowchart of a method embodiment of the present invention.

FIG. 8 depicts a flowchart of a method embodiment of the present invention. Method 800 of stabilizing a spine includes block 805, providing a patient in need of stabilization of a spine, wherein a plurality of spinal rods have been fixed to the spine. Block 810 includes coupling a stabilizer assembly of a device for spinal correction to at least one of the plurality of spinal rods, wherein the stabilizer assembly includes a hinge including a first rod-bearing leaf; a second rod-bearing leaf rotatably coupled to the first rod-bearing leaf to provide coronal or sagittal freedom of movement, or both, of the stabilizer assembly; and a locking mechanism to lock the first rod-bearing leaf and the second rod-bearing leaf at a desired angle; a first stabilizing rod coupled to the first rod-bearing leaf and a second stabilizing rod coupled to the second rod-bearing leaf, wherein the first stabilizing rod, the second stabilizing rod, or both, are threaded and adjustment nuts are mounted on the first stabilizing rod, the second stabilizing rod, or both, to provide longitudinal freedom of movement; and a plurality of polyaxial links, wherein each polyaxial link is movably coupled to the first stabilizing rod or to the second stabilizing rod and is movably coupled to a first spinal rod fixed to a spine or to a second spinal rod fixed to the spine. Included in block 815 is fixing the spine at a desired spinal configuration. In block 820, the stabilizer assembly is couplable to the first spinal rod or to the second spinal rod to stabilize the spine to prevent compression, distraction, or translation of the spinal cord during a spinal correction.

Figure 9A:
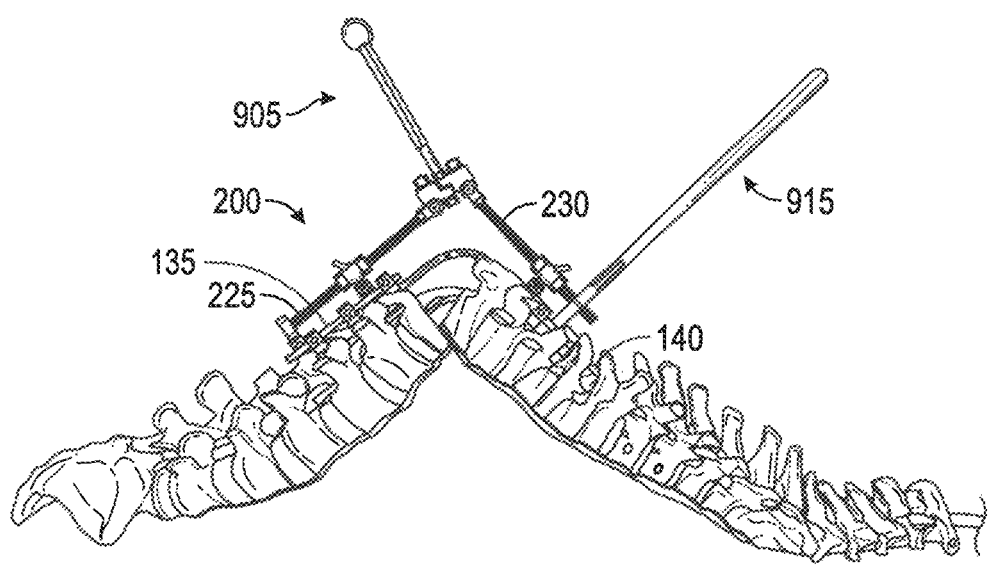
FIG. 9A shows a manipulator rod and a manipulator clamp with the stabilizer assembly.

FIG. 9A shows a manipulator rod 905 and a manipulator clamp 915 with the stabilizer assembly 200. While the manipulator rod 905 and the manipulator clamp 915 are shown and discussed in conjunction with the stabilizer assembly 200, they can be used in conjunction with other embodiments of the stabilizer assembly, such as stabilizer assembly 100 (not shown). The manipulator rod 905 is shown coupled to the hinge 205 of the stabilizer assembly 200, and the manipulator clap 915 is shown coupled to the stabilizing rod 230 of the stabilizer assembly 200 and to the spinal rod 140. The manipulator clamp 915 may also be coupled to the stabilizing rod 225 of the stabilizer assembly 200 and to the spinal rod 135.

Figure 9B:
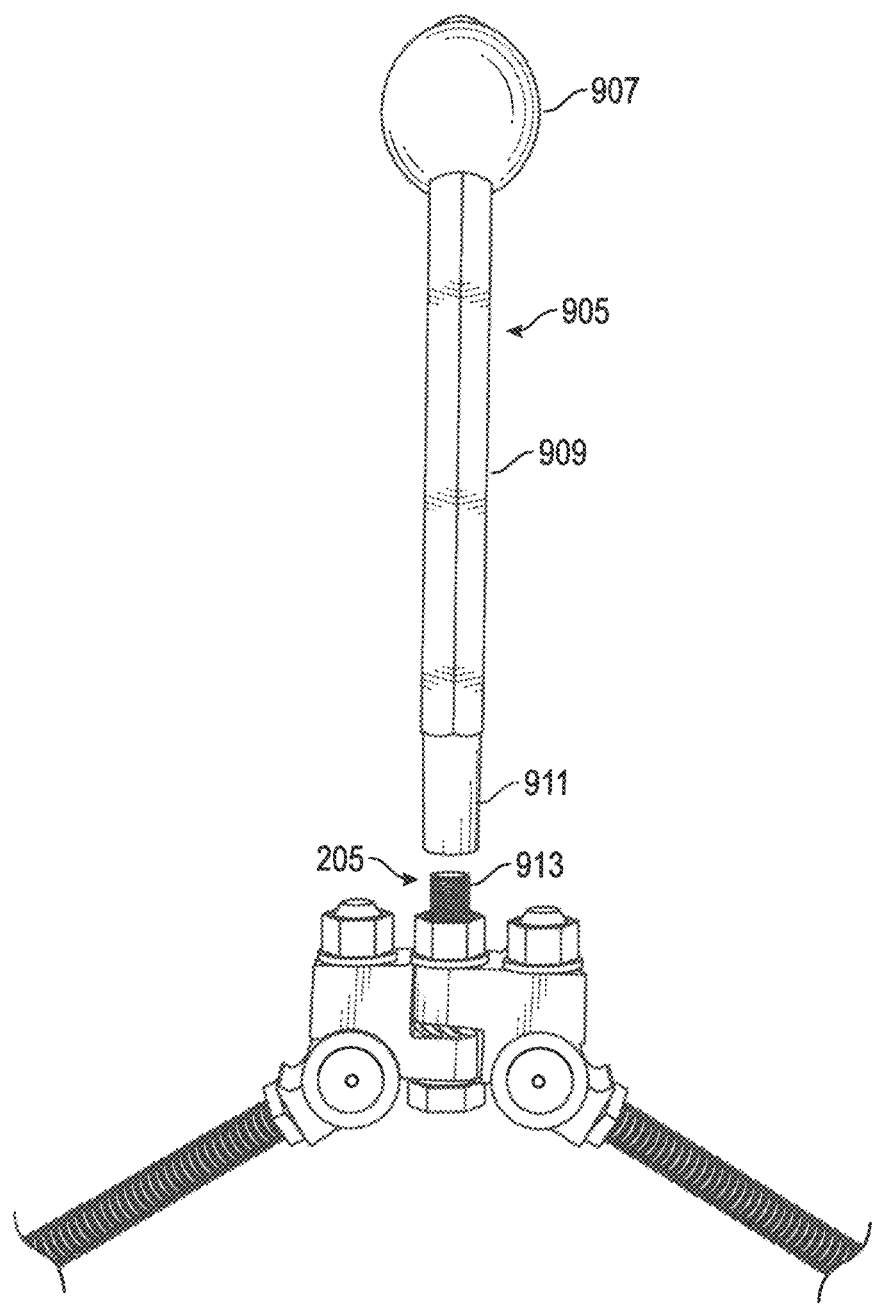
FIG. 9B shows q manipulator rod in position to be coupled to the hinge of the stabilizer assembly.

FIG. 9B shows the manipulator rod 905 in position to be coupled to the hinge 205 of the stabilizer assembly 200. The manipulator rod 905 includes a grip 907 affixed at a proximate end of the manipulator rod 905, a body 909 and a coupling mechanism 911 affixed at a distal end of the manipulator rod 905. In the exemplary embodiment shown, the coupling mechanism 911 includes a threaded recess (not shown) configured to be screwed onto a threaded hinge bolt 913. Once coupled to the hinge 205, the manipulator rod 905 can be used to manipulate the stabilizer assembly 200. The body 909 may be straight or curved may have a circular, elliptical, triangular, square, pentagonal, hexagonal, or other polygonal cross section.

Figure 9C:
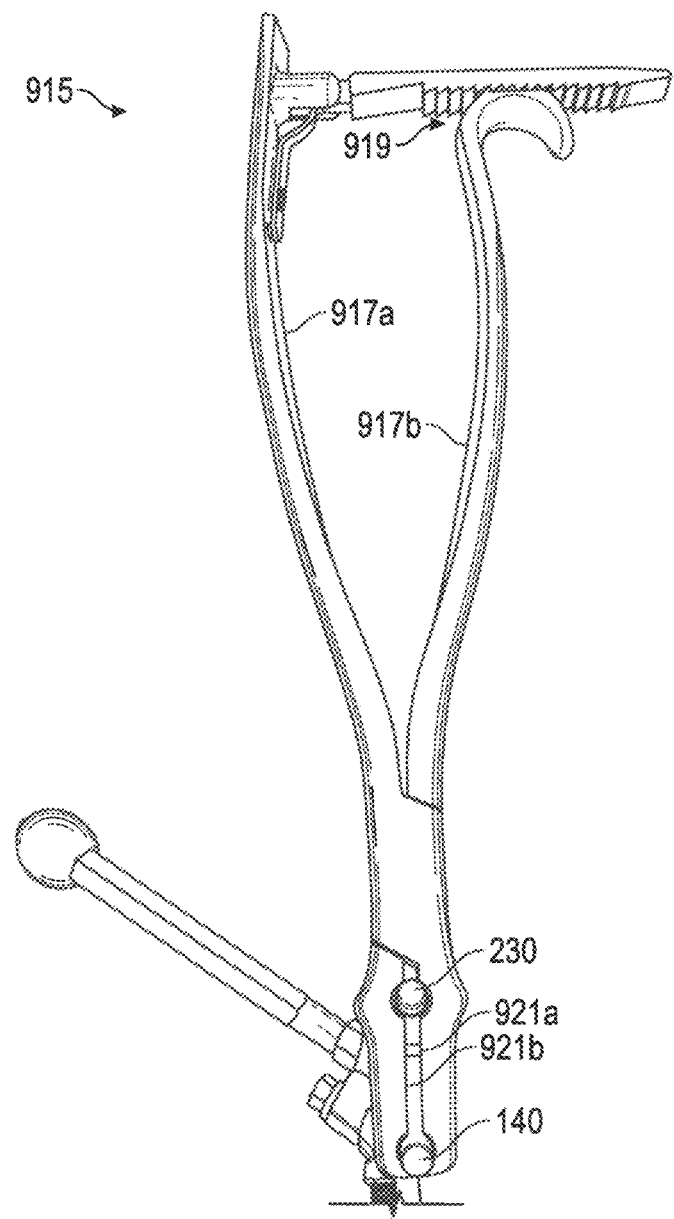
FIG. 9C shows a side view of the manipulator clamp coupled to a stabilizing rod and a spinal rod.

FIG. 9C shows a side view of the manipulator clamp 915 coupled to the stabilizing rod 230 and the spinal rod 140. The manipulator clamp 915 includes two clamp arms 917a, b, that are rotatably coupled together. At a proximal end of the manipulator clamp 915, the two clamp arms 917a, b engage each other in a disengageable ratchet mechanism 919. At a distal end of the manipulator clamp 915, each of the clamp arms 917a, b includes a gripping surface, gripping surfaces 921a, b, respectively, with recesses to engage the stabilizing rod 230 and the spinal rod 140.

Figure 9D:
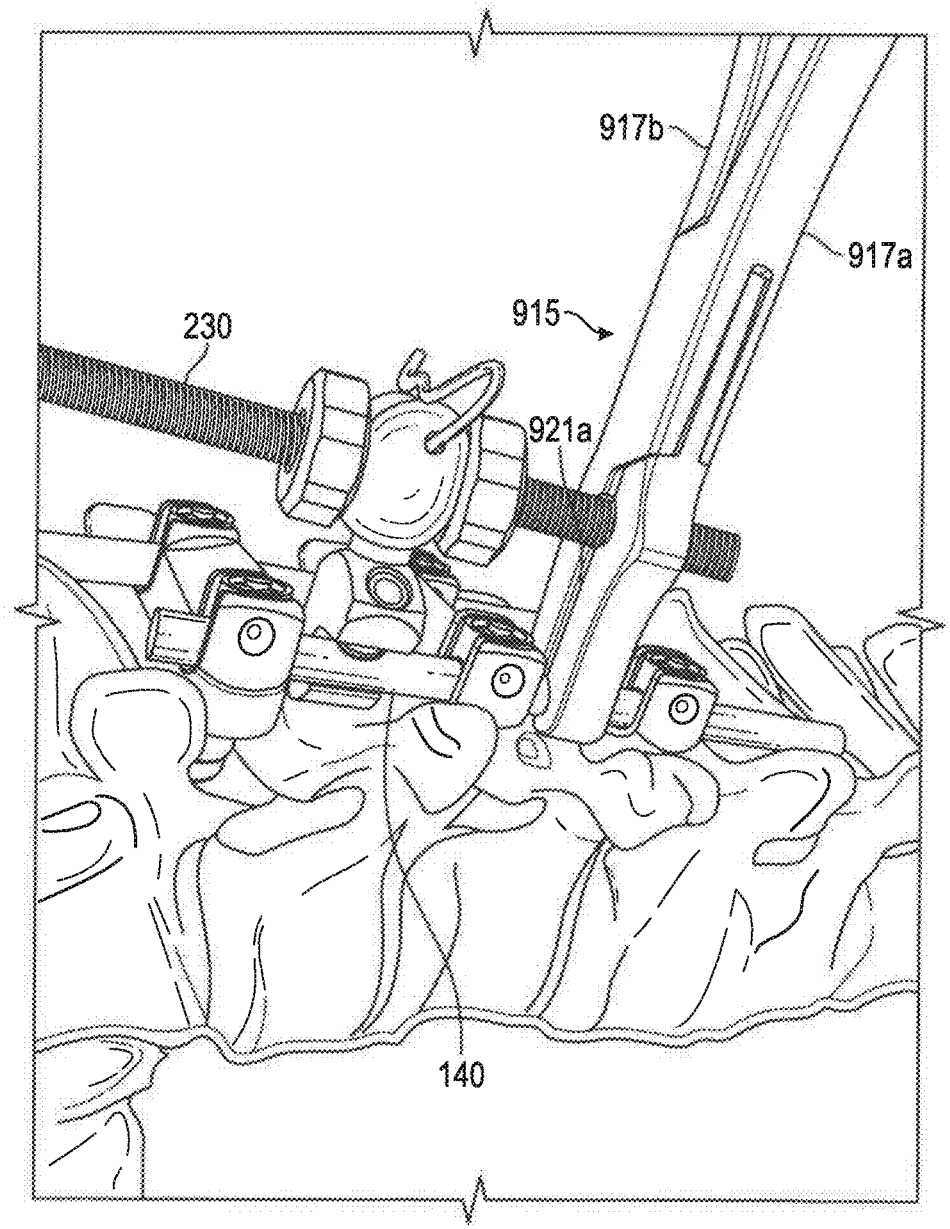
FIG. 9D shows the distal end of a manipulator clamp coupled to a stabilizing rod and a spinal rod.

FIG. 9D shows the distal end of the manipulator clamp 915 coupled to the stabilizing rod 230 and the spinal rod 140. At the distal end of the manipulator clamp 915, each of the clamp arms 917a, b includes a gripping surface, gripping surfaces 921a, b, respectively (921b not shown) with recesses to engage the stabilizing rod 230 and the spinal rod 140.

FIG. 9E shows the rod-bearing leaves 210 and 215 of the stabilizer assembly 200 separately. The rod-bearing leaf 215 includes a bolt hole 925 that is configured to receive a bolt 927 bearing a nut 929 such that the bolt 927 is retained by the rod-bearing leaf 210. The bolt 927 couples the stabilizing rod 230 to the rod-bearing leaf 215. Similarly, rod-bearing leaf 210 includes a bolt hole 931 that is configured to receive a bolt (not shown) bearing a nut (not shown) such that the bolt is retained by the rod-bearing leaf 210 to couple a stabilizing rod 225 (not shown) to the rod-bearing leaf 210.

Figure 9F:
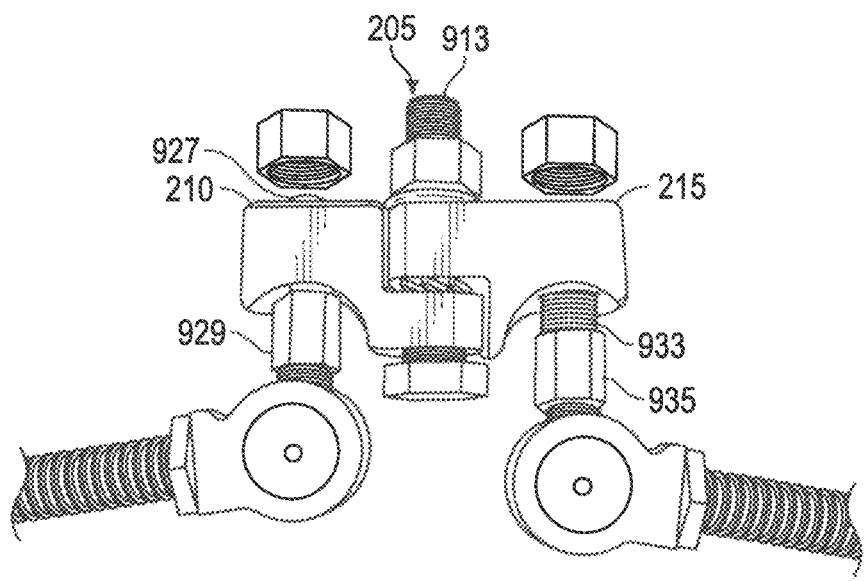
FIG. 9F shows the rod-bearing leaves of the stabilizer assembly coupled at the hinge.

FIG. 9F shows the rod-bearing leaves 210 and 215 of the stabilizer assembly 200 coupled at the hinge 205. In FIG. 9F, the rod-bearing leaves 210 and 215 are shown coupled by the hinge bolt 913, with bolts 927 and 933, bearing nuts 929 and 935, respectively, partially inserted into the bolt holes 925 and 931 (not shown), respectively.

One skilled in the art of medical treatment of human spine ailments will recognize that the device for treating spinal maladies including stabilizer assembly 100, stabilizer assembly 200, and method 700 provide effective methods and systems that reduce risk for compression, distraction, or translation of the spinal cord during stabilization, manipulation, and fixation of a deformed spine subject to a vertebral column resection surgery or a spinal correction.

Severe angular kyphosis is a spinal deformity characterized by an excessive forward curvature of the thoracic or thoracolumbar spine, resulting in a sharp angulation greater than 70-100° [1-2]. This condition can significantly impact an individual's quality of life, leading to various physiological and functional impairments, such as cardiopulmonary dysfunction and neurological deficits [3-4]. Treating complex and severe angular kyphosis deformities present a significant challenge for surgeons and medical teams, often necessitating vertebral column resection (VCR) where one or more entire vertebrae are removed to correct the sagittal imbalance [5-10].

In the current VCR strategy for severe angular kyphosis [5-16], multiple pedicle screws are used proximal and distal to the apical vertebral resection to provide secure stabilization of the spine before any bony resection is performed. Provisional rods are fixed during the bony resection to prevent sudden translation of the spinal column, which could cause spinal cord injury. The reduction is achieved by compressing and/or exchanging the provisional pre-contoured rods one by one, or by in situ rod bending to shorten and translate the spine. An intervertebral cage is placed at the VCR level to provide anterior column support, acting as a hinge for kyphosis correction. However, these techniques have several disadvantages: 1) there is a risk of intraoperative deficits due to the instability resulting from compressing and exchanging the provisional rods, which may lead to subluxation of the spine segments and impingement on the dura, resulting in spinal cord damage. 2) inappropriate anterior support cages may cause over-shortening of the ventral spinal cord, potentially leading to spinal cord injury. 3) in-site rod bending to correct the angular kyphosis can result in distracting the spinal cord and causing further damage. 4) the provisional rod is rigid and lacks an adjustable mechanism at the apical resection area, which may limit the extent of correction. 5) the closure of the resected gap is typically done through individual pedicle screws, despite poor fixation in severe spinal deformities. And 6) the repeated attempts and removal and insertion of the provisional rods during surgery require additional time and can lead to increased blood loss.

With the aforementioned concerns in mind, we aimed to address the limitations of current VCR strategies for severe angular kyphosis by developing a novel correction system called the uniplanar clamp-hinge (Uni-CH). Our primary objective was to design a device that offers the following benefits: 1) consistent stabilization of the spine segments during the reduction process to mitigate the risk of intraoperative mishaps; 2) an adjustable hinge control at the apical resection area to safeguard the spinal cord from over-shortening and distracting; 3) an adjustable mechanism control at the resected gap to enhance the correction of the deformity; 4) reduction over several vertebral levels by shortening the resected gap, utilizing a construct-rod above and below, thereby reducing reliance on individual pedicle screws; and 5) streamlined VCR device procedure to optimize surgical time.

The purposes of this study were twofold. Firstly, we aimed to introduce the Uni-CH and demonstrate its application on a saw bone model simulating severe angular kyphosis. Secondly, we sought to correct the saw bone severe angular kyphosis using the Uni-CH and determine the optimal hinge position for VCR reduction of the angular kyphosis.

Figure 10:
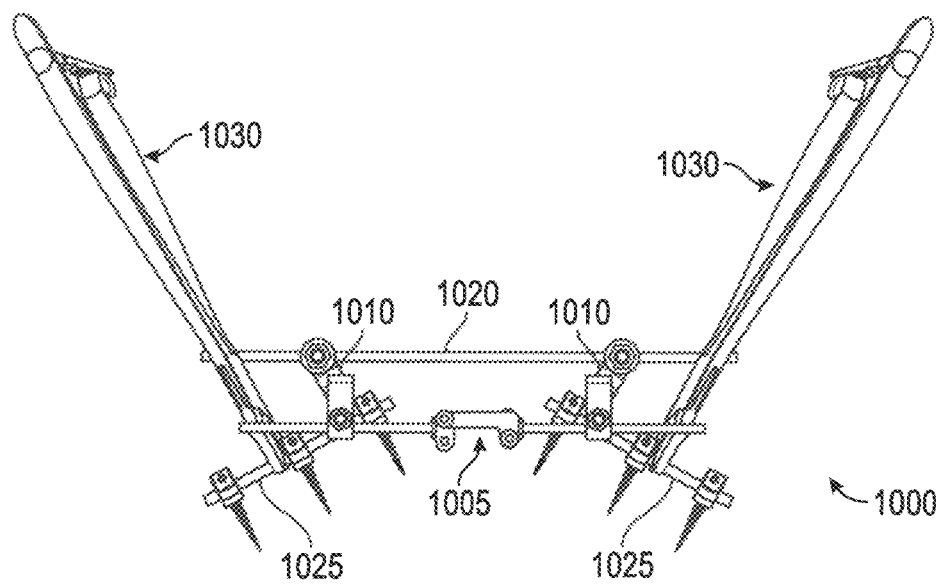
FIG. 10 shows an embodiment of a uniplanar clamp hinge.

FIG. 10 shows a uniplanar clamp hinge (Uni-CH) 1000 that includes a dual-axis hinge (DA-H) 1005, two uniplanar clamps (UN-C) 1010, a stabilizing rod 1020, two provisional spine rods 1025, and two reduction rod holders 1030.

Figure 11A:
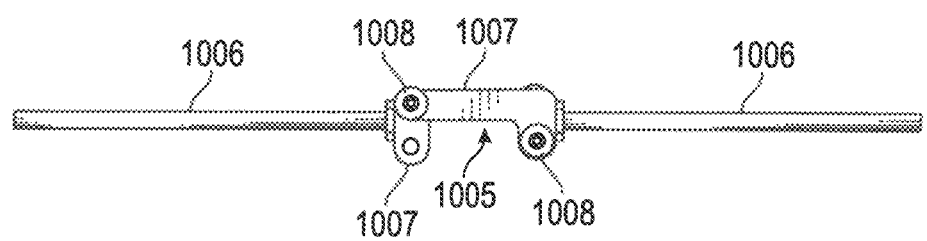
FIGS. 11A, 11B, and 11C show a dual-axis hinge.
Figure 11B:
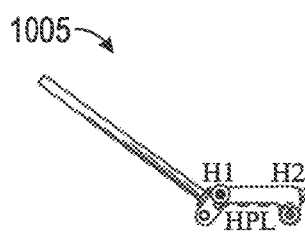
Figure 11C:
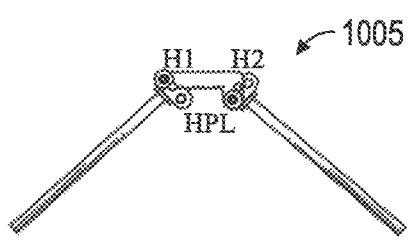

FIG. 11A shows the DA-H 1005, which includes two hinge-rods 1006, dual-axis hinge-bearing leaves 1007, and locking screws 1008. The two hinge-rods 1006 are rotationally coupled to the two hinge-rod-bearing leaves 1007, respectively. The first hinge-rod-bearing leaf 1007 is rotationally coupled to the second hinge-rod-bearing leaf 1007 to provide uniplanar movement. The locking screws 1008 enable locking of the first and second hinge-rod-bearing leaves 1007 at a desired angle to control sagittal plane correction. The DA-H 1005 is designed to minimize hinge translation during the reduction maneuver by providing two axes of rotation. The DA-H 1005 is a low-profile design that provides a full range of motion at any desired hinge position. FIG. 11B shows the range of motion of the DA-H 1005 in one direction. FIG. 11C shows the range of motion of the DA-H 1005 in the opposite direction. H1 is the hinge axis at the distal portion and H2 is the axis at the proximal portion. The line between the H1 and H2 is the hinge position line (HPL), which serves as a reference position of the DA-H 1005 to facilitate placing the DA-H 1005 at the appropriate position in relation to the deformities. The length of the HPL can vary depending on the deformities, allowing flexibility in choosing the appropriate DA-H 1005.

Figure 12A:
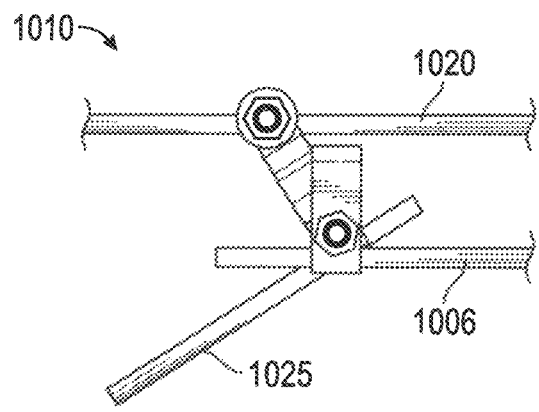
FIGS. 12A and 12B show views of a uniplanar clamp.
Figure 12B:
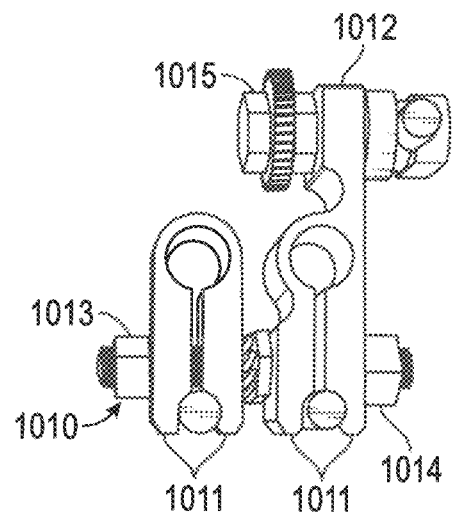

FIGS. 12A and 12B show the front view and the side view of the UN-C 1010, respectively. The UN-C 1010 is designed to have two spring loaded snap on clamps 1011 and receive three rods 1006, 1020, and 1025. The two spring-loaded snap on clamps 1011 accept the hinge rod 1006 and the provisional spine rod 1020, respectively. In addition, an integrated locking tab 1012 on the provisional spine rod section of the clamp 1010 accepts the stabilizing rod 1020. There are two independent rod locking nuts 1013, 1014 and one stabilizing rod locking bolt 1015 in the UN-C 1010. The spine rod locking nut 1014 locks the provisional spine rod 1025 but does not lock the hinge side of the clamp 1010. The hinge rod locking nut 1013 locks the hinge rod 1006 and does not lock the clamp 1011 on the provisional spine rod side. Therefore, the hinge rod locking nut 1013 can be loosened to allow repositioning of the UN-C 1010 without affecting the spine rod 1025 side of the clamp 1011. The stabilizing rod 1020 is used to stabilize the resection gap when its locking bolts 1015 are tightened. Loosening the locking bolts 1015 allows the proximal and distal spine segments to angulate about the axes of the hinge. Axial translation of the segments as well as shear and bending in all other planes is inhibited. The hinge rod locking nuts 1013 can be loosened to allow repositioning of the UN-C 1010 without loss of stability when the stabilizing rod 1020 is securely engaged.

Figure 13:
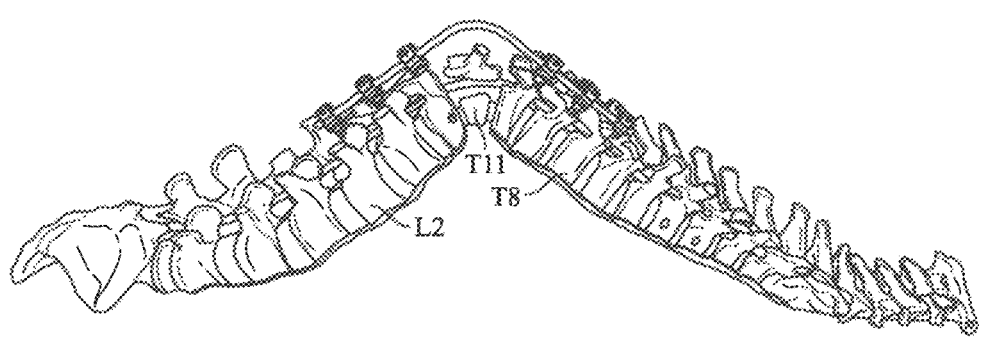
FIG. 13 shows bilateral pedicle screws inserted into vertebrae.

A Sawbones spine model (Model 1323-23; Sawbones, Vashon, Washington) including the T1 to sacrum segments was utilized to simulate thoracolumbar severe angular kyphosis (FIG. 13). FIG. 13 shows bilateral pedicle screws (5.5-mm diameter poly-axial pedicle screw, CD Horizon Legacy, Medtronic) inserted at T8-T10 and T12-L2, while the apical vertebra T11 remained un-instrumented. The apical vertebra T11 was trimmed to create a wedge-shaped vertebra. Subsequently, bilateral 5.5 mm diameter kyphosis rods, pre-contoured with a 104° bend, were placed to induce a thoracolumbar angular kyphosis with the apex located at T11. The angular kyphosis was quantified as 83° at the T9-L1 segment using the Cobb method.

Figure 14:
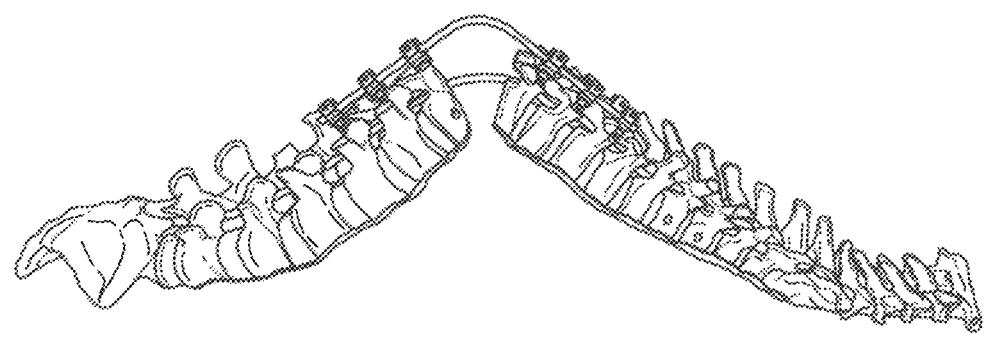
FIG. 14 shows a resection of a spine.
Figure 15:
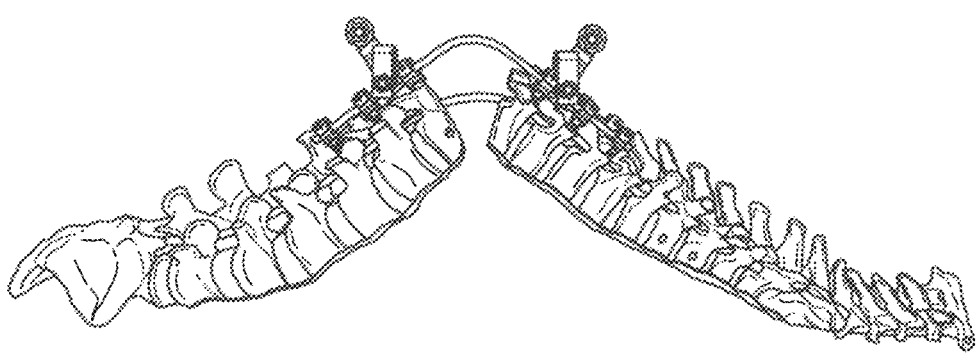
FIG. 15 shows a uniplanar clamp hinge fixed at each of two provisional spine rods.
Figure 16:
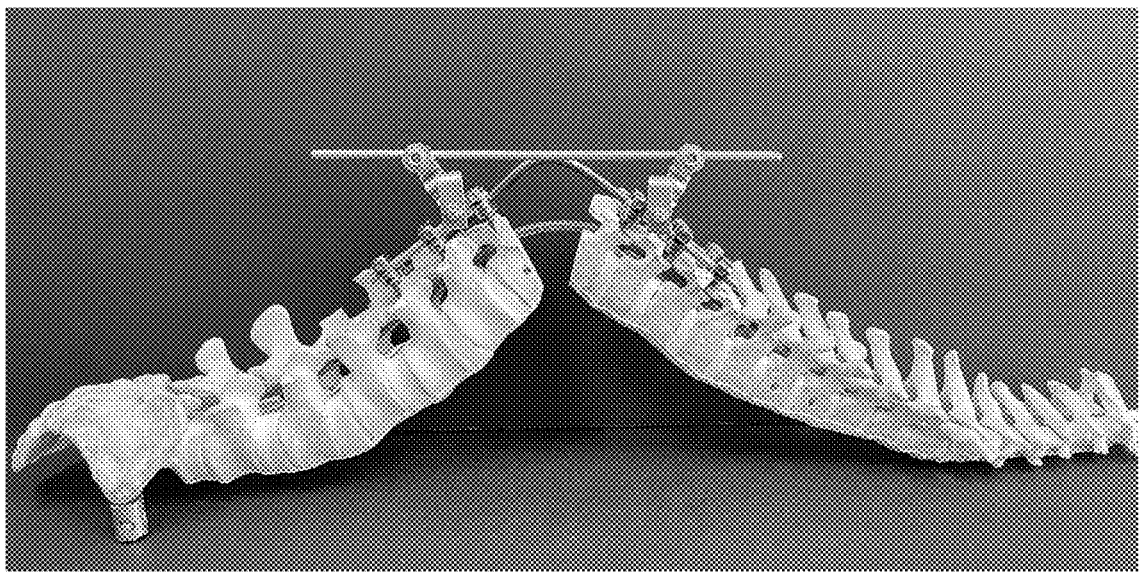
FIG. 16 shows a stabilizing rod fixed by crossing the resection gap using locking bolts.

FIG. 14 shows the resection, which involved the removal of T11 at the apex, as well as parts of T10 and T12. After complete resection of the vertebral column, the spine was divided into cephalad and caudal portions at the resected level. Two provisional spine rods were fixed on the right side, one at the cephalad portion (T8-T10) and the other at the caudal portion (T12-L2). FIG. 15 shows one UN-C fixed at each of the cephalad and caudal provisional spine rods, respectively, using the provisional spine rod clamp on the right side. FIG. 16 shows the stabilizing rod fixed by crossing the resection gap using the locking bolts.

After the complete resection of the vertebral column, the right kyphosis rod was extracted, and two provisional spine rods were affixed to the cephalad (T8-T10) and caudal (T12-L2) segments (FIG. 14). A UN-C was then secured to each of the provisional spine rods using the provisional spine rod clamp Each UN-C was positioned just above and below the resection area, and its orientation was perpendicular to the spine rod in the sagittal plane (FIG. 15). To provide stabilization, a stabilizing rod was fixed across the resection gap using locking bolts. The orientation of the stabilizing rod is aligned parallel to the spinal cord in the sagittal plane (FIG. 16).

Figure 17:
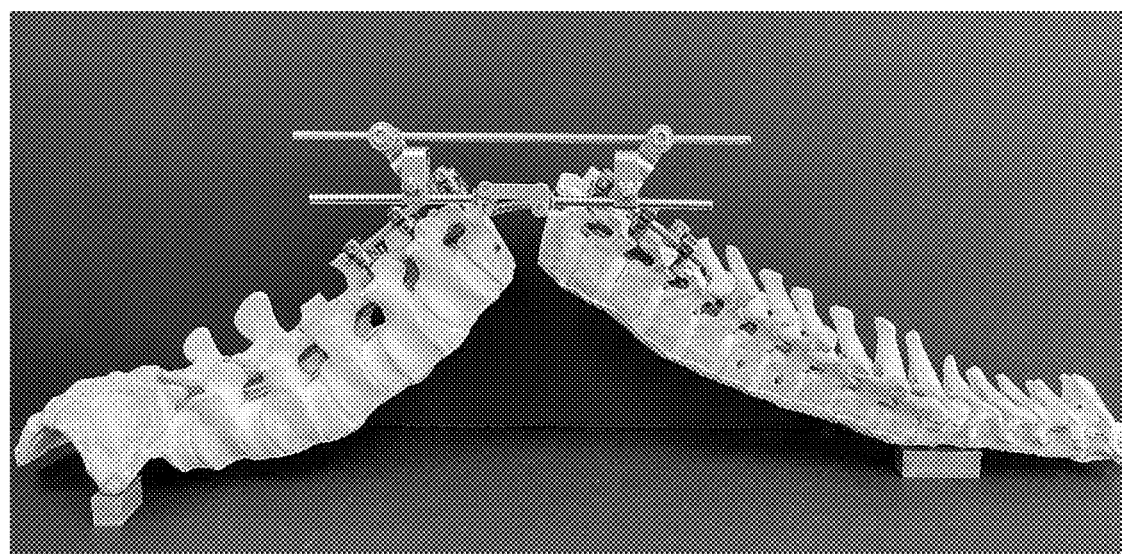
FIG. 17 the dual axis hinge placed and secured using a hinge clamp of the uniplanar clamp.
Figure 18A:
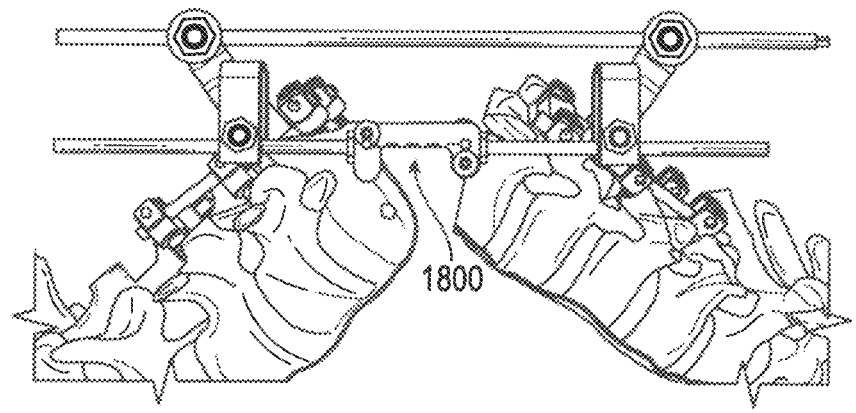
FIGS. 18A and 18B show a hinge position line at two different locations.
Figure 18B:
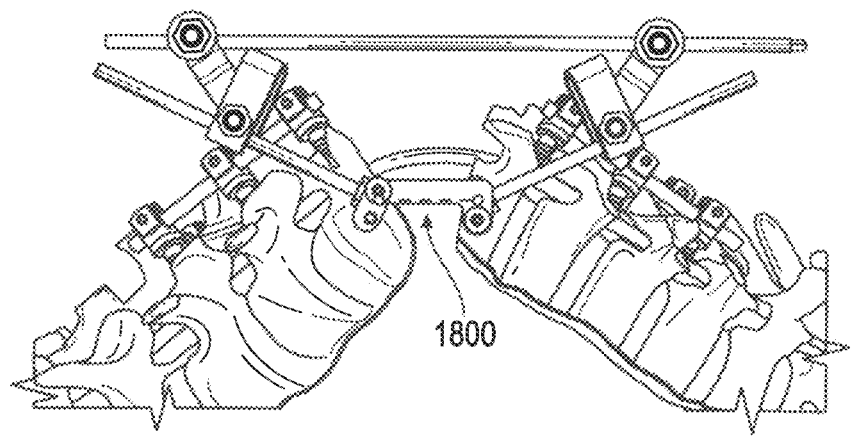

The DA-H was inserted using the hinge clamp of the UN-C (FIG. 17). In this study, the HPL length of the DA-H was set at 30 mm. This choice was determined based on the posterior vertebral body wall gap (PVBWG) measurement. It is important for the HPL length to be comparable to the PVBWG to avoid excessive shortening or lengthening of the ventral aspect of the spinal cord. The position of the HPL, serving as a reference hinge position, can be adjusted within the resection area to accommodate various deformities by manipulating the hinge clamp (FIGS. 18A and 18B).

FIG. 17 shows the DA-H placed and secured using the hinge clamp of the UN-C. FIG. 18A shows the hinge position line (HPL) 1800 located at the level of the posterior vertebral body wall. FIG. 18B shows the HPL 1800 located at the level of the posterior ⅓ of the vertebral body. The location of the HPL can be adjusted by rotating the hinge clamps (arrows).

Figure 19:
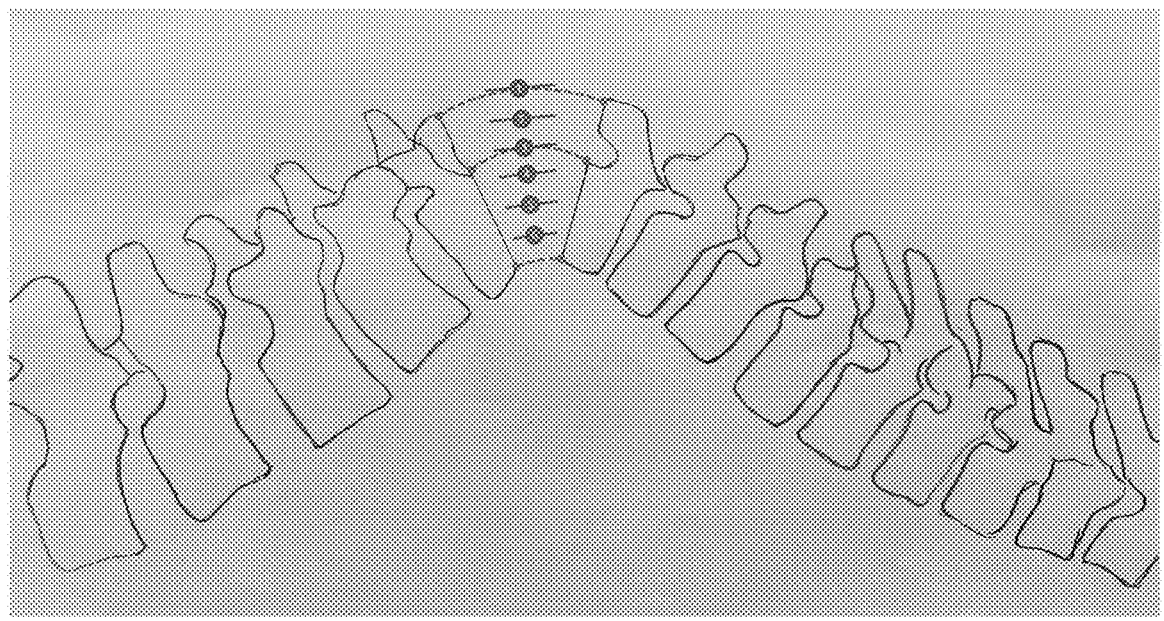
FIG. 19 shows the hinge position line at six distinct locations.

To assess the reduction of the resected gap with different hinge positions, six distinct hinge positions were created for evaluation. FIG. 19 shows a schematic picture illustrating the six locations of the HPL as follows: 1—the posterior vertebral elements; 2—the center of the spinal canal; 3—the posterior vertebral body wall; 4—the posterior ⅓ of the vertebral body; 5 the middle ⅓ of the vertebral body; and 6—the anterior ⅓ of the vertebral body.

After securing and locking the DA-H, the left kyphosis rod was subsequently removed, leaving the spine segments supported solely by the Uni-HC. Prior to initiating the reduction maneuver, baseline measurements of the resected gap were obtained. The resected gap was measured in three specific sections (FIG. 20): 1) posterior vertebral elements gap (PVEG); 2) posterior vertebral body wall gap (PVBWG); and 3) anterior vertebral body wall gap (AVBWG). Additionally, the length of the instrumented segments (ISL) from T8 to L2 and the apical vertebral translation (AVT) were recorded.

Figure 20:
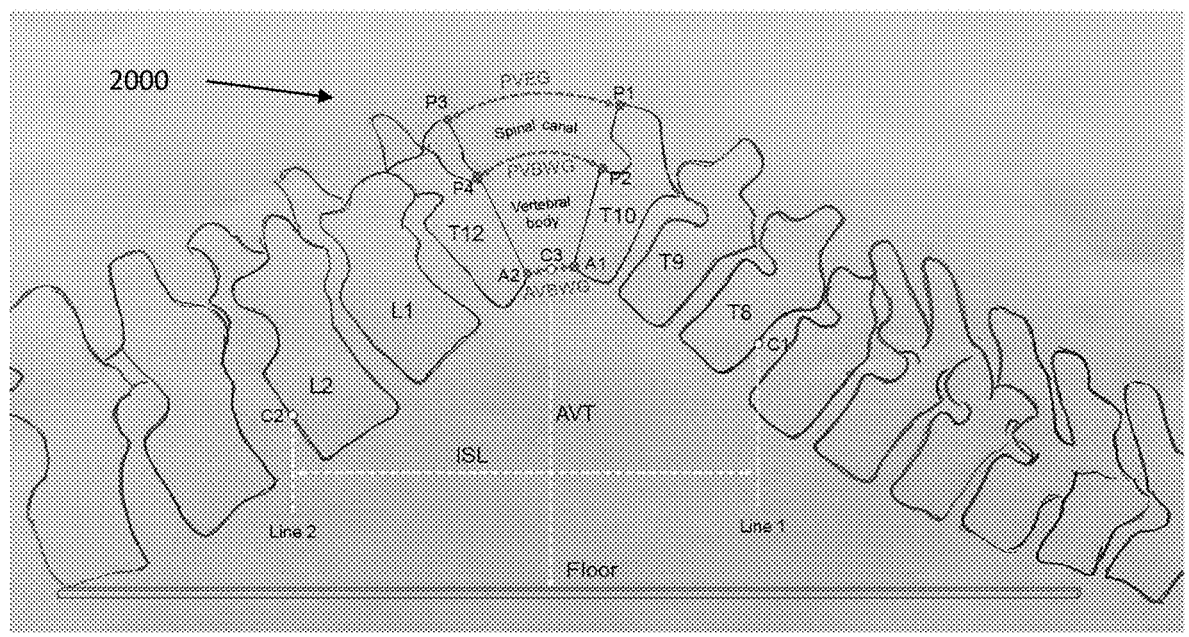
FIG. 20 shows measurements of the resection gap and spine column at pre-reduction in the mid-sagittal plane.

FIG. 20 shows a schematic picture illustrating a conceptual framework 2000 for the measurements of the resection gap and spine column at pre-reduction in the mid-sagittal plane. In the cephalad resected section, A1 and P1 represent the most anterior and posterior edges, respectively, while P2 represents the posterior edge of the vertebral body. In the caudal resected section, A2 and P3 denote the most anterior and posterior edges, respectively, and P4 indicates the posterior edge of the vertebral body. The distance between A1 and A2 corresponds to the anterior vertebral body wall gap (AVBWG). The distance between P1 and P3 is the posterior vertebral elements gap (PVEG), and the distance between P2 and P4 represents the posterior vertebral body wall gap (PVBWG). C1 denotes the middle point of the superior margin of the vertebrae T8, while C2 represents the middle point of the inferior margin of the vertebrae L2. Line 1 and Line 2 are the perpendicular lines passing through C1 and C2, respectively. The distance between Line 1 and Line 2 is the length of the instrumented segments (ISL) from T8 to L2. C3 is the middle point of the anterior vertebral body wall, and the distance between C3 and the floor corresponds to the apical vertebral translation (AVT).

Figure 21:
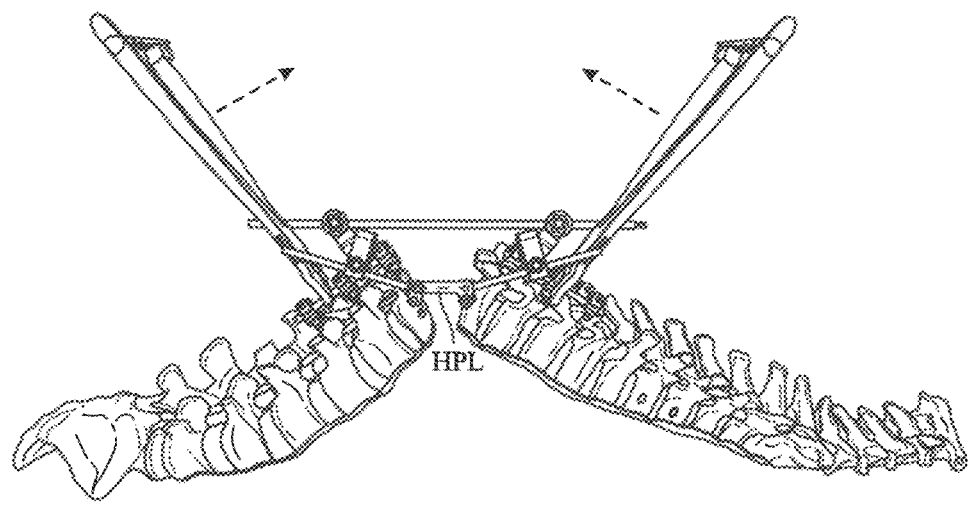
FIG. 21 shows the spine column with the uniplanar clamp hinge in the pre-reduction.
Figure 22:
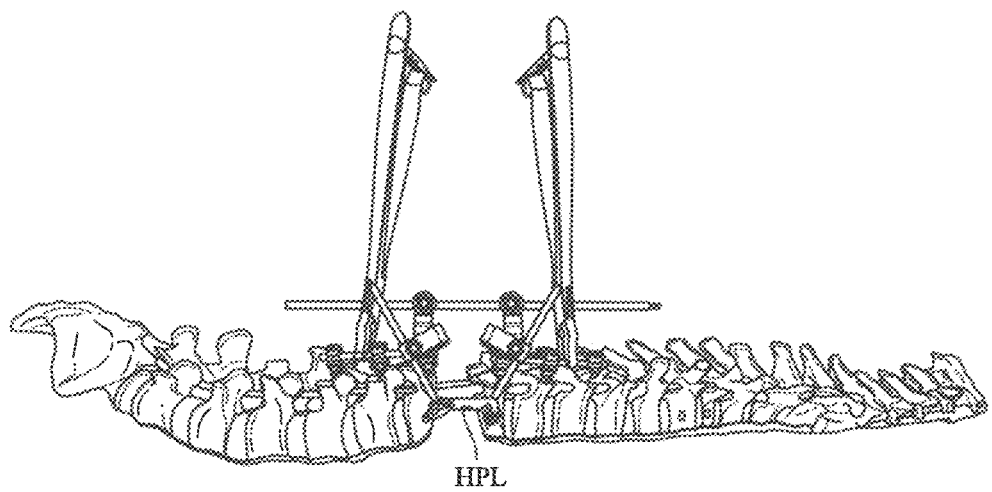
FIG. 22 shows the spine column with the uniplanar clamp hinge at the immediately post-reduction.
Figure 23:
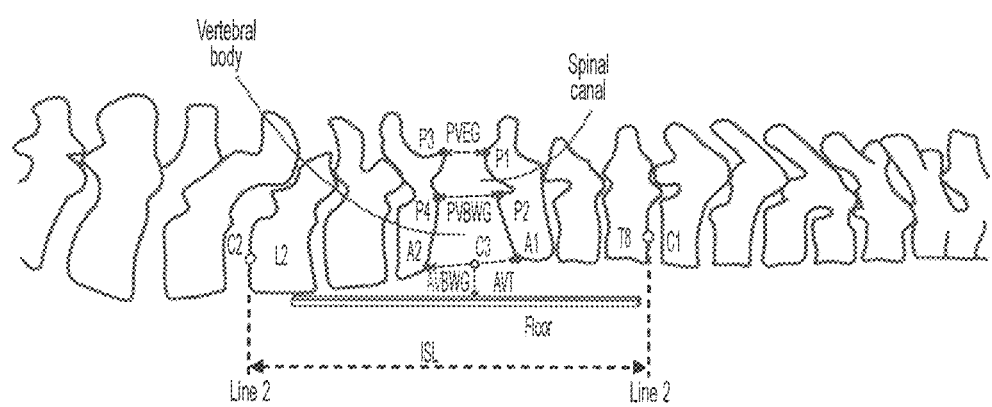
FIG. 23 shows measurements of the resection gap and spine column at the immediately post-reduction in the mid-sagittal plane.

The correction of angular kyphosis was initiated by loosening the locking bolts. One operator held the reduction rod holders on one side, while another controlled the DA-H on the opposite side. Upon loosening the hinge locking screws, the closure of the resected gap was initiated through gradual compression forces applied to the rod holders (FIG. 21). The compression of the rod holders aimed to reduce the gap of the posterior vertebral elements, elongate the anterior portion of the vertebral body, and translate the spine from the dorsal to ventral aspect. Throughout the reduction maneuver, the spine segments were carefully assessed for any potential axial translation, as well as shear and bending in other planes. Once the correction was achieved (FIG. 22), the stabilization locking bolts and hinge locking screws were securely tightened. The resected gap was then measured and compared to the pre-reduction gap to assess the extent of shortening or lengthening in the PVEG, PVBWG, and AVBWG (FIG. 23). Additionally, the ISL and AVT were re-measured.

The severe angular kyphosis underwent repeated correction at each of the six hinge positions, and the corresponding data were recorded. The percentage change (%) of the resected gap was determined using the formula: (post-reduction length−pre-reduction length)/pre-reduction length×100%. A positive value indicates lengthening, while a negative (−) value indicates shortening of the resected gap. The Cobb angle correction rate was calculated as (post-reduction angle−pre-reduction angle)/pre-reduction angle× 100%. The ISL lengthening rate was calculated as (post-reduction length−pre-reduction length)/pre-reduction length×100%. The AVT from the dorsal to ventral aspect was calculated as the pre-reduction AVT subtracting the post-reduction AVT.

FIG. 21 shows the spine column with the Uni-CH in the pre-reduction. The HPL was in the level of the posterior vertebral body wall. FIG. 22 shows the spine column with the Uni-CH at the immediately post-reduction. FIG. 23 shows a schematic picture of a conceptual framework 2300 for illustrating the measurements of the resection gap and spine column at the immediately post-reduction in the mid-sagittal plane, using the same points and lines of reference as the conceptual framework 2000 of FIG. 20 as described herein, and additionally including designation of vertebra L1, T9, T10, and T12.

Figure 24:
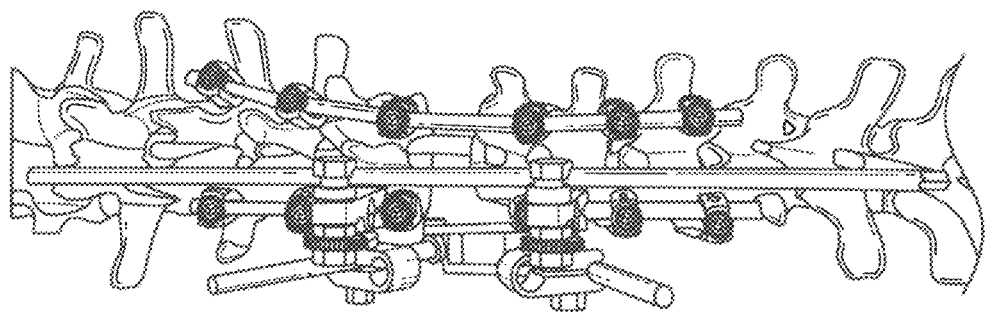
FIG. 24 shows a top view of the construct, with the final rod positioned on the left side.

After the correction, the locking bolts and hinge locking screws were securely tightened. The final rod was measured and positioned on the left side. FIG. 24 shows a top view of the construct, with the final rod positioned on the left side. The set-screws were used to secure the final rod in place. The set-screws (indicated by arrows) were then intentionally loosened to act as a guide for further closure of the resection gap in the cephalad-caudal direction.

Figure 25:
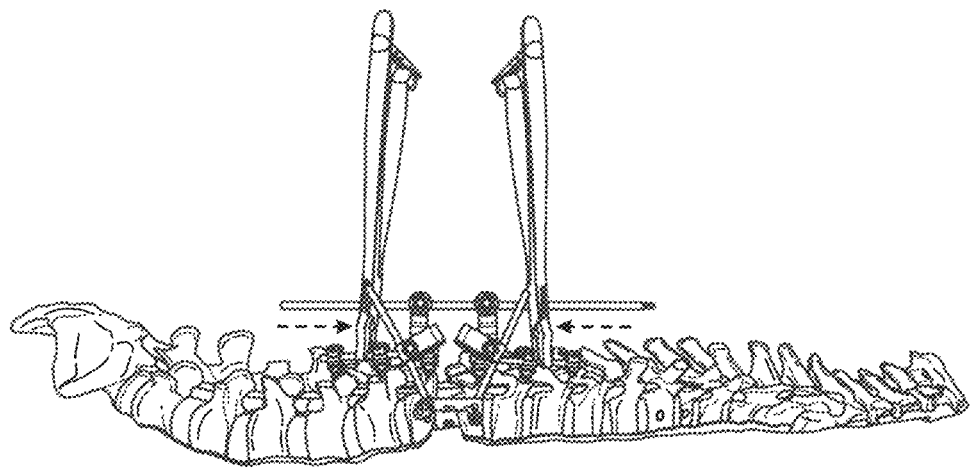
FIG. 25 shows the use of a cage to support the anterior column of the resection area.

To support the anterior column of the resection area, a cage was employed. The closure of the resection gap in the cephalad-caudal direction involved loosening the locking bolts and hinge locking screws, followed by compression of the rod holders (FIG. 25). This technique ensured that the force of reduction was distributed across multiple vertebral levels, as the resection gap was closed from the construct-rod above to the construct-rod below. FIG. 25 shows the use of a cage to support the anterior column of the resection area. The closure of the resection gap in the cephalad-caudal direction was accomplished during this stage.

Figure 26:
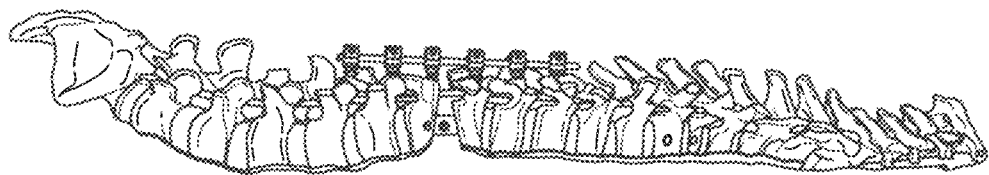
FIG. 26 shows the removal of the uniplanar clamp hinge and provisional spine rods, followed by the fixation of the final rod on the right side.

After the successful closure of the resection gap, the final rod on the left side was securely tightened using the set-screws. The Uni-CH and provisional spine rods were then removed, and the final rod was firmly fixed on the right side (FIG. 26). FIG. 26 shows the removal of the Uni-CH and provisional spine rods, followed by the fixation of the final rod on the right side.

Figure 27A:
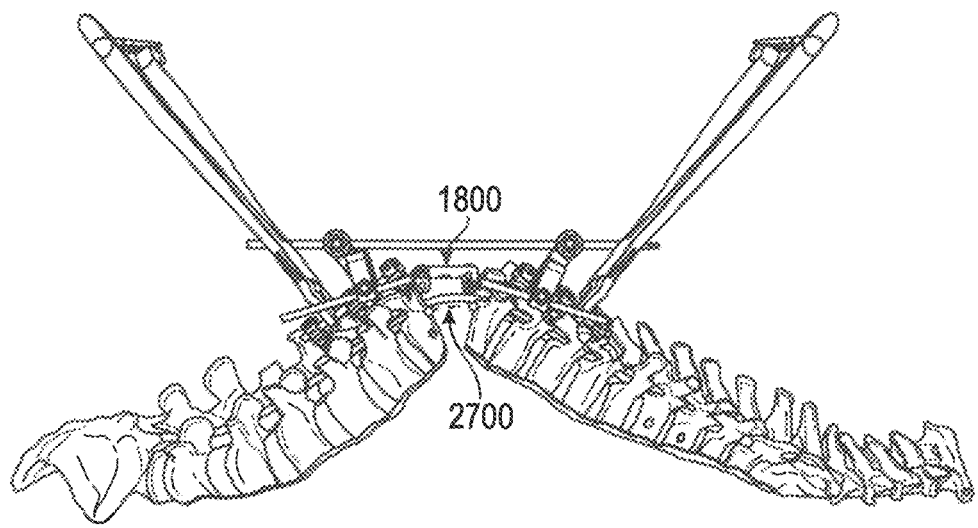
FIG. 27A shows the hinge position line located at the level of the posterior vertebral elements during the pre-reduction phase.
Figure 27B:
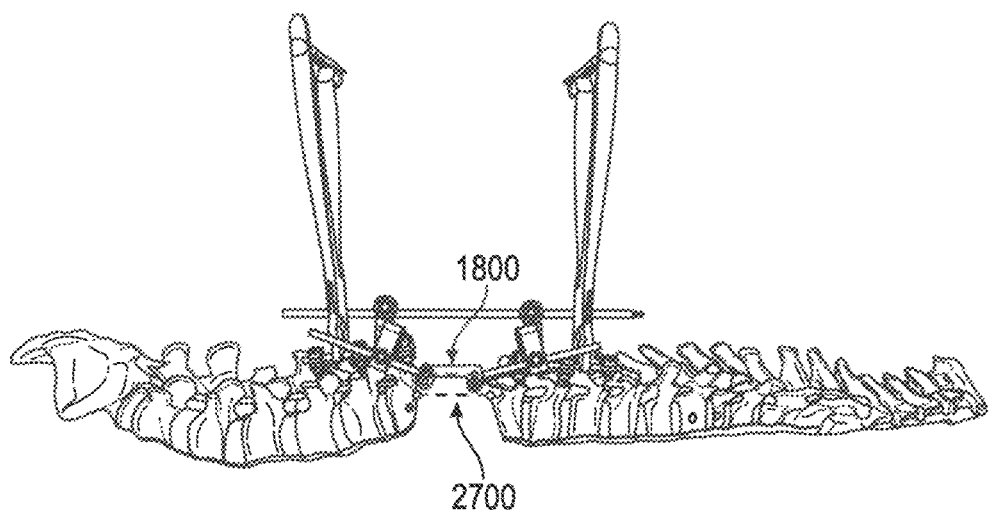
FIG. 27B shows the spine column immediately after the reduction.

FIG. 27A shows the HPL 1800 located at the level of the posterior vertebral elements during the pre-reduction phase. FIG. 27B shows the spine column immediately after the reduction. The posterior vertebral body wall gap (PVBWG) 2800 or floor of the spinal cord was lengthened by 105%.

Figure 28A:
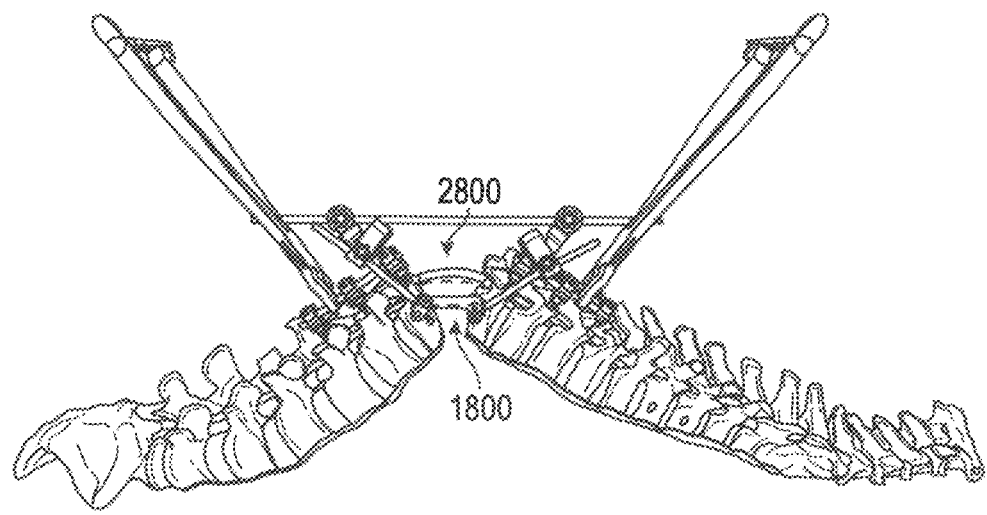
FIG. 28A shows the HPL located at the level of the anterior ⅓ vertebral body during the pre-reduction phase.
Figure 28B:
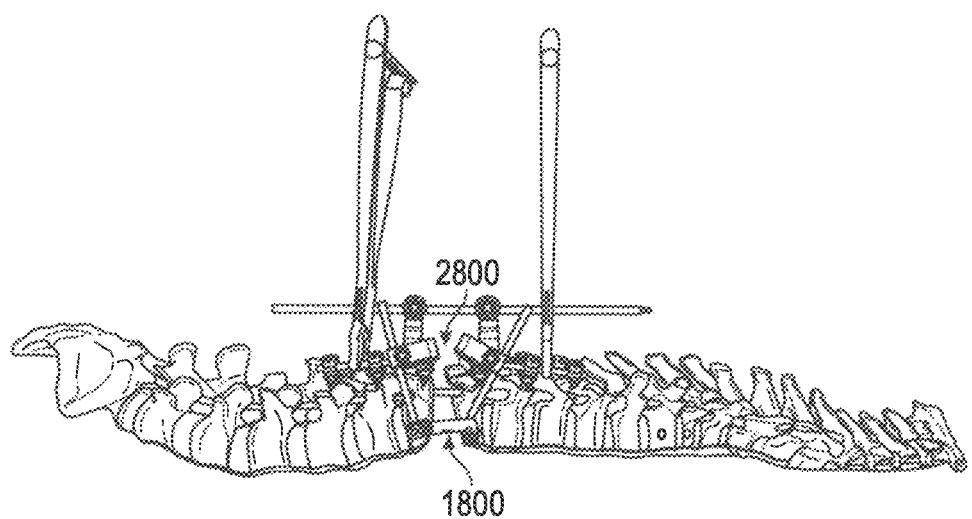
FIG. 28B shows the spine column immediately after the reduction.

FIG. 28A shows the HPL 1800 located at the level of the anterior ⅓ vertebral body during the pre-reduction phase. FIG. 28B shows the spine column immediately after the reduction. The posterior vertebral body wall gap (PVBWG) 2800 or floor of the spinal cord was shortened by 74%.

Prior to the correction, a thoracolumbar angular kyphosis of mean 82.7±0.5° with the apex located at T11 was present. The mean of PVEG, PVBWG, and AVBWG was 43.4±0.5 mm, 32.4±0.5 mm, and 14.2±0.4 mm, respectively. The mean of ISL and AVT was 138.3±0.7 mm and 117.8±3.0 mm, respectively.

After the correction, the angular kyphosis was corrected to 0°, indicating a correction rate of 100%. The mean change of AVT from the dorsal to ventral aspect measured 107.5±3.7 mm. The ISL exhibited an increase from a pre-reduction mean of 138.3±0 7 mm to a post-reduction mean of 192.6±20.9 mm, indicating a mean increase of 39.2±15.2%.

During the reduction maneuver, no axial translation or shear bending of the spine segments was observed in other planes.

FIG. 29 shows Table 1, setting forth lengthening (positive) or shortening (negative) percentage change at resection gap at different hinge positions after reduction using a 30 mm hinge. When the HPL was positioned within the area of the spinal canal and the posterior vertebral elements, the PVBWG lengthened, ranging from 41.6% to 104.7%. However, the PVBWG slightly shortened by 3% when the HPL was located at the level of the posterior vertebral body wall. Furthermore, when the HPL was positioned at the area of the vertebral body, the PVBWG experienced a shortening ranging from 26.7% to 74%.

FIG. 30 shows Table 2, setting forth lengthening (positive) or shortening (negative) percentage change at resection gap at different hinge positions after reduction using a 15 mm hinge.

FIG. 31 shows Table 3, setting forth lengthening (positive) or shortening (negative) percentage change at resection gap at different hinge positions after reduction using a 30 mm hinge.

In cases of severe angular kyphosis, the apical vertebrae are located posteriorly, causing the spinal cord to be stretched towards the posterior section and tightly draped over the posterior vertebral body wall or the floor of the spinal canal [6-8, 10, 14]. The VCR procedure for angular kyphosis aims to shorten the posterior portion and lengthen the anterior portion at the resection area, effectively transitioning the spine from a dorsal to a ventral orientation [17]. The abnormalities observed in the spinal column at the apex provide important insights for VCR procedures.

Firstly, when initiating the resection of the apical vertebral body, it is crucial to perform the resection of the posterior vertebral body wall before removing the anterior vertebral body. This approach allows the apical spinal cord to drift slightly more ventrally and reduce tension before proceeding with the removal of the anterior body. However, in actual VCR procedures, the posterior vertebral body wall is typically the last part to be resected to minimize epidural bleeding [7, 8, 10, 14]. Therefore, it is essential to consistently and firmly stabilize the apex during the resection since the spine segments become extremely unstable, increasing the risk of subtle stretching of the spinal rod over the apex [18].

Secondly, after completing the resection, the reduction process involves narrowing the gap created by the resection and shifting the spine ventrally. It is crucial to ensure that the spinal cord is always shortened, not lengthened, with posterior compression as the main corrective technique. Lengthening should only be performed once sufficient shortening has been achieved, resulting in adequate slack of the ventral dura/spinal cord. However, in certain situations where the compressive hinge is not appropriate, the posterior compression force may inadvertently cause distraction or stretching of the spinal cord. Loss of motor-evoked potential monitoring data has been reported to occur most commonly during the spinal compression correction [7, 8, 10, 14].

Thirdly, it is crucial to ensure the placement of an appropriate intervertebral cage for patients with severe angular kyphosis. The anterior cage serves as a hinge for kyphosis correction and protects against both excessive shortening and ventral buckling of the spinal cord. However, providing adequate anterior support is challenging because the anterior gap transitions from a short to a long position during the kyphosis reduction process. Consequently, the initial choice of the anterior cage is typically short, which may lead to over-shortening of the spinal cord. Excessive shortening of the ventral spinal cord has been reported to result in the loss of motor-evoked potential data when using a shorter anterior column support cage [7, 8, 10, 14].

Fourthly, the reduction of the resected gap should be performed by closing from a construct rod above to a construct rod below, distributing the corrective forces over several levels. This approach can prevent any ventral drift of the spinal segment, particularly caudal to the VCR level. Since the lower spine and hips are usually in extension on the operative table, it is common for the distal spinal column to tend to migrate ventrally following the resection and during the closure of the resected gap, exerting ventral pressure on the more proximal spinal segment of the neural elements [7, 8, 10, 14]. However, the current reduction procedure is performed using the individual pedicle screws, even in patients with poor bone stock. Shorting the resection gap through the individual pedicle screws may result in the failure of correction and spinal subluxation.

Taking into consideration the pathological anatomies of severe angular kyphosis and the limitations of current surgical techniques, we have developed the Uni-CH to enhance the safety and efficiency of VCR for severe angular kyphosis. The Uni-CH addresses the challenges associated with exchanging provisional rods by providing consistent and firm stability to the spinal column above and below the resection gap. This feature is crucial in preventing and treating spinal subluxation, which poses a significant risk during these procedures.

The primary advantage of the Uni-CH is its adjustable and controllable hinge mechanism, which prevents excessive shortening or lengthening of the spinal cord during the reduction maneuver. Our data demonstrates that when the hinge pivot is positioned at the level of the posterior vertebral body wall, the PVBWG is maintained, and a slight shortening of 3% is achieved during the reduction maneuver. This allows for the shortening of posterior vertebral elements by 47.1% and lengthening of the anterior vertebral body by 248.6%, facilitating the transition of the spine toward the ventral portion.

It is important to note that when the hinge position is at the spinal canal area or the posterior vertebral elements, which are located behind the posterior vertebral body wall, our measurements show that the PVBWG lengthens by 41.6% and 104.7%, respectively, with more posterior locations resulting in greater lengthening. This may lead to distraction of the spinal cord. Therefore, these results suggest that the hinge should not be located at the posterior vertebral elements during the reduction of angular kyphosis, as it can result in lengthening of the spinal cord and risk damaging the spinal cord (FIGS. 27A and 27B).

On the other hand, when the hinge is located at the vertebral body area, which is in front of the posterior vertebral body wall, the PVBWG shows a shortening ranging from 26.7% to 74%, with more anterior locations resulting in greater shortening. This may explain why, in clinical practice during the reduction of angular kyphosis, the spinal cord experiences over-shortening when using the anterior support cage as the hinge pivot, especially with a shorter cage [7, 8, 10, 14]. Our data suggests that when using the cage as the hinge pivot, it should be positioned at the posterior portion of the resected vertebral body, rather than the anterior portion, to prevent excessive shortening of the ventral spinal cord (FIG. 28).

The Uni-CH plays a crucial role in achieving the construct-to-construct closure mechanism during the shortening reduction of the resection area. It effectively connects with the provisional spine rod over multiple levels, functioning as a unified construct both above and below the resected gap, thereby avoiding dependence on individual pedicle screws. This provides a controllable and adjustable mechanism for applying corrective compressive forces between the constructs.

There are several limitations to consider in this study. Firstly, the use of a saw bone simulating model, which does not fully replicate the complexity of severe angular kyphosis in humans, prevents the assessment of real neurological safety in the VCR procedure. However, it is important to note that our primary objective was to test the underlying principles and concepts. Secondly, the data collection in this study was based on a 100% correction rate for the deformity. We acknowledge that achieving a 100% correction rate may not be feasible in real-world situations for severe angular kyphosis. Thirdly, the hinge used in this study had a fixed length of 30 mm for both axes. While the results effectively demonstrate our goals, it would be beneficial to explore the selective principles of the hinge by using hinges of different sizes. We have included additional data in the appendix, specifically Table 2 in FIG. 30 and Table 3 in FIG. 31, which present the results obtained using hinges with lengths of 15 mm and 45 mm, respectively.

In conclusion, the Uni-CH demonstrates its ability to provide consistent stability to the spinal segments and serves as an adjustable and controllable hinge for VCR correction of severe angular kyphosis in the saw bone model. The choice of the appropriate hinge should be based on the extent of the PVBWG. Positioning the hinge pivot at the level of the posterior vertebral body wall allows for the maintenance of the PVBWG, thereby preventing excessive shortening or lengthening of the spinal cord during VCR reduction of severe angular kyphosis.

Figure 32:
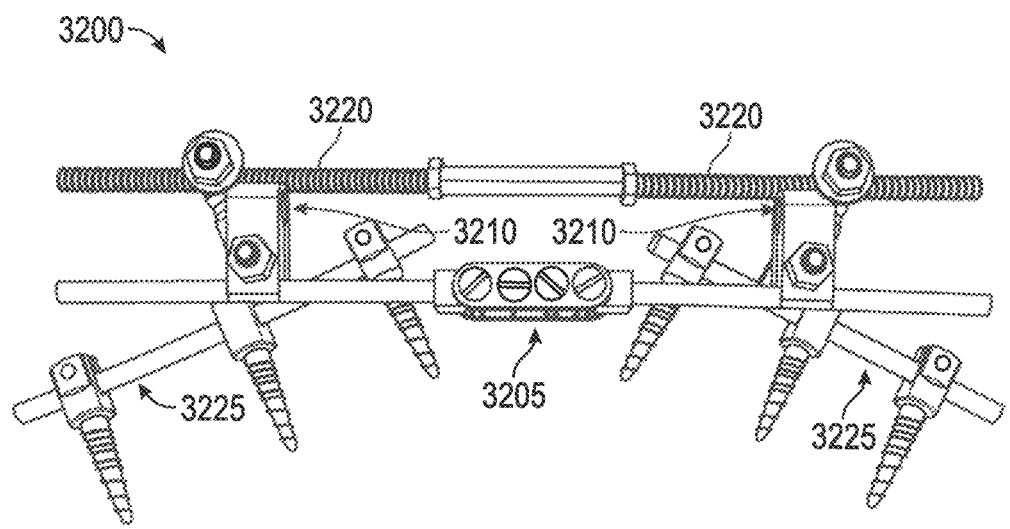
FIG. 32 shows another embodiment of a uniplanar clamp hinge.

FIG. 32 shows another embodiment of a uniplanar clamp hinge (Uni-CH) 3200. The embodiment includes a geared dual-axis hinge 3205, two uniplanar clamps (UN-C) 3210, a stabilizing reduction rod 3220 with opposite pitch threaded ends, and two provisional spine rods 3225.

Figure 33:
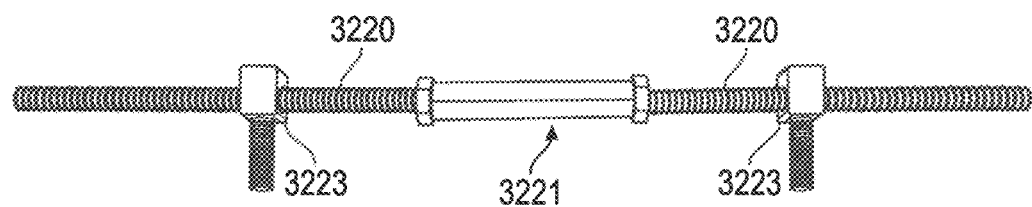
FIG. 33 shows a stabilizing reduction threaded rod.

FIG. 33 shows the stabilizing reduction threaded rod 3220 with opposite pitch threaded ends, where the stabilizing reduction threaded rod 3220 includes a rigid hex center link 3221, and two thread travelers 3223.

FIGS. 34A and 34B show a top view and a front view of the geared dual-axis hinge 3205, respectively. The geared dual-axis hinge 3205 includes two hinge rods 3206, four gears with dual-axis rotation (not shown), and locking screws 3207. The hinge rods 3206 are rotationally connected to the gears, enabling uniplanar movement. The locking screws allow the gears to be secured at a desired angle, controlling sagittal plane correction. The geared dual-axis hinge 3205 is specifically designed to minimize hinge translation during the reduction maneuver by providing two axes of rotation. It features a low-profile design, offering a full range of motion at any hinge position. FIG. 34C shows a range of motion of the geared dual-axis hinge 3205 in one direction. FIG. 34D shows a range of motion of the geared dual-axis hinge 3205 in the opposite direction. In FIGS. 34C and 34D, the hinge axis 3208a at the distal portion is shown, the hinge axis 3208b at the proximal portion is shown. The line connecting the hinge axis 3208a and the hinge axis 3208b is referred to as the hinge position line (HPL) 3209, which serves as a reference position for the hinge placement in relation to the deformities. The length of the HPL 3209 can vary depending on the specific deformities, offering flexibility in selecting the appropriate hinge position.

FIGS. 35A and 35B illustrate the front view and the side view of the UN-C 3210, respectively. The UN-C 3210 is designed with two spring-loaded snap on clamps 3211 to accommodate three rods 3206, 3220, and 3225. The first snap on clamp 3211 accepts the hinge rod 3206, while the second snap on clamp 3211 receives the provisional spine rod 3225. Additionally, the clamp on the provisional spine rod section of the clamp 3210 features an integrated locking tab 3212 that allows for the attachment of the stabilizing reduction threaded rod 3220. The UN-C 3210 includes two independent rod locking nuts 3213, 3214 and one stabilizing rod locking bolt 3215. The provisional spine rod locking nut 3214 secures the provisional spine rod 3225 but does not lock the clamp on the hinge rod 3206. The hinge rod locking nut 3213, on the other hand, locks the hinge rod 3206 and does not affect the clamp on the provisional spine rod 3225 side. Consequently, the hinge rod locking nut 3213 can be loosened to facilitate repositioning of the geared dual-axis hinge 3200 without impacting the stability of the provisional spine rod 3225 side of the clamp. The stabilizing reduction threaded rod 3220 is utilized to stabilize the resection gap when its locking bolts 3215 are tightened. By loosening the locking bolts 3215 and rotating the rigid hex center link 3221 (not shown; see FIG. 33), the proximal and distal spine segments can be angled around the hinge axes. The UN-C 3210 restricts axial translation of the segments and prevents shear and bending in all other planes. Loosening the hinge rod locking nuts 3213 for repositioning of the UN-C 3210 does not compromise stability when the stabilizing reduction threaded rod 3220 is securely engaged.

Figure 36A:
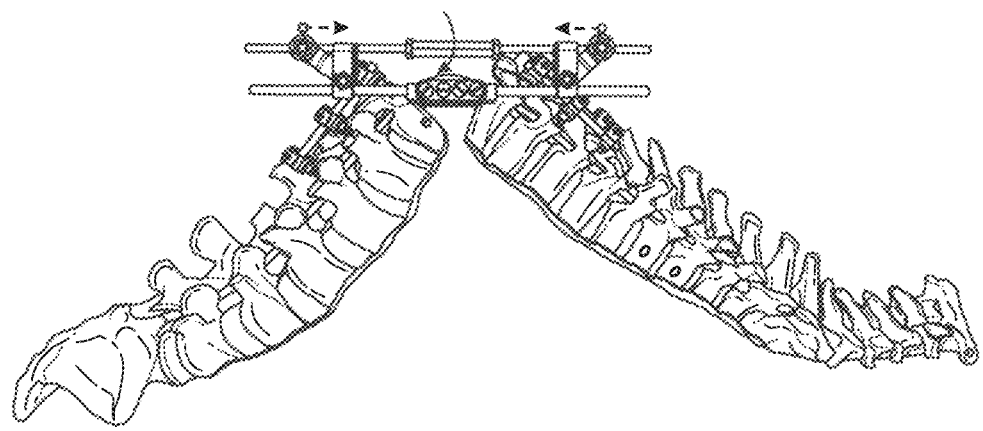
FIGS. 36A, 36B, and 36C show a geared dual-axis hinge at various stages of a reduction.
Figure 36B:
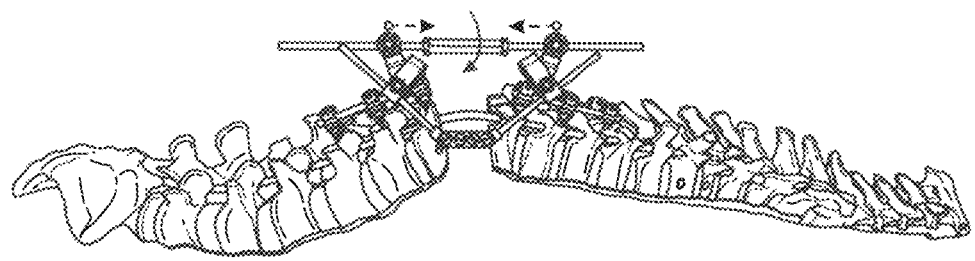
Figure 36C:
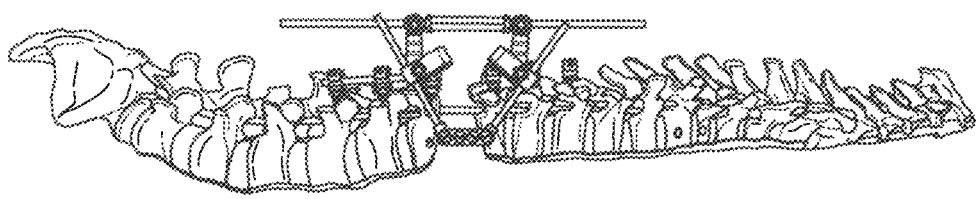

FIG. 36A shows the geared dual-axis hinge situated at the level of the posterior vertebral body wall during the pre-reduction phase. By rotating the rigid hex center link, the two thread travelers move toward the center, facilitating the correction of angular kyphosis. FIG. 36B shows the angular kyphosis with a correction rate of 50%. FIG. 36C shows the angular kyphosis with 100% correction achieved.

Figure 37A:
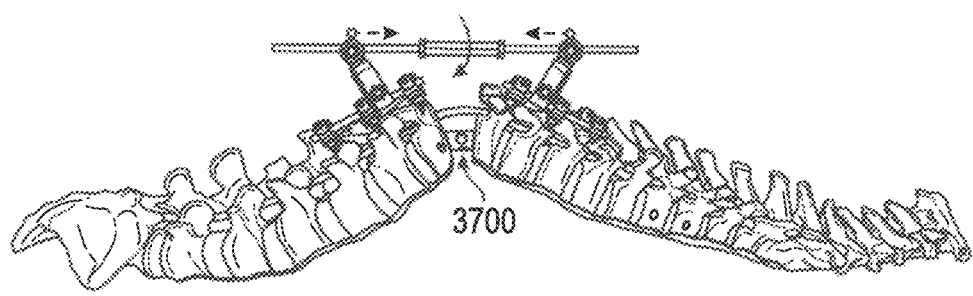
FIGS. 37A and 37B show the use of a vertebral body support cage as a hinge.
Figure 37B:
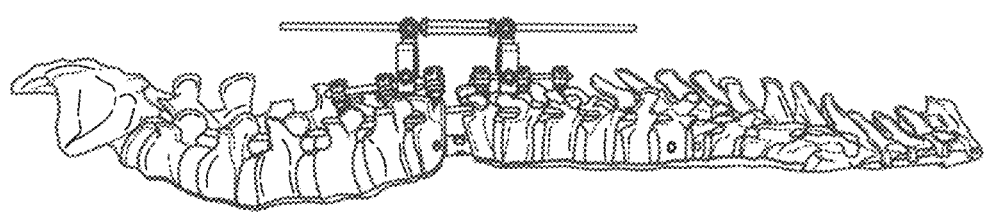

FIG. 37A shows the utilization of a vertebral body support cage 3700 as a hinge for correcting angular kyphosis. By turning the rigid hex center link, the two thread travelers move towards the center, facilitating the correction of angular kyphosis. FIG. 37B displays the angular kyphosis fully corrected by 100%.

Figure 38:
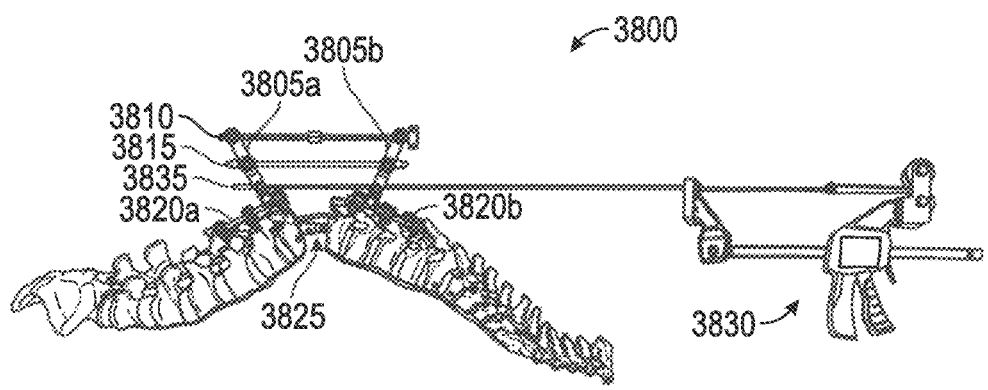
FIG. 38 shows a reduction device (RD) correction system including two uniplanar clamps, a reduction rod with opposite pitch threaded ends, a stabilizing rod, two provisional spine rods, an adjustable cage, and a constant force compression device.
Figure 41:
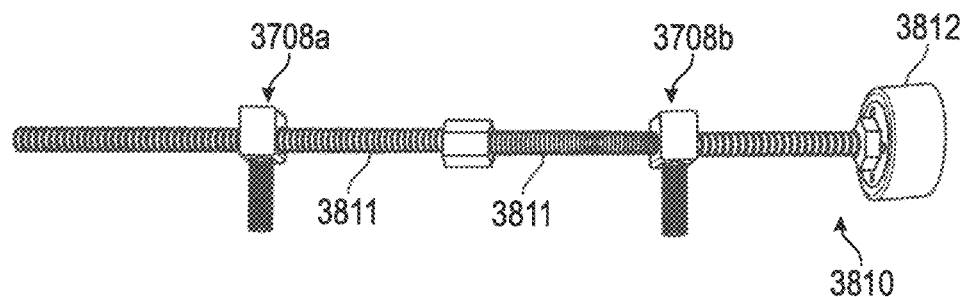
FIG. 41 shows the reduction rod, which consists of a rod with threaded ends of opposite pitch, two lockable differentially threaded reduction bolts, and a knob integrated into the reduction rod.
Figure 42:
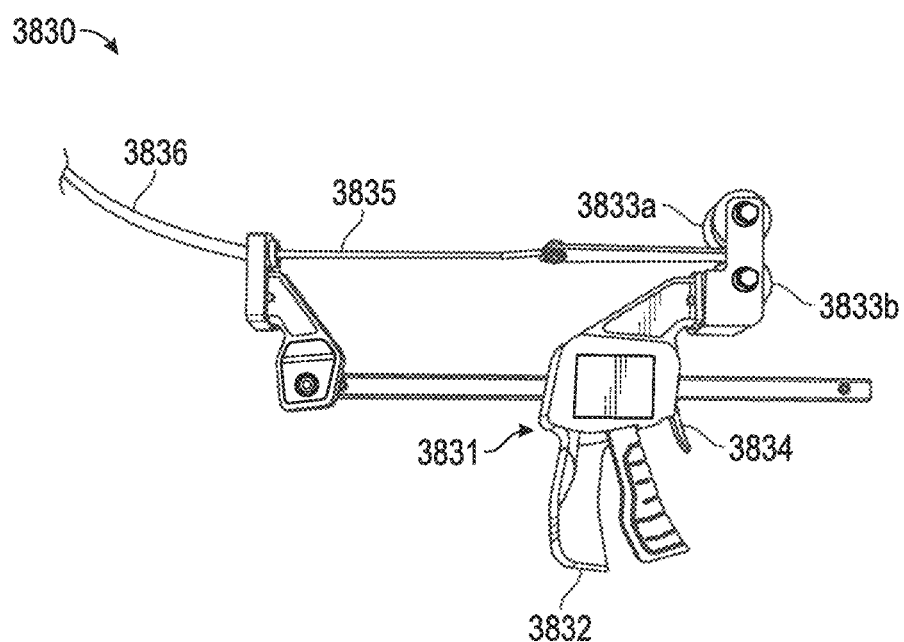
FIG. 42 shows a front view of a constant force compression device.

FIG. 38 shows a reduction device (RD) correction system 3800 that includes two uniplanar clamps 3805a and 3805b (see FIGS. 39 and 40), a reduction rod 3810 with opposite pitch threaded ends (see FIG. 41), a stabilizing rod 3815, two provisional spine rods 3820a and 3820b, an adjustable cage 3825, and a constant force compression device 3830 (see FIG. 42). The RD correction system was used to correct thoracolumbar angular kyphosis in a sawbones model. A uniplanar clamp 3805a or 3805b was applied to each of the provisional spine rods 3820a or 3820b, one at the cephalad and another at the caudal end. The stabilizing rod 3815, responsible for stabilizing the spine segments, and the reduction rod 3810 with thread ends of opposite pitch, which enables compressive reduction, were secured by passing locking bolts and threaded reduction bolts 3807a and 3807b (not shown, see FIGS. 40 and 41) across the resection gap. An adjustable cage 3825 was positioned within the resected gap to provide solid anterior support for the resection area and to act as a reduction hinge. A constant force cable 3835 was affixed to supply adjustable constant tension in the range of 5-10 pounds using the constant force compression device 3830. This constant force cable 3835 plays a pivotal role in both securing and stabilizing the adjustable cage 3825, as it works in conjunction with the adjustable cage 3825 to fulfill its function as a reduction hinge.

Herein, correction of thoracolumbar angular kyphosis is discussed as anon-limiting example. The present invention can be used to perform other types of spinal surgery.

Figure 39:
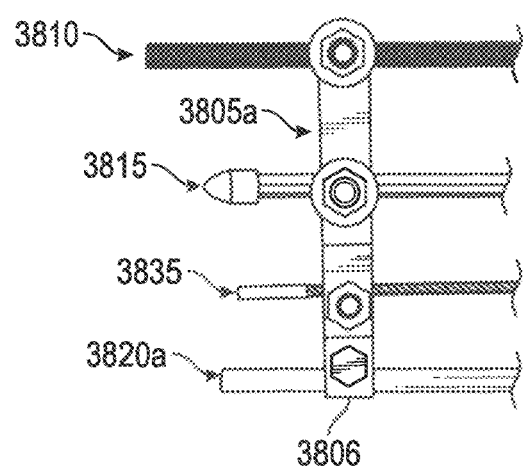
FIG. 39 shows a front view of the uniplanar clamp.

FIG. 39 shows a front view of the uniplanar clamp 3805a. (Uniplanar clamp 3805b, not shown, is similar to uniplanar clamp 3805a.) This uniplanar clamp 3805a is designed with a single spring-loaded snap 3806 to securely hold the provisional spine rod 3820a. Furthermore, it is equipped to accommodate a reduction rod 3810, a stabilizing rod 3815, and a constant force cable 3835.

Figure 40:
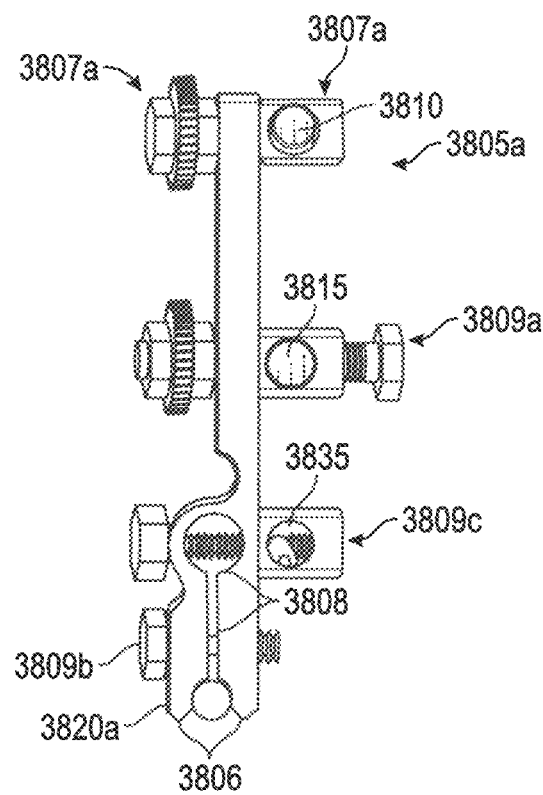
FIG. 40 shows a side view of the uniplanar clamp.

FIG. 40 shows a side view of the uniplanar clamp 3805a. This uniplanar clamp 3805a features three independent locking bolts, two rod locking nuts, and one cable locking set-screw. The locking bolts are responsible for securing the orientation of the uniplanar clamp 3805a, but they do not fix the position of the stabilizing rod 3815. The stabilizing rod locking nut 3809a and provisional spine locking nut 3809b, on the other hand, secure the stabilizing rod 3815 and the provisional spine rod 3820a in place. However, they do not affect the orientation of the clamp 3805a. Lastly, the cable locking set-screw 3809c is used to fasten the constant force cable 3835 securely. Also shown is the reduction rod 3810, the spring-loaded snap on 3806, the lockable differentially threaded reduction bolt 3807a, and an open-ended clamp 3808.

FIG. 41 shows the reduction rod 3810, which includes a rod 3811 with threaded ends of opposite pitch, two lockable differentially threaded reduction bolts 3807a and 3807b, and a knob 3812 integrated into the reduction rod 3811. Turning the knob 3812 allows for either the compression or distraction of the reduction bolts 3807a and 3708b.

FIG. 42 shows a side view of a custom-fabricated constant force compression device 3830. This device consists of several key components, including an adjustable-length mechanical base 3831, a self-locking pump handle 3832, dual constant force springs 3833a and 3833b, and a cable 3835 with a cable sheath 3836. Its primary function is to act as a generator of constant force. To achieve displacements of up to 150 mm, the self-locking pump handle 3832 is employed to adjust the position of the constant force spine assembly. Within this range, a constant force can be applied remotely through the flexible cable assembly. At any given moment, the force can be released by simply pressing the release tab 3834, allowing the spring assembly 3833a and 3833b to return to its zero-displacement position. Each of the dual constant force springs 3833a and 3833b exerts 5 lbs. of force, providing a total constant force of 10 lbs. with independent length control.

Figure 43:
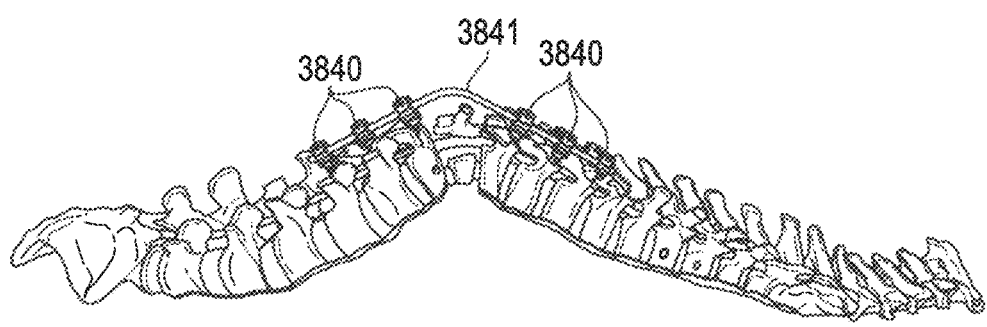
FIG. 43 shows a placement of bilateral kyphosis rods placed to induce a thoracolumbar angular kyphosis.

A Severe Angular Kyphosis in a Sawbones Spine Model. A Sawbones spine model (Model 1323-23; Sawbones, Vashon, Washington) consisting of the T1 to sacrum segments was utilized to simulate thoracolumbar severe angular kyphosis as shown in FIG. 43. In FIG. 43 bilateral pedicle screws 3840 (5.5-mm diameter poly-axial pedicle screw, CD Horizon Legacy, Medtronic) were inserted at T8-T10 and T12-L2 (not shown), while the apical vertebra T11 remained un-instrumented. The apical vertebra T11 was trimmed to create a wedge-shaped vertebra. Subsequently, bilateral 5.5 mm diameter kyphosis rods 3841, pre-contoured with a 128° bend, were placed to induce a thoracolumbar angular kyphosis with the apex located at T11. The angular kyphosis was quantified as 52° at the T9-L1 segment using the Cobb method.

Simulation and data collection. After removal of the posterior elements of the apical vertebra, the right kyphosis rod was extracted, and two provisional spine rods were affixed to the cephalad (T8-T10) and caudal (T12-L2) segments (see FIG. 44). A clamp was then secured to each of the provisional spine rods. Each clamp was positioned just above and below the resection area, and its orientation was perpendicular to the spine rod in the sagittal plane (see FIG. 45). To provide stabilization, a stabilizing rod was fixed across the resection gap using locking bolts. The orientation of the stabilizing rod aligned parallel to the spinal cord in the sagittal plane (see FIG. 46).

Figure 44:
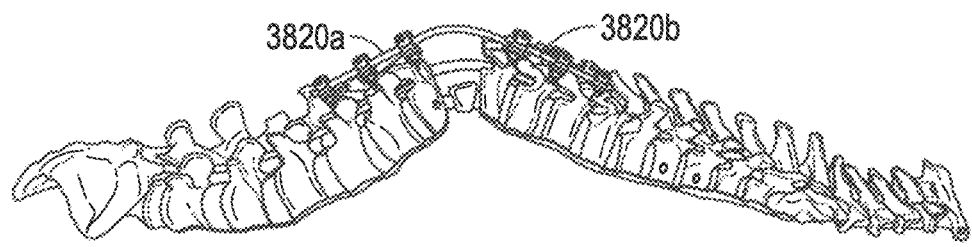
FIG. 44 shows a fixation of two provisional spine rods to the right side—one at the cephalad portion and the other at the caudal portion.

As shown in FIG. 44, after removing the posterior elements of the apical vertebra, two provisional spine rods 3820a and 3820b were affixed to the right side—one at the cephalad portion and the other at the caudal portion.

Figure 45:
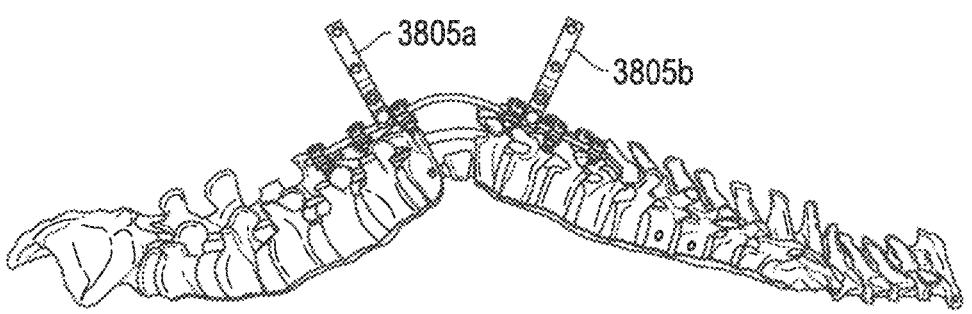
FIG. 45 shows a placement of a single uniplanar clamp, each affixed to the respective cephalad and caudal provisional spine rods on the right side.

FIG. 45 shows the placement of the uniplanar clamps 3805a and 3805b, each affixed to the respective cephalad and caudal provisional spine rods on the right side.

Figure 46:
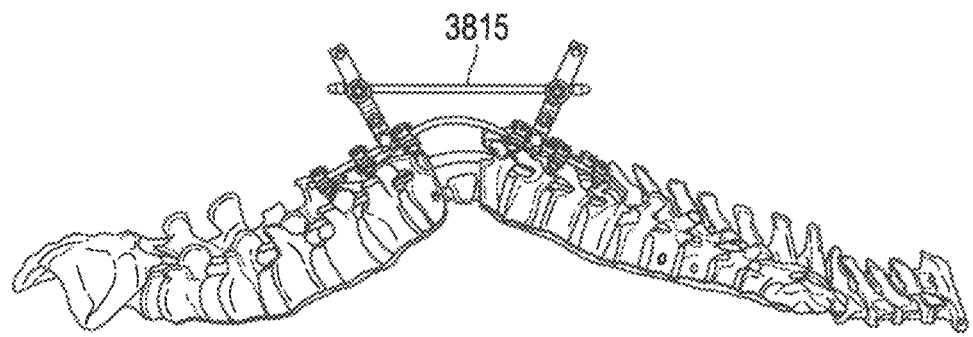
FIG. 46 shows a securing of the stabilizing rod by crossing over the apex and using the locking bolts.

FIG. 46 illustrates the securing of the stabilizing rod 3815 by crossing over the apex and using the locking bolts.

After securing the reduction rod 3810 with locking bolts (see FIG. 47), the resection of the apical anterior vertebral body began. Once the entire vertebral column was removed, the spine was divided into its cephalad and caudal segments based on the level of resection (see FIG. 48).

Figure 47:
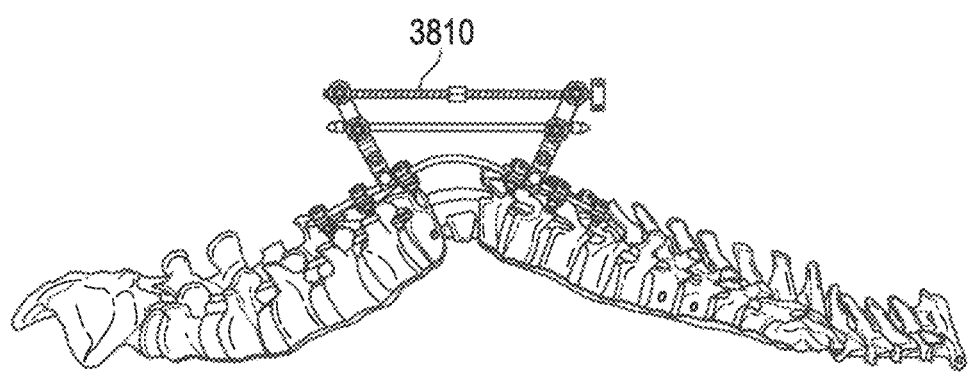
FIG. 47 shows a securing of the reduction rod by crossing over the apex using locking bolts.

As shown in FIG. 47, the reduction rod was secured by crossing over the apex using locking bolts. Subsequently, the entire apical vertebra began to undergo resection.

Figure 48:
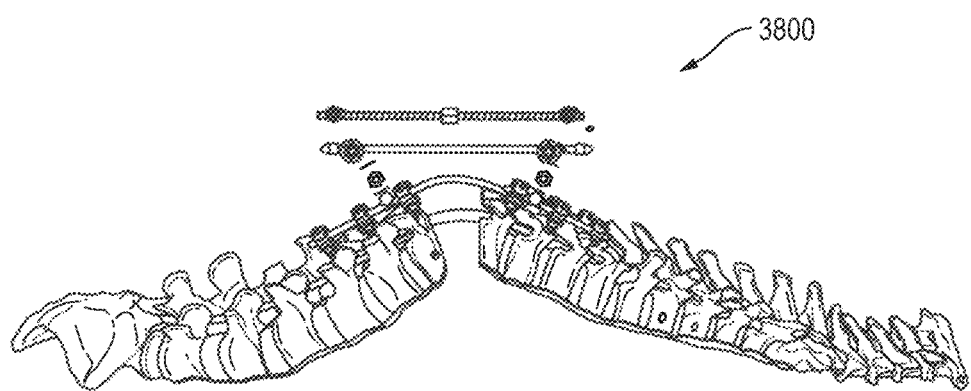
FIG. 48 shows a complete resection of the entire apical vertebral body.

FIG. 48 shows the complete resection of the entire apical vertebral body with the reduction device 3800.

The resection gap was initially measured as a baseline prior to the reduction maneuver. The resection gap was measured in three specific sections (see FIG. 49): (1) Posterior vertebral elements gap (PVEG): this section represents the dorsal structures of the spine. (2) Posterior vertebral body wall gap (PVBWG): this measurement signifies the length of the spinal cord. The PVBWG can be likened to the spinal cord since it constitutes the floor of the spinal canal and is frequently situated in close proximity to the spinal cord. In instances of severe angular kyphosis, the spinal cord directly overlies the PVBWG. Furthermore, the PVBWG serves as a prominent intraoperative radiographic reference point. (3) Anterior vertebral body wall gap (AVBWG): this section represents the ventral portion of the spine. Additionally, the instrumented segments length (ISL) from T8 to L2 and the apical vertebral translation (AVT) were recorded.

Figure 49:
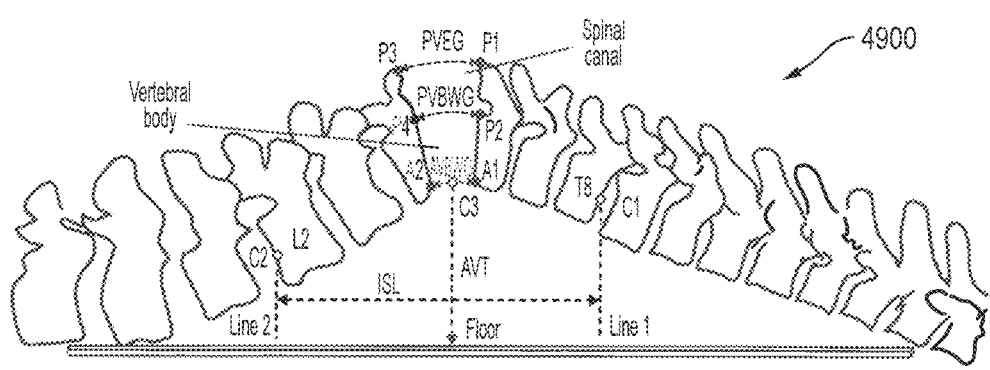
FIG. 49 shows measurements of the resection gap and spine column at pre-reduction in the mid-sagittal plane.

FIG. 49 shows a schematic picture of a conceptual framework 4900 with the measurements of the resection gap and spine column at pre-reduction in the mid-sagittal plane. In the conceptual framework 4900, in the cephalad resected section, A1 and P1 represent the most anterior and posterior edges, respectively, while P2 represents the posterior edge of the vertebral body. In the caudal resected section, A2 and P3 denote the most anterior and posterior edges, respectively, and P4 indicates the posterior edge of the vertebral body. The distance between A1 and A2 corresponds to the anterior vertebral body wall gap (AVBWG). The distance between P1 and P3 is the posterior vertebral elements gap (PVEG), and the distance between P2 and P4 represents the posterior vertebral body wall gap (PVBWG). C1 denotes the middle point of the superior margin of the T8, while C2 represents the middle point of the inferior margin of the L2. Line 1 and Line 2 are the perpendicular lines passing through C1 and C2, respectively. The distance between Line 1 and Line 2 is the instrumented segments length (ISL) from vertebra T8 to vertebra L2. C3 is the middle point of the anterior vertebral body wall, and the distance between C3 and the floor corresponds to the apical vertebral translation (AVT).

Figure 50:
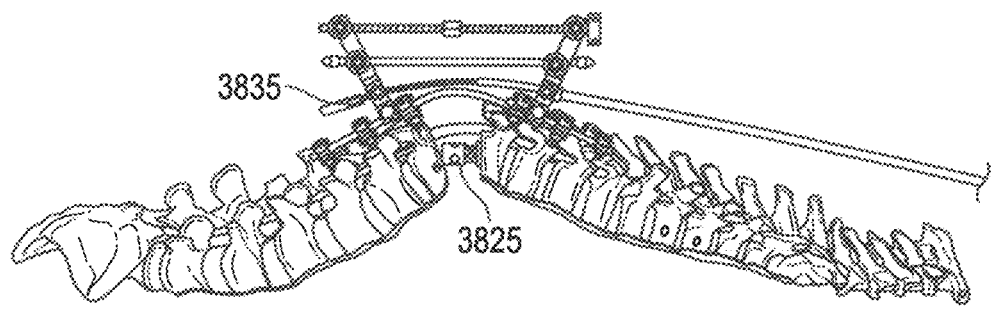
FIG. 50 shows a positioning of an anterior support cage, and a fixation of a constant force cable securely in place.

An adjustable cage 3825 was then customized to fit this resection gap and inserted into the posterior portion of the resected vertebral body. The height of the cage 3825 was set at 28 mm, based on the measurement of the posterior portion gap of the resected vertebral body. This adjustment is crucial to ensure that the height of the cage 3825 matches the posterior portion gap, preventing excessive shortening of the ventral aspect of the spinal cord. Subsequently, the constant force cable 3835 was inserted, and a constant force of 10 pounds was applied using the constant force compression device 3830 (see FIG. 50). As shown in FIG. 50, the anterior support cage 3825 was positioned, and the constant force cable 3835 was securely fixed in place. To assess the reduction of the resection gap with different cage heights, we employed two additional cage heights, namely a 19 mm and a 9 mm cage (not shown), for evaluation.

Figure 51:
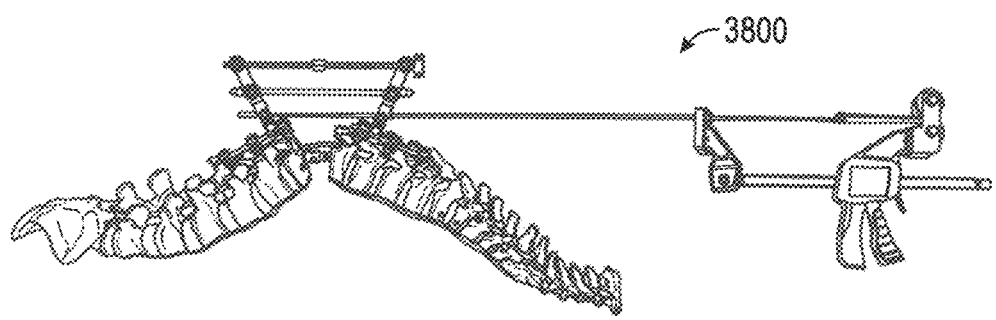
FIG. 51 shows the spine segments secured by the reduction device.

Afterward, the left kyphosis rod (not shown) was removed, leaving the spine segments solely supported by the reduction device 3800 (see FIG. 51). The resection gap was then re-measured and compared to the baseline measurement to assess the stability imparted by the reduction device 3800 to the spinal segments. FIG. 51 shows the spine segments secured by the reduction device 3800.

Figure 52:
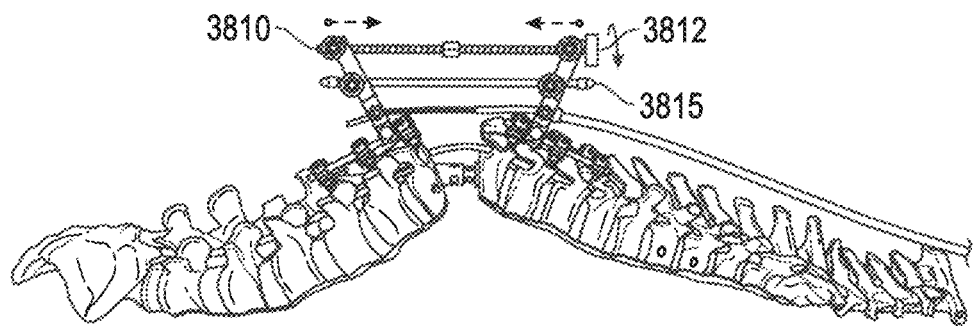
FIG. 52 shows a position of a cage, and an attachment of a constant force cable to serve as a reduction hinge after a complete resection of the vertebral column.

The correction of angular kyphosis was initiated by loosening the locking nut on the stabilizing rod 3815. Subsequently, the two reduction bolts on the reduction rod 3810 and the two locking bolts on the stabilizing rod 3815 were released. The deformity was then gradually corrected through a step-by-step, counterclockwise rotation of the reduction rod knob 3812 (see FIG. 52). As shown in FIG. 52, after the complete resection of the vertebral column, the cage was positioned, and a constant force cable was attached to serve as a reduction hinge. The deformity was methodically corrected by turning the reduction rod knob 3812.

Figure 53:
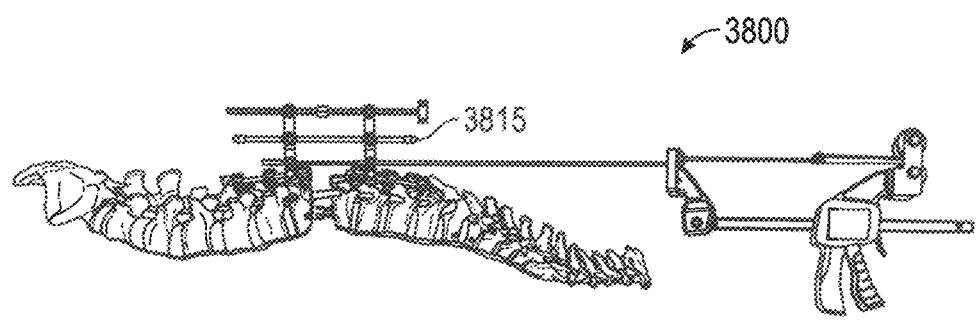
FIG. 53 shows the spinal column with the reduction device immediately following the reduction procedure.
Figure 54:
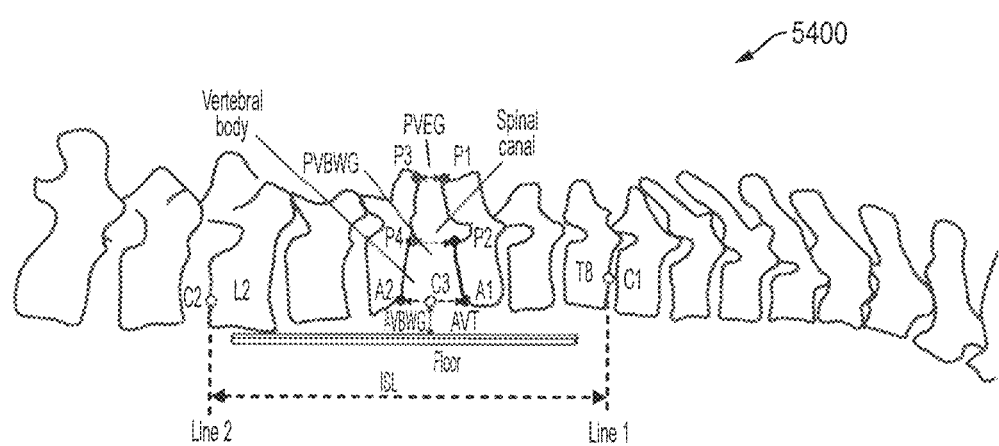
FIG. 54 shows the measurements of the resection gap and spine column at the immediately post-reduction in the mid-sagittal plane.

Following the correction process (see FIG. 53), the locking nut on the stabilizing rod 3815 and all four rod locking bolts were securely fastened. The corrected spine segments now relied solely on the reduction device for support, and its stability was assessed to determine its ability to stabilize the corrected spine. The resection gap was measured and compared to the pre-reduction gap to assess the extent of shortening or lengthening in PVEG, PVBWG, and AVBWG. Additionally, the ISL and AVT were re-measured (see FIG. 54). FIG. 53 shows the spinal column with the reduction device 3800 immediately following the reduction procedure. FIG. 54 shows a schematic picture of a conceptual framework 5400 with the measurements of the resection gap and spine column at the immediately post-reduction in the mid-sagittal plane, using the same designations of points and lines as those used in FIG. 49.

Figure 55:
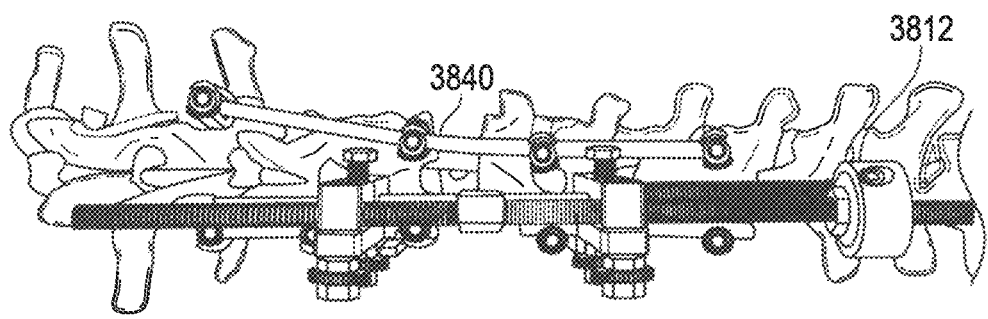
FIG. 55 shows a top view of the construct with the final rod positioned on the left side.

Subsequently, the final rod 3840 was measured and positioned on the left side. The set-screws were tightened on the final rod 3840, but they were left slightly loose to allow for further adjustment of the resection gap (see FIG. 55). FIG. 55 shows a top view of the construct with the final rod 3840 positioned on the left side. The set-screws were intentionally loosened to serve as a guide for further adjustment of the resection gap in the cephalad-caudal direction.

To further shorten the resection gap, the procedure involved loosening the locking nut on the stabilizing rod 3815 (not shown) while keeping all the locking bolts tightened and turning the reduction rod knob 3812 counterclockwise. This maneuver allowed the spinal segments to shorten along the cephalad-caudal direction.

Figures 56, 57:
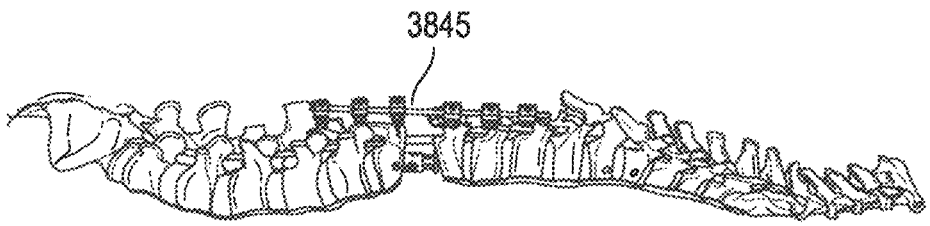
FIG. 56 shows a removal of the reduction device and provisional spine rods, followed by a fixation of the final rod on the right side.
FIG. 57 shows a table with the percentage changes in the resection gap at three different cage heights.

Once the reduction process was complete, the final rod 3840 on the left side was securely fastened. Following this, the reduction device and provisional spine rods 3820a and 3820b (not shown) were removed, and the right final rod 3845 was firmly positioned (see FIG. 56). FIG. 56 shows the removal of the reduction device (not shown) and provisional spine rods (not shown), followed by the fixation of the final rod 3845 on the right side.

The angular kyphosis underwent repeated correction at each of the different cage heights, and the corresponding data were recorded. The percentage change (%) of the resected gap was determined using the formula: (post-reduction length–pre-reduction length)/pre-reduction length×100%. A positive value indicates lengthening, while a negative (−) value indicates shortening of the resected gap. The Cobb angle correction rate was calculated as (post-reduction angle–pre-reduction angle)/pre-reduction angle× 100%. The ISL lengthening rate was calculated as (post-reduction length–pre-reduction length)/pre-reduction length×100%. The AVT from the dorsal to ventral aspect was calculated as the pre-reduction AVT subtracting the post-reduction AVT.

VCR for Correction of a Thoracolumbar Angular Kyphosis Using the RD in a Three-Month-Old Pig Cadaver Prior to the correction, a thoracolumbar angular kyphosis of mean 51.9±0.7° with the apex located at T11 was present. The mean of PVEG, PVBWG, and AVBWG was 34.7±0.7 mm, 30±0 mm, and 21.6±0.8 mm, respectively. The mean of ISL and AVT was 160.1±1.7 mm and 81.2±6.5 mm, respectively.

After the correction, the angular kyphosis was corrected to 0°, indicating a correction rate of 100%. The mean change of AVT from the dorsal to ventral aspect measured 65.9±7.1 mm. The ISL exhibited an increase from a pre-reduction mean of 160.1±1.7 mm to a post-reduction mean of 174.2±8.8 mm, indicating a mean increase of 8.8%.

The table shown in FIG. 57 illustrates the percentage changes in the resection gap at three different cage heights. When using a 28 mm cage, which corresponds to the posterior part of the resected vertebral body gap, the PVBWG shortened by 17.3% during the reduction maneuver. This reduction allowed for a 53.3% decrease in PVEG and a 76.9% increase in AVBWG. However, when employing shorter cages, such as 19 mm and 9 mm, the PVBWG decreased by 39.7% and 81.7%, respectively. It's worth noting that the use of shorter cages resulted in a more significant shortening of the PVBWG and therefore a greater impact on the spinal cord. During the reduction maneuver, no axial translation or shear bending of the spine segments were observed in other planes.

The Reduction Device (RD) has demonstrated its consistent ability to provide stability to spinal segments, functioning as an adaptable and controllable pivot mechanism for effectively correcting severe angular kyphosis through VCR in a sawbones model. The choice of an appropriate anterior support cage should be determined based on the size of the resection gap. Placing the cage pivot at the posterior section of the resected vertebral body supports the preservation of the spinal cord, preventing excessive shortening or lengthening during the VCR procedure for severe angular kyphosis correction.

Figure 58:
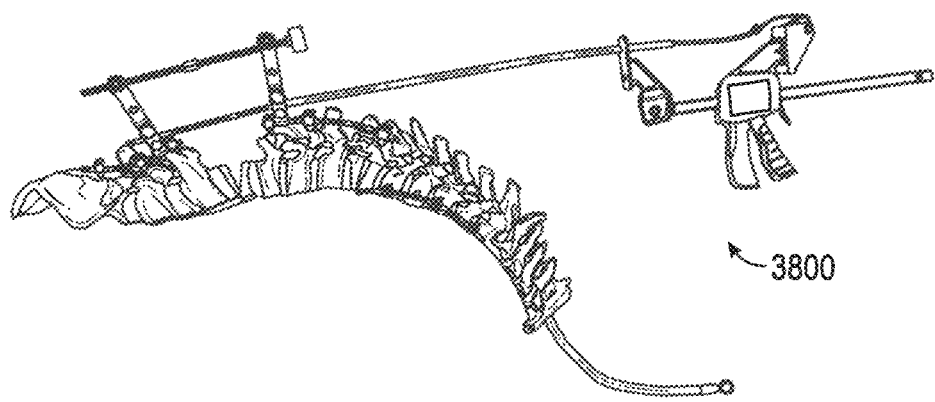
FIG. 58 shows the reduction device for a pedicle subtraction osteotomy (PSO) at pre-reduction.
Figure 59:
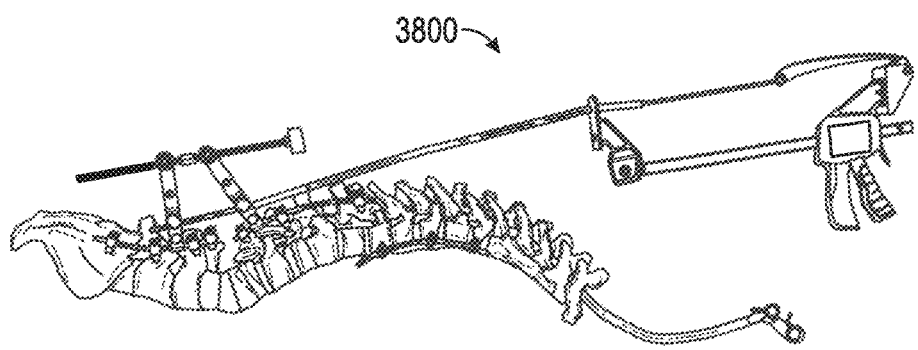
FIG. 59 the reduction device for a PSO at post-reduction.
Figure 60:
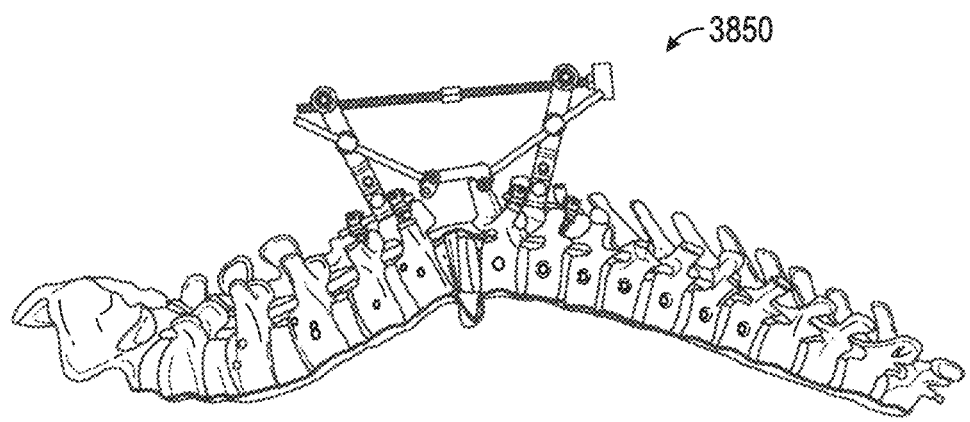
FIG. 60 shows an external hinge reduction device for correction of vertebral burst fracture kyphosis at pre-reduction.
Figure 61:
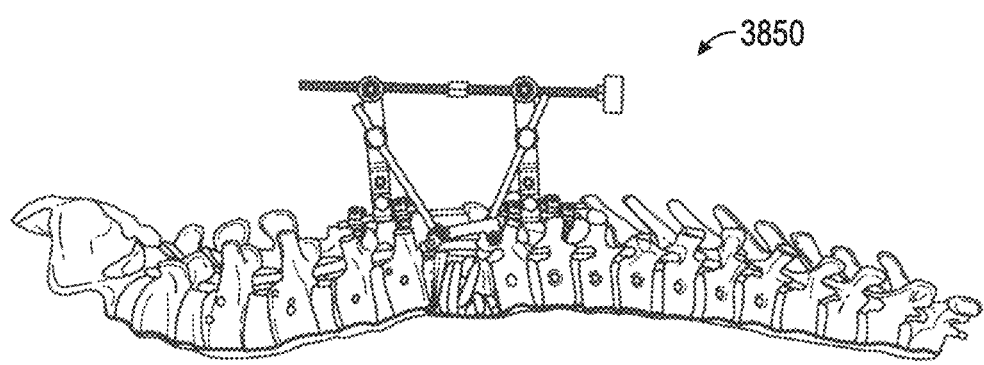
FIG. 61 shows an external hinge reduction device for correction of vertebral burst fracture kyphosis at post-reduction.
Figure 62:
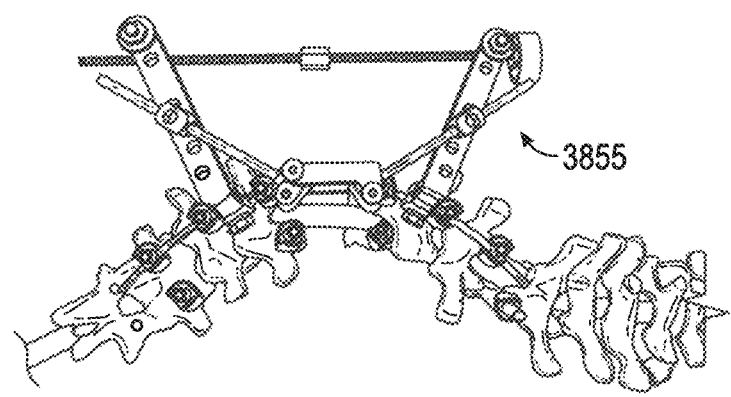
FIG. 62 shows a modifier external hinge reduction device for correction of severe kyphoscoliosis in back view at pre-reduction.
Figure 63:
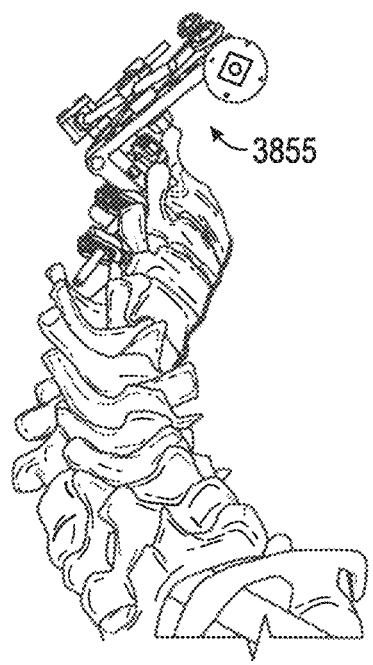
FIG. 63 shows a modifier external hinge reduction device for correction of severe kyphoscoliosis in cephalad top view at pre-reduction.
Figure 64:
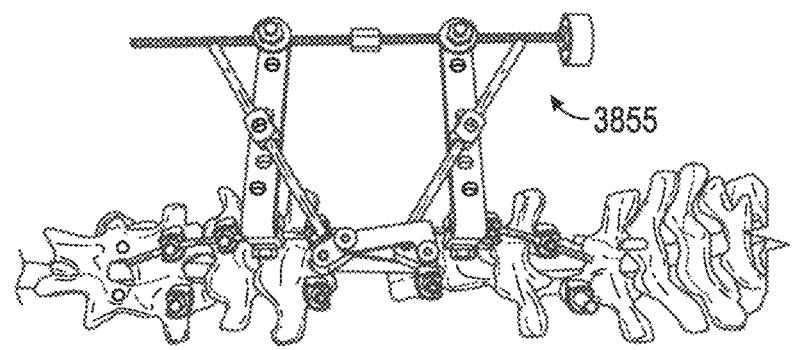
FIG. 64 shows a modifier external hinge reduction device for correction of severe kyphoscoliosis in back view at post-reduction.
Figure 65:
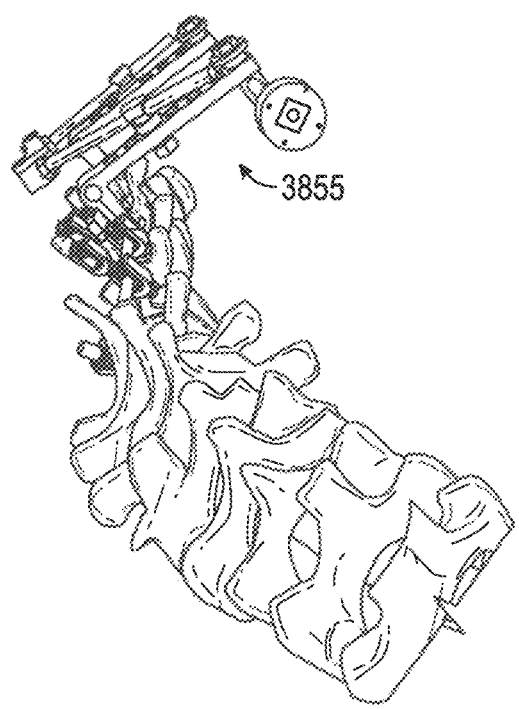
FIG. 65 shows a modifier external hinge reduction device for correction of severe kyphoscoliosis in cephalad top view at post-reduction.

FIG. 58 shows the reduction device 3800 for pedicle subtraction osteotomy (PSO) at pre-reduction. FIG. 59 shows the reduction device 3800 for pedicle subtraction osteotomy (PSO) at post-reduction. FIG. 60 shows an external hinge reduction device 3850 for correction of vertebral burst fracture kyphosis at pre-reduction. FIG. 61 shows an external hinge reduction device 3850 for correction of vertebral burst fracture kyphosis at post-reduction. FIG. 62 shows a modifier external hinge reduction device 3855 for correction of severe kyphoscoliosis in back view at pre-reduction. FIG. 63 shows a modifier external hinge reduction device 3855 for correction of severe kyphoscoliosis in cephalad top at pre-reduction. FIG. 64 shows a modifier external hinge reduction device 3855 for correction of severe kyphoscoliosis in back view at post-reduction. FIG. 65 shows a modifier external hinge reduction device 3855 for correction of severe kyphoscoliosis in cephalad top view at post-reduction.

Figure 66:
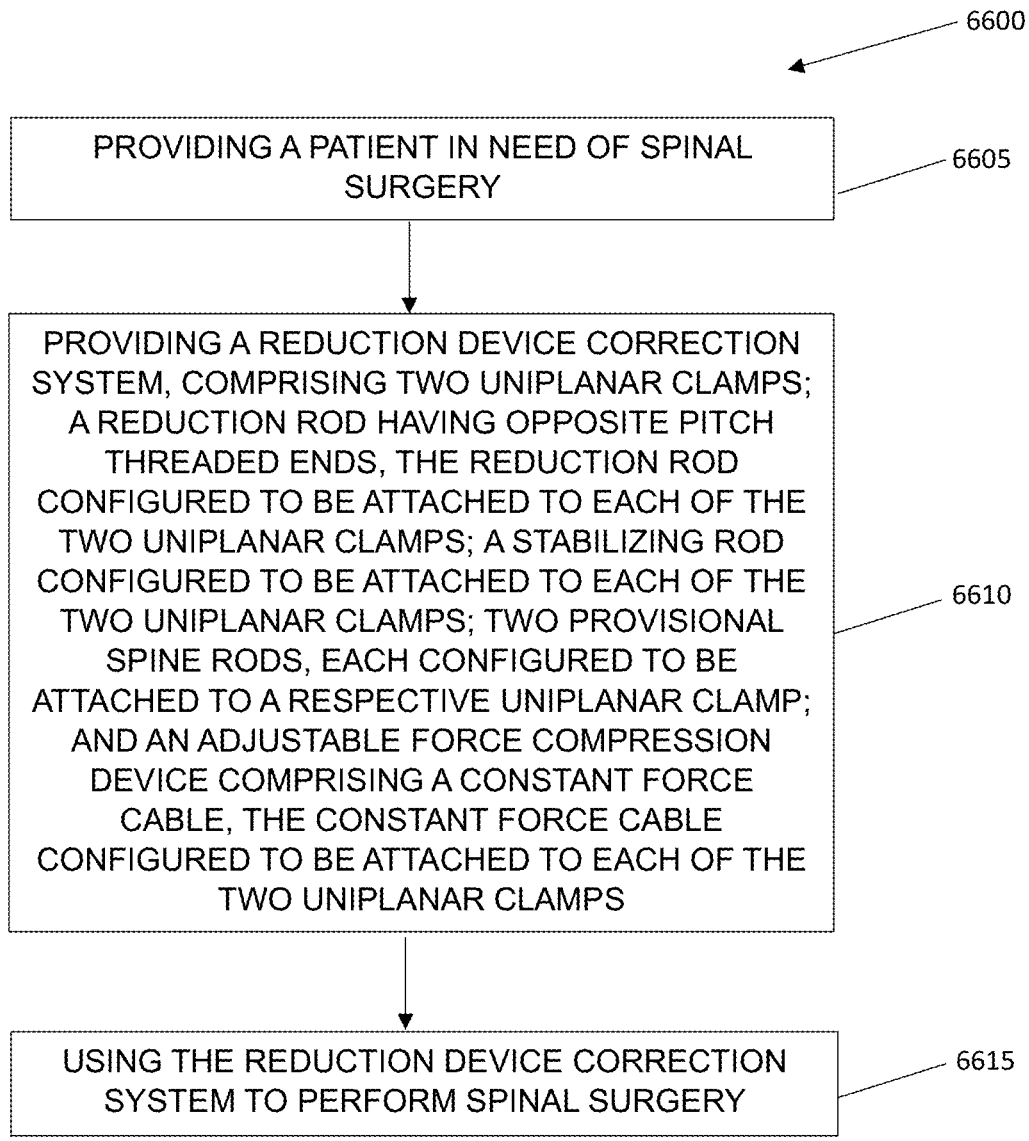
FIG. 66 shows a flowchart for a method embodiment of the invention.

FIG. 66 shows a flowchart for a method embodiment of the present invention. The method 6600 includes Block 6605, providing a patient in need of spinal surgery. Method 6600 further includes Block 6610, providing a reduction device correction system for spinal surgery including two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; and an adjustable force compression device including a constant force cable, the constant force cable configured to be attached to each of the two uniplanar clamps. Method 6600 includes, in addition, Block 6615, using the reduction device correction system to perform spinal surgery.

In an embodiment of the disclosure, a reduction device correction system for spinal surgery comprises, consists essentially of, or consists of two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; and an adjustable force compression device including a constant force cable, the constant force cable configured to be attached to each of the two uniplanar clamps. In one aspect, each of the two uniplanar clamps includes a stabilizing rod locking bolt and stabilizing rod locking nut to attach the stabilizing rod to the uniplanar clamp. In another aspect, each of the two uniplanar clamps includes an open-ended clamp, a spring-loaded snap, and a provisional spine locking nut to attach one of the provisional spine rods to the uniplanar clamp. In another aspect, the adjustable force compression device further includes an adjustable-length mechanical base connected to the constant force cable. In another aspect, the adjustable force compression device further includes a self-locking pump handle connected to the constant force cable. In another aspect, the adjustable force compression device further includes dual constant force springs connected to the constant force cable.

In another embodiment of the disclosure, a kit for a reduction device correction system for spinal surgery comprises, consists essentially of, or consists of two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; an adjustable force compression device including a constant force cable, the constant force cable configured to be attached to each of the two uniplanar clamps; and one or more tools to assemble or manipulate the reduction device correction system. In one aspect, each of the two uniplanar clamps includes a lockable differentially threaded reduction bolt to attach the reduction rod to the uniplanar clamp. In another aspect, each of the two uniplanar clamps includes a stabilizing rod locking bolt and stabilizing rod locking nut to attach the stabilizing rod to the uniplanar clamp. In another aspect, each of the two uniplanar clamps includes an open-ended clamp, a spring-loaded snap, and a provisional spine locking nut to attach one of the provisional spine rods to the uniplanar clamp. In another aspect, the adjustable force compression device further includes an adjustable-length mechanical base connected to the constant force cable. In another aspect, the adjustable force compression device further includes a self-locking pump handle connected to the constant force cable. In another aspect, the adjustable force compression device further includes dual constant force springs connected to the constant force cable.

In another embodiment of the disclosure, a method for using a reduction device correction system for spinal surgery comprises, consists essentially of, or consists of providing a patient in need of spinal surgery; providing the reduction device correction system, including two uniplanar clamps; a reduction rod having opposite pitch threaded ends, the reduction rod configured to be attached to each of the two uniplanar clamps; a stabilizing rod configured to be attached to each of the two uniplanar clamps; two provisional spine rods, each configured to be attached to a respective uniplanar clamp; and an adjustable force compression device including a constant force cable, the constant force cable configured to be attached to each of the two uniplanar clamps; and using the reduction device correction system to perform spinal surgery. In one aspect, each of the two uniplanar clamps includes a lockable differentially threaded reduction bolt to attach the reduction rod to the uniplanar clamp. In another aspect, each of the two uniplanar clamps includes a stabilizing rod locking bolt and stabilizing rod locking nut to attach the stabilizing rod to the uniplanar clamp. In another aspect, each of the two uniplanar clamps includes an open-ended clamp, a spring-loaded snap, and a provisional spine locking nut to attach one of the provisional spine rods to the uniplanar clamp. In another aspect, the adjustable force compression device further includes an adjustable-length mechanical base connected to the constant force cable. In another aspect, the adjustable force compression device further includes a self-locking pump handle connected to the constant force cable. In another aspect, the adjustable force compression device further includes dual constant force springs connected to the constant force cable.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of" As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

1. Boachie-Adjei O, Papadopoulos E C, Pellise F, et al (2013) Late treatment of tuberculosis-associated kyphosis: literature review and experience from a SRS-GOP site. Eur Spine J. 22 Suppl 4: 641-6.
2. Miladi L (2013) Round and angular kyphosis in pediatric patients. Orthopaedic & Traumatology: Surgery & Research. 99S: S140-S149.
3. Sucato D J (2010) Management of Severe Spinal Deformity. Spine (Phila Pa 1976) 35: 2186-2192. https://doi.org/10.1097/BRS.0b013e3181feab19
4. Syvanen J, Helenius L, and Raitio A, et al (2022) Health-related quality of life after posterior vertebral column resection in children: comparison with healthy controls. European Journal of Orthopaedic Surgery & Traumatology. 32: 899-907.
5. Boachie-Adjei O, Duah H O, Yankey K P, et al (2021) New neurologic deficit and recovery rates in the treatment of complex pediatric spine deformities exceeding 100 degrees or treated by vertebral column resection (VCR). Spine Deformity. 9: 427-433.
6. Boachie-Adjei O, Duah H O, Sackeyfio A, et al (2022) Surgical outcomes of severe spinal deformities esceeding 100° or treated by vertebral column resection (VCR). Does implant density matter: an observational study of deformity groupings. Spine Deformity. 10: 595-606.

7. Lenke L G, Sides B A, Koester L A, et al (2010) Vertebral column resection for the treatment of severe spinal deformity. Clin Orthop Relat Res. 468: 687-99. https://doi.org/10.1007/s11999-009-1037-x
8. Lenke L G, O'Leary P T, Bridwell K H, et al (2009) Posterior vertebral column resection for severe pediatric deformity minimum two-year follow-up of thirty-five consecutive patients. Spine (Phila Pa 1976) 34: 2213-21. https://doi.org/10.1097/BRS.0b013e3181b53cba
9. Boachie-Adjei O, Yagi M, Nemani V M, et al (2015) Incidence and risk factors for major surgical complications in patients with complex spinal deformity: a report from an SRS GOP site. Spine Deformity. 3: 57-64.
10. Lenke L G, Newton P O, Sucato D J, et al (2013) Complications after 147 consecutive vertebral column resection for severe pediatric spinal deformity: a multi-center analysis. Spine (Phila Pa 1976) 38: 119-32. http://doi.org/10.1097/BRS.0b013e318269fab1
11. Suk S, Kim J H, Kim W J, et al (2002) Posterior vertebral column resection for severe spinal deformities. Spine (Phila Pa 1976) 27: 2374-2382. http://doi.org/10.1097/00007632-200211010-0001
12. Suk S, Chung E R, Kim J H, et al (2005) Posterior vertebral column resection for severe spinal scoliosis. Spine (Phila Pa 1976) 30: 1682-1687. http://doi.org/10.1097/01.brs.0000170590.21071.c1
13. Suk S, Chung E R, Lee S M, et al (2005) Posterior vertebral column resection in fixed lumbosacral deformity. Spine (Phila Pa 1976) 30: E703-10.
14. Saifi C, Laratta J L, Petridis P, et al (2017) Vertebral column resection for rigid spinal deformity. Global Spine Journal 7: 280-290.
15. Boachie-Adjei O and Yankey K (2017) The Use of Halo-Gravity Traction and Vertebral Column Resection to Treat Children with Severe Kyphosis. Results and Complications. Ann Pediatr Child Health 5(3): 1129.
16. Sacramento-Dominguez C, Yagi M, Ayamga J. et al (2015) Apex of deformity for three-column osteotomy. Does it matter in the occurrence of complications? The Spine Journal. 15: 2351-2359.
17. Zhang H and Sucato D J (2015) Rod link reducer posterior system for vertebral column resection: a porcine model. In: Wang Y, Boachie O, and Lenke L (eds) Spinal Osteotomy. Springer, pp 163-178.
18. Zhang H, Sucato D J, and Ross D (2023) A novel hinge-link correction system for vertebral column resection: a pilot study in a porcine model. Spine Deformity. 11: 269-279.

What is claimed is:

1. A reduction device correction system for spinal surgery comprising:
   two uniplanar clamps;
   a reduction rod having opposite pitch threaded ends, the reduction rod configured to be attached to each of the two uniplanar clamps;
   a stabilizing rod configured to be attached to each of the two uniplanar clamps;
   two provisional spine rods, each configured to be attached to a respective uniplanar clamp; and
   an adjustable force compression device comprising a constant force cable, the constant force cable configured to be attached to each of the two uniplanar clamps.

2. The reduction device correction system of claim 1, wherein each of the two uniplanar clamps comprises a lockable differentially threaded reduction bolt to attach the reduction rod to the uniplanar clamp.

3. The reduction device correction system of claim 1, wherein each of the two uniplanar clamps comprises a stabilizing rod locking bolt and stabilizing rod locking nut to attach the stabilizing rod to the uniplanar clamp.

4. The reduction device correction system of claim 1, wherein each of the two uniplanar clamps comprises an open-ended clamp, a spring-loaded snap, and a provisional spine locking nut to attach one of the provisional spine rods to the uniplanar clamp.

5. The reduction device correction system of claim 1, wherein the adjustable force compression device further comprises an adjustable-length mechanical base connected to the constant force cable.

6. The reduction device correction system of claim 1, wherein the adjustable force compression device further comprises a self-locking pump handle connected to the constant force cable.

7. The reduction device correction system of claim 1, wherein the adjustable force compression device further comprises dual constant force springs connected to the constant force cable.

8. A kit for a reduction device correction system for spinal surgery, the kit comprising:
   two uniplanar clamps;
   a reduction rod having opposite pitch threaded ends, the reduction rod configured to be attached to each of the two uniplanar clamps;
   a stabilizing rod configured to be attached to each of the two uniplanar clamps;
   two provisional spine rods, each configured to be attached to a respective uniplanar clamp;
   an adjustable force compression device comprising a constant force cable, the constant force cable configured to be attached to each of the two uniplanar clamps; and
   one or more tools to assemble or manipulate the reduction device correction system.

9. The kit of claim 8, wherein each of the two uniplanar clamps comprises a lockable differentially threaded reduction bolt to attach the reduction rod to the uniplanar clamp.

10. The kit of claim 8, wherein each of the two uniplanar clamps comprises a stabilizing rod locking bolt and stabilizing rod locking nut to attach the stabilizing rod to the uniplanar clamp.

11. The kit of claim 8, wherein each of the two uniplanar clamps comprises an open-ended clamp, a spring-loaded snap, and a provisional spine locking nut to attach one of the provisional spine rods to the uniplanar clamp.

12. The kit of claim 8, wherein the adjustable force compression device further comprises an adjustable-length mechanical base connected to the constant force cable.

13. The kit of claim 8, wherein the adjustable force compression device further comprises a self-locking pump handle connected to the constant force cable.

14. The kit of claim 8, wherein the adjustable force compression device further comprises dual constant force springs connected to the constant force cable.

15. A method for using a reduction device correction system for spinal surgery, the method comprising:
    providing a patient in need of spinal surgery;
    providing the reduction device correction system, comprising:
       two uniplanar clamps;
       a reduction rod having opposite pitch threaded ends, the reduction rod configured to be attached to each of the two uniplanar clamps;

a stabilizing rod configured to be attached to each of the two uniplanar clamps;

two provisional spine rods, each configured to be attached to a respective uniplanar clamp; and an adjustable force compression device comprising a constant force cable, the constant force cable configured to be attached to each of the two uniplanar clamps; and using the reduction device correction system to perform spinal surgery.

16. The method of claim 15, wherein each of the two uniplanar clamps comprises a lockable differentially threaded reduction bolt to attach the reduction rod to the uniplanar clamp.

17. The method of claim 15, wherein each of the two uniplanar clamps comprises a stabilizing rod locking bolt and stabilizing rod locking nut to attach the stabilizing rod to the uniplanar clamp.

18. The method of claim 15, wherein each of the two uniplanar clamps comprises an open-ended clamp, a spring-loaded snap, and a provisional spine locking nut to attach one of the provisional spine rods to the uniplanar clamp.

19. The method of claim 15, wherein the adjustable force compression device further comprises an adjustable-length mechanical base connected to the constant force cable.

20. The method of claim 15, wherein the adjustable force compression device further comprises a self-locking pump handle connected to the constant force cable.

21. The method of claim 15, wherein the adjustable force compression device further comprises dual constant force springs connected to the constant force cable.

\* \* \* \* \*